United States Patent [19]
Fujiwara

[11] Patent Number: 5,799,299
[45] Date of Patent: Aug. 25, 1998

[54] DATA PROCESSING SYSTEM, DATA RETRIEVAL SYSTEM, DATA PROCESSING METHOD AND DATA RETRIEVAL METHOD

[75] Inventor: Mutsumi Fujiwara, Yokohama, Japan

[73] Assignee: Kabushiki Kaisha Toshiba, Kawasaki, Japan

[21] Appl. No.: 527,686

[22] Filed: Sep. 13, 1995

[30] Foreign Application Priority Data

Sep. 14, 1994 [JP] Japan .................. 6-219924
Jan. 31, 1995 [JP] Japan .................. 7-014651

[51] Int. Cl.⁶ .................................. G06F 17/30
[52] U.S. Cl. ......................... 707/3; 707/5; 707/2
[58] Field of Search ................ 395/604, 605, 395/800, 275; 364/900; 707/2, 3, 5

[56] References Cited

U.S. PATENT DOCUMENTS

| 4,777,617 | 10/1988 | Frisch et al. | 364/900 |
| 5,220,652 | 6/1993 | Rowley | 395/275 |
| 5,249,300 | 9/1993 | Bachman et al. | 395/800 |

FOREIGN PATENT DOCUMENTS

| 0 080 045 | 6/1983 | European Pat. Off. |
| 0 583 559 | 2/1994 | European Pat. Off. |

OTHER PUBLICATIONS

Shufen Kuo and George R. Gross, "A Two–Step String–Matching Procedure", Pattern Recognition, vol. 24, No. 7, pp. 711–716, 1991.

John A. Dundas III, "Implementing Dynamic Minimal–prefix Tries", Software–Practice And Experience, vol. 21(10), pp. 1027–1040, Oct. 1991.

Pattern Recognition, vol. 24, No. 7, pp. 711–716, Jan. 1, 1991, Shufen Kuo, et al., "A Two–Step String–Matching Procedure".

Proceedings of the Annual Symposium on Foundations of Computer Science, vol. 1, pp. 116–124, Oct. 22, 1990, William I Chang, et al., "Approximate String Matching In Sublinear Expected Time".

Primary Examiner—Thomas G. Black
Assistant Examiner—Cheryl R. Lewis
Attorney, Agent, or Firm—Oblon, Spivak, McClelland, Maier & Neustadt, P.C.

[57] ABSTRACT

A data processing system, a data retrieval system, a data processing method, and a data retrieval method requiring less time to update data to be used in retrieval. The dictionary data generator generates dictionary data from a code string on which data retrieval is to be performed using a key string. The dictionary tree generator generates a dictionary tree based on the dictionary data. The text data generator generates text data based on the code string. The text tree generator generates a text tree based on the text data. The retrieving unit retrieves a trailing string whose leading string contains part of or the whole key string, based on the dictionary tree 4 and the text tree. The changing unit changes the code string, and the updating unit updates the dictionary data, dictionary tree, text data, and text tree of the code string associated with the change, based on the contents of the change.

78 Claims, 56 Drawing Sheets

DICTIONARY TREE

TEXT TREE

DICTIONARY TREE

TEXT TREE

FIG. 8

| INTERVAL | INTERVAL LENGTH | CODE VALUE |
|---|---|---|
| [ 1.. 3 ] | 3 | 0 |
| [ 4.. 5 ] | 2 | N |
| [ 6.. 9 ] | 4 | 0 |
| [ 10.. 15 ] | 6 | 1 |
| [ 16.. 16 ] | 1 | 0 |

FIG. 47

CHARACTER STRING s :  a profile of a program improving process
                          ↑
                          3 by a professional programmer
                          ↑
                          47

PATTERN p : prof

| Position | Substring identifier |
|----------|----------------------|
| 1 | abba |
| 2 | bba |
| 3 | ba |
| 4 | abb$ |
| 5 | bb$ |
| 6 | b$ |
| 7 | $ |

DAWG for S = {ababc, abcab}.

FIG. 53

| ADDRESS | CODE VALUE |
|---------|------------|
| A | 0 |
| A + 1 | 0 |
| A + 2 | 0 |
| A + 3 | N |
| A + 4 | N |
| A + 5 | 0 |
| A + 6 | 0 |
| A + 7 | 0 |
| A + 8 | 0 |
| A + 9 | 1 |
| A + 10 | 1 |
| A + 11 | 1 |
| A + 12 | 1 |
| A + 13 | 1 |
| A + 14 | 1 |
| A + 15 | 0 |

*FIG. 54*

| ADDRESS | CODE VALUE | | CODE VALUE | ADDRESS |
|---|---|---|---|---|
| A | 0 | | 0 | A |
| A + 1 | 0 | | 0 | A + 1 |
| A + 2 | 0 | | 0 | A + 2 |
| A + 3 | N | | N | A + 3 |
| A + 4 | N | | N | A + 4 |
| A + 5 | 0 | | 1 | A + 5 |
| A + 6 | 0 | | 1 | A + 6 |
| A + 7 | 0 | | 1 | A + 7 |
| A + 8 | 0 | | 0 | A + 8 |
| A + 9 | 1 | | 0 | A + 9 |
| A + 10 | 1 | | 0 | A + 10 |
| A + 11 | 1 | | 0 | A + 11 |
| A + 12 | 1 | | 1 | A + 12 |
| A + 13 | 1 | | 1 | A + 13 |
| A + 14 | 1 | | 1 | A + 14 |
| A + 15 | 0 | | 1 | A + 15 |
| | | | 1 | A + 16 |
| | | | 1 | A + 17 |
| | | | 0 | A + 18 |

*FIG. 55*

| ADRESS | INTERVAL | CODE VALUE |
|---|---|---|
| A | [ 1 .. 3 ] | 0 |
| A + 1 | [ 4 .. 5 ] | N |
| A + 2 | [ 6 .. 9 ] | 0 |
| A + 3 | [ 10 .. 15 ] | 1 |
| A + 4 | [ 16 .. 16 ] | 0 |

| ADDRESS | INTERVAL LENGTH | CODE VALUE |
|---------|-----------------|------------|
| A       | 3               | 0          |
| A + 1   | 2               | N          |
| A + 2   | 4               | 0          |
| A + 3   | 6               | 1          |
| A + 4   | 1               | 0          |

DATA PROCESSING SYSTEM, DATA RETRIEVAL SYSTEM, DATA PROCESSING METHOD AND DATA RETRIEVAL METHOD

BACKGROUND OF THE INVENTION

[1. Field of the Invention]

This invention relates to an improved data retrieval system which retrieves a code string such as a character string. It also relates to an improved data processing system which processes data and so on.

[2. Description of the Prior Art]

Various data processing systems have been devised heretofore to find all the appearance positions of a specified key string (pattern) in a code string such as a character string. FIG. 47 shows the pattern p which is found in the character string s. A code string retrieval technique may be applied to dictionaries and indexes; more specifically, it is applied to the pattern matching in a text editor, text database, and voice recognition, to pattern analysis in such fields as DNA study, or to substitutional coding.

The simplest code string retrieval method is to match a key string against a code string sequentially from the beginning to the end. However, in this method, the retrieval time increases in proportion to the length of the character string s.

To prevent the retrieval time from being increased as the character string s becomes longer while allowing the time to increase as the number of appearances of the pattern p increases, data specifically-structured for retrieval, which is created based on the one-dimensional character string s, is used. A position tree (Majster, M. et. al. 1980), suffix tree (McCreght, E. 1976), and directed acyclic word graph (Blumer, A. et. al. 1985) are known as a structure specifically-structured for data retrieval.

These data structures are advantageous in that (1) a very large storage area is not necessary; the storage area is approximately proportional to the length of the code string s and (2) a very long retrieval time is not necessary; the time is approximately proportional to the length of the key string (pattern p) and the number of appearances.

Basically, these data structures are based on a Trie (digital search tree). As shown in FIG. 48, a Trie is a tree data structure consisting of a root, a plurality of nodes, and ends, and a sequence of labels attached to each path between each two nodes from the root to an end node (leaf) constitute the character string wi. In this data structure, a leaf corresponds to the character string wi (a full character string). In addition, a character string generated by the labels on the paths from the root to a node x is considered to be a prefix (a leading substring) of a character string generated by the labels from the root to a leaf.

Data structures that have been used in data retrieval, such as a position tree, suffix tree, or directed acyclic word graph, are based on the Trie described above.

A position tree, one of these data structures, is a Trie which uses substring identifiers, each starting at each sequential position of the code string s, as character strings. A substring identifier is defined as the shortest unique character string starting at each sequential position. FIG. 49 is an example of table (dictionary) containing positions and substring identifiers for the code string "abbabb$". In this figure, the symbol $ is a dummy code appended at the end of the code string to identify the position. FIG. 50 is an example of a position tree representing the dictionary for the code string "abbabb$".

A suffix tree is a Trie which uses a suffix (a trailing substring) of the code string s as the character string wi. FIG. 51 shows an example of a suffix tree. A suffix tree is the simplest form of a Trie. That is, a suffix tree is a tree structure in which the labels, each attached to a path from the root to a leaf (end node), generate a suffix of the code string s. In a suffix tree, a leaf corresponds to the end of a suffix (end of the code string s). The tree structure consists of all combinations of paths from the root to a leaf, and includes all the generated suffixes. A path from the root to a leaf via the node x corresponds to a suffix of the code string s with a character string generated from the root to the node x as a prefix.

A directed acyclic word graph is a graph created by merging particular paths of a suffix tree. FIG. 52 shows an example of a directed acyclic word graph.

However, when the code string s is updated in a traditional data structure, the time required for updating retrieval data increases in proportion to the length of the code string s. In a suffix tree, for example, a Trie reflects all the suffixes of the code string s. Therefore, if only a part of the code string s is changed, all the suffixes starting before the changed character are affected and so the whole Trie is affected. This is more prominent as the changed character is closer to the end of the code string s.

For example, if the last character "c" of the code string s is deleted in FIG. 51, three paths (c) are deleted and the labels on two paths (abc) are changed to (ab). Thus, a traditional data retrieval system, which takes long time in updating data, is not practical in an application where strings are updated often.

Further, another problem is that, for a variable-length substring, data processing such as editing or retrieval cannot be done efficiently. For example, a substring changes and variable in length when edited. So, to process a substring, it is always necessary to match a substring with a particular position within the code string.

A substring is difficult to process not only in data retrieval but also in many other data processing fields such as data compression or character string editing.

The following explains how difficult it is to efficiently process a substring with the use of a simple example. In this example, suppose that a code string contains characters whose values are 0, 1, or N and that, in most cases, the same code value occurs continuously. This type of string often occurs on a graphics display. The following is an example of this type of code:

[TABLE 1]

| Position | Code value |
|---|---|
| 1 | 0 |
| 2 | 0 |
| 3 | 0 |
| 4 | N |
| 5 | N |
| 6 | 0 |
| 7 | 0 |
| 8 | 0 |
| 9 | 0 |
| 10 | 1 |
| 11 | 1 |
| 12 | 1 |
| 13 | 1 |
| 14 | 1 |
| 15 | 1 |
| 16 | 0 |

In this example, 0 is stored in the interval [1 . . . 3], N in the interval [4 . . . 5], 0 in the interval [6 . . . 9], 1 in the interval |10 ... 15|, and 0 in the interval |16 ... 16|. In this example, it is thought that a code string is divided into a sequence of code strings of the same value, that is, into intervals.

To process this data on a computer, the straightforward method is to store code values sequentially at consecutive addresses in storage (first method). FIG. 53 shows how the code string in Table 1 is represented in the first method. In the first method, the position of each code value is proportional to the difference between the address of storage at which the code value is stored and the start address of storage where the code string is stored. This makes it possible to identify the address of a particular code value by performing usual calculation (add, subtract, multiply, and divide).

That is, if the start address of storage where the code string is stored is A, then the address where the code value of a position is stored is calculated as follows:

[Formula 1]

$$Address = Position + A - 1$$

However, this method has the following problems:

(1) Data occupies as many locations as there are code values, degrading the memory efficiency. In particular, when there are many codes of the same value, the memory is wasted.

(2) Because data is stored by each code, it takes long time to determine a range of the consecutive codes of the same value. That is, to identify a range of consecutive codes of the same value, it is necessary to read code values, one at a time, and to count the number of code values.

(3) A change in the length of a substring as a result of insertion or removal causes the addresses of all the data following the insertion or removal point to be increased or decreased. This is a time-consuming process. For example, FIG. 54 shows an example in which an interval of code value 1 [6 ... 8] is inserted immediately after the code value N at position 5 (address A+4). This insertion involves a sequence of operations; that is, data at addresses A+5 to A+15 must be moved to addresses A+8 to A+18.

(4) Because a storage area large enough to contain the number of code values (that is, the number of positions), each consisting of a specified number of bits (code unit), is required, a limited storage area limits the amount of information each code unit can contain. If each code unit is allowed to represent the maximum amount of information, a huge amount of storage is required. This results in less positions and more coarse position increments (less precise). Conversely, smaller position increments increase the number of position, requiring a huge amount of storage. In this case, only discrete amounts such as integers can be represented in practice.

Another method is to store pairs, each consisting of a code value and a range of a substring where that code consecutively occurs, in a consecutive storage area in the order in which the substrings appear (second method). FIG. 55 shows the code string in Table 1 stored in the second method.

In the second method, the amount of memory depends on the number of consecutive code value intervals. That is, it depends, not on the number of positions, but on the number of intervals, increasing the memory efficiency. A continuous range of code values can be identified by referencing a data.

In addition, the differences of the precision of each interval length (length type=discrete or continuous) are allowed. For example, floating-point numbers may be processed easily.

Again, in this method, when the length of a substring (interval) or the number of substrings is changed, it is necessary to re-write all the substring data that follow the changed position. In addition, to identify the code value of a particular position, it is necessary to search the corresponding range for the position of the value, for example, using the binary search method.

A binary search tree is conveniently used in the binary search method. In this method, a substring at the center of a code string is used as the root node. Each node is assigned a substring range data as well as the code value of the substring. Substring data may be represented by the start point and the end point of the range or only by the start point of the range with the end point obtaining from the start point of the next substring. FIG. 56 shows an example of a binary search tree corresponding to the data in Table 1. In this figure, each node is assigned the start point of the corresponding substring (in the circle) and the code value of the substring (below the circle).

In a sub-tree consisting of nodes that are at the end, one of them (for example, the node at the left) corresponds to the substring preceding the above-described node and the right sub-tree corresponds to the substring that follows the above-described node. Again, in this case, when the position of a substring s changed, it is necessary to change all the data following the change point.

It is also possible to store pairs, each consisting of a code value and the length of a substring where that code consecutively occurs, in a consecutive storage area in the order in which substrings appear (third method). FIG. 57 is an example of data stored in the conventional third method. An advantage of this method is that, when a substring is expanded or reduced, only the length of the interval of the expanded or reduced substring need be changed. A disadvantage of this method is that, when obtaining the code at a particular position, the lengths of the intervals from the start or the end to the corresponding position must be added. In addition, the binary search method cannot be used because information about a particular interval gives us only the information about the length of the interval.

A linear list may be used instead, of using a consecutive area; this makes it possible to connect non-consecutive areas through pointers (fourth method). FIG. 58 shows a data structure represented in the fourth method.

The fourth method eliminates the need for transferring data in memory when adding, deleting, dividing, or merging one or more intervals. However, to locate a particular position, this method still requires us to add up the lengths of intervals.

This invention seeks to solve the problems associated with the prior art described above. It is an object of this invention to provide an efficient data processing system , a data retrieval system , a data processing method and a data retrieval method. More specifically, it is an object of this invention to provide a data processing system which updates data for retrieval speedily, a data processing system which process data efficiently, a data processing system which retrieves data speedily, a data processing system which uses memory efficiently, and a data retrieval system which retrieves all, but non-duplicating, data strings containing the whole or a part of a key string not longer than a specified length or of any length.

SUMMARY OF THE INVENTION

To achieve the above objects, an invention according to a first illustrative implementation is a data processing system comprising: dictionary data generating means for arranging lexicographically the leading strings to be used for retrieving trailing strings each of which is a trailing part of a code string on which retrieval is to be made with the use of a key string and for generating dictionary data representing pairs each consisting of the leading string and its position within the code string; dictionary tree generating means for generating a dictionary tree, which is a binary tree, based on the dictionary data; text data generating means for generating text data based on the code string; text tree generating means for generating a text tree, which is a binary tree, based on the text data; retrieving means for retrieving trailing strings each containing the whole or part of a key string as the leading string, based on the dictionary tree and text tree; changing means for changing the code string; and updating means for updating, based on the contents of the change, the dictionary data, dictionary tree, text data, and text tree of the code string associated with the change.

And an invention according to a second illustrative implementation is a data processing method comprising the steps of: arranging lexicographically the leading strings to be used for retrieving trailing strings each of which is a trailing part of a code string on which retrieval is to be made with the use of a key string and for generating dictionary data representing pairs each consisting of said leading string and its position within said code string; generating a dictionary tree, which is a binary tree, based on said dictionary data; generating text data based on said code string; generating a text tree, which is a binary tree, based on said text data; retrieving trailing strings each containing the whole or part of a key string as the leading string, based on said dictionary tree and text tree; changing said code string; and updating, based on the contents of said change, the dictionary data, dictionary tree, text data, and text tree of said code string associated with the change.

According to the data processing system of the first illustrative implementation and the data processing method of the second illustrative implementation, configuring the dictionary tree and the text tree with a one-to-one correspondence between their items makes it easy to find all, but non-duplicating, appearances of a pattern in the text to be retrieved.

An invention according to a third illustrative implementation is a data processing system comprising: dictionary data generating means for arranging lexicographically the leading strings to be used for retrieving trailing strings each of which is a trailing part of a code string on which retrieval is to be made with the use of a key string and for generating dictionary data representing pairs each consisting of the leading string and its position within the code string; text data generating means for generating text data based on the code string; retrieving means for retrieving trailing strings each containing the whole or part of a key string as the leading string, based on the dictionary data and text data; changing means for changing the code string; and updating means for updating, based on the contents of the change, the dictionary data and text data of the code string associated with the change.

And an invention according to a fourth illustrative implementation is a data processing method comprising the steps of: arranging lexicographically the leading strings to be used for retrieving trailing strings each of which is a trailing part of a code string on which retrieval is to be made with the use of a key string and for generating dictionary data representing pairs each consisting of said leading string and its position within said code string; generating text data based on said code string; retrieving trailing strings each containing the whole or part of a key string as the leading string, based on said dictionary data and text data; changing said code string; and updating, based on the contents of said change, the dictionary data and text data of said code string associated with the change.

According to the data processing system of the third illustrative implementation and the data processing method of the fourth illustrative implementation, configuring the dictionary tree and the text tree with a one-to-one correspondence between their items makes it easy to find all, but non-duplicating, appearances of a pattern in the text to be retrieved.

An invention according to a fifth illustrative implementation is a data processing system of the first illustrative implementation wherein the length of a key-candidate substring constituting the dictionary data is limited.

And an invention according to a sixth illustrative implementation is a data processing system of the third illustrative implementation wherein the length of a key-candidate substring constituting the dictionary data is limited.

According to the invention of the fifth and sixth illustrative implementations, limiting the length of a key-candidate substring saves the area where key-candidate substrings are stored. In addition, limiting the length of a key-candidate substring eliminates the need for redundant comparison.

An invention according to a seventh illustrative implementation is a data processing system of the first illustrative implementation wherein the length of a key candidate substring constituting the dictionary data is not limited.

And an invention according to an eighth illustrative implementation is a data processing system of the third illustrative implementation wherein the length of a key candidate substring constituting the dictionary data is not limited.

According to the invention of the seventh and eighth illustrative implementations, not limiting the length of a key-candidate substring eliminates the need to later check the subsequent substring in the text and enables a substring of any length to be retrieved by simply retrieving from the index directly.

An invention according to a ninth illustrative implementation is a data processing system of the first illustrative implementation, wherein at least one of the dictionary tree generating means and text tree generating means establishes a pointer between a node in the dictionary tree and the corresponding node in the text tree.

According to the invention of the ninth illustrative implementation, a pointer established between a node in the dictionary tree and the corresponding node in the text tree makes it easier for them to reference each other. In addition, this invention saves storage space significantly because character strings need only be stored in at least one of the dictionary tree and text tree.

In addition, when a character in the text is changed, the data processing system of the ninth illustrative implementation automatically changes a key-candidate substring represented by the dictionary tree by simply changing the corresponding character in the text tree, significantly reducing the time needed to update the dictionary when a character in the text is changed.

When a character string consisting of one or more characters is added to the text, the invention of the ninth illustrative implementation creates, in the dictionary tree, the nodes corresponding to the key-candidate substring added to the dictionary table as a result of the addition of this character string, and establishes the pointers between the new nodes in the dictionary tree and the nodes of the characters added to the text tree, thus automatically changing the key-candidate substring represented by the dictionary tree. Therefore, when one or more characters are added to the text, this invention significantly reduces the time needed to update the dictionary.

When a character string consisting of one or more characters is deleted from the text, the invention of the ninth illustrative implementation deletes, from the dictionary tree, the nodes corresponding to the key-candidate substring deleted from the dictionary table as a result of the deletion of this character string, and deletes the pointers between the nodes deleted from the dictionary tree and the nodes of the characters deleted from the text tree, thus automatically changing the key-candidate substring represented by the remaining node of the dictionary tree. Therefore, when one or more characters are deleted from the text, this invention significantly reduces the time needed to update the dictionary.

An invention according to a tenth illustrative implementation is a data processing system of the third illustrative implementation, wherein at least one of the dictionary data generating means and text data generating means establishes pointers between the dictionary data and text data.

According to the invention of the tenth illustrative implementation, a pointer established between a node in the dictionary data and the corresponding node in the text data makes it easier for them to reference each other. In addition, this invention saves storage space significantly because character strings need only be stored in at least one of the dictionary data and text data.

In addition, when a character in the text is changed, the data processing system of the tenth illustrative implementation automatically changes a key-candidate substring represented by the dictionary tree by simply changing the corresponding character in the text data, significantly reducing the time needed to update the dictionary when a character in the text is changed.

When a character string consisting of one or more characters is added to the text, the invention of the tenth illustrative implementation creates, in the dictionary data, the nodes corresponding to the key-candidate substring added to the dictionary table as a result of the addition of this character sting, and establishes the pointers between the new nodes in the dictionary data and the nodes of the characters added to the text data, thus automatically changing the key-candidate substring represented by the dictionary data. Therefore, when one or more characters are added to the text, this invention significantly reduces the time needed to update the dictionary.

When a character string consisting of one or more characters is deleted from the text, the invention of the tenth illustrative implementation deletes, from the dictionary data, the nodes corresponding to the key-candidate substring deleted from the dictionary table as a result of the deletion of this character string, and deletes the pointers between the nodes deleted from the dictionary data and the nodes of the characters deleted from the text data, thus automatically changing the key-candidate substring represented by the remaining of the dictionary data. Therefore, when one or more characters are deleted from the text, this invention significantly reduces the time needed to update the dictionary.

An invention according to an eleventh illustrative implementation is a data processing system of the first illustrative implementation wherein the retrieving means retrieves data by referencing both the dictionary tree and the text tree.

According to the invention of the eleventh illustrative implementation, the retrieving means retrieves data by referencing both the dictionary tree and the text tree via pointers, storing a character string efficiently.

An invention according to a twelfth illustrative implementation is a data processing system of the third illustrative implementation wherein the retrieving means retrieves data by referencing both the dictionary data and the text data.

According to the invention of the twelfth illustrative implementation, the retrieving means references both dictionary data and text data via the pointers, storing a character string efficiently.

An invention according to a 13$^{th}$ illustrative implementation is a data processing system of the first illustrative implementation wherein the retrieving means restores a substring based on the dictionary tree and/or the text tree.

According to the invention of the 13$^{th}$ illustrative implementation, the retrieving means restores a substring based on the dictionary tree and/or the text tree, eliminating the need for the substring restoring means provided separately.

An invention according to a 14$^{th}$ illustrative implementation is a data processing system of the third illustrative implementation wherein the retrieving means restores a substring based on the dictionary data and/or the text data.

According to the invention of the 14$^{th}$ illustrative implementation, the retrieving means restores a substring based on the dictionary data and/or the text data, eliminating the need for the substring restoring means provided separately.

An invention according to a 15$^{th}$ illustrative implementation is a data processing system of the first illustrative implementation wherein the dictionary tree generating means and text tree generating means integrate the nodes of the dictionary tree and text tree into one.

According to the invention of the 15$^{th}$ illustrative implementation, the dictionary tree generating means and text tree generating means integrate the nodes of the dictionary tree and text tree into one, eliminating the need for the pointers between them and saving storage space.

An invention according to a 16$^{th}$ illustrative implementation is a data processing system of the first illustrative implementation wherein a character string is stored in the dictionary tree.

According to the invention of the 16$^{th}$ illustrative implementation, a character string stored in the dictionary tree as well as the pointers established between the dictionary tree and text tree allow the character string to be restored, eliminating the need to store the character string in the text tree and saving storage space.

An invention according to a 17$^{th}$ illustrative implementation is a data processing system of the 16$^{th}$ illustrative implementation wherein the length of a character string stored in the dictionary tree is equal to the length represented by the corresponding node in the text tree.

According to the invention of the 17$^{th}$ illustrative implementation, storing in the dictionary tree the minimum character strings required to restore the text significantly saves storage space for storing a character string in each node in the dictionary tree.

An invention according to a 18$^{th}$ illustrative implementation is a data processing system of the first illustrative implementation wherein a character string and a node address are used as a pointer to the dictionary tree in a node in the text tree.

According to the invention as claimed in a 18th illustrative implementation, the pointers to the nodes in the dictionary tree required when the text is changed need not be stored. Storing a character string in one dictionary node only, instead of storing it in a plurality of nodes, significantly saves storage space.

An invention according to the 19th illustrative implementation is a data processing system comprising: dictionary data generating means for arranging lexicographically the leading strings to be used for retrieving trailing strings each of which is a trailing part of a code string on which retrieval is to be made with the use of a key string and for generating dictionary data representing pairs each consisting of the leading string and its position within the code string; text data generating means for generating text data based on the code string; retrieving means for retrieving trailing strings each containing the whole or part of a key string as the leading string, based on the dictionary data and text data; changing means for changing the code string; updating means for updating, based on the contents of the change, the dictionary data and text data of the code string associated with the change; and adjustment range setting means for putting the changes into one unit of adjustment work.

And an invention according to a 20th illustrative implementation is a data processing method comprising the steps of: arranging lexicographically the leading strings to be used for retrieving trailing strings each of which is a trailing part of a code string on which retrieval is to be made with the use of a key string and for generating dictionary data representing pairs each consisting of said leading string and its position within said code string; generating text data based on said code string; retrieving trailing strings each containing the whole or part of a key string as the leading string, based on said dictionary data and text data; changing said code string; updating, based on the contents of said change, the dictionary data and text data of said code string associated with the change; and putting said changes into one unit of adjustment work.

According to the data processing system of the 19th illustrative implementation and the data processing method of the 20th illustrative implementation, putting a plurality of changes to a specified range into one unit of adjustment work reduces the number of re-arrange operations of trailing strings into the dictionary data.

An invention according to a 21st illustrative implementation is a data processing system comprising: dictionary data generating means for arranging lexicographically the leading strings to be used for retrieving trailing strings each of which is a trailing part of a code string on which retrieval is to be made with the use of a key string and for generating dictionary data representing pairs each consisting of the leading string and its position within the code string; text data generating means for generating text data based on the code string; retrieving means for retrieving trailing strings each containing the whole or part of a key string as the leading string, based on the dictionary data and text data; changing means for changing the code string; sequence assigning means for assigning a sequence number to each of lexicographically-registered dictionary data items; and updating means for updating, based on the contents of the change, the dictionary data, text data, and lexicographic order of the code string associated with the change.

And an invention according to a 22nd illustrative implementation is a data processing method comprising the steps of: arranging lexicographically the leading strings to be used for retrieving trailing strings each of which is a trailing part of a code string on which retrieval is to be made with the use of a key string and for generating dictionary data representing pairs each consisting of said leading string and its position within said code string; generating text data based on said code string; retrieving trailing strings each containing the whole or part of a key string as the leading string, based on said dictionary data and text data; changing said code string; assigning a sequence number to each of lexicographically-registered dictionary data items; and updating, based on the contents of said change, the dictionary data, text data, and lexicographic order of said code string associated with the change.

According to the data processing system of the 21st illustrative implementation and the data processing method of the 22nd illustrative implementation, the number of appearances of a pattern may be obtained by simply checking the positions of two items in the dictionary data. This ensures efficient retrieval.

An invention according to a 23rd illustrative implementation is data processing system of the 22nd illustrative implementation wherein the retrieving means has counting means for counting the number of sub strings, each containing an identical leading string, using the sequence numbers of the first dictionary data item and the last dictionary data item.

According to the invention of the 23rd illustrative implementation, the counting means checks the positions of two items in the dictionary data to find the number of appearances of a pattern.

An invention according to a 24th illustrative implementation is a data retrieval system comprising: dictionary data generating means for arranging lexicographically the leading strings to be used for retrieving trailing strings each of which is a trailing part of a code string on which retrieval is to be made with the use of a key string and for generating dictionary data representing pairs each consisting of the leading string and its position within the code string; dictionary tree generating means for generating a dictionary tree, which is a binary tree, based on the dictionary data; text data generating means for generating text data based on the code string; and retrieving means for retrieving trailing strings each containing the whole or part of a key string as the leading string, based on the dictionary tree.

And an invention according to a 25th illustrative implementation is a data retrieval method comprising the steps of: arranging lexicographically the leading strings to be used for retrieving trailing strings each of which is a trailing part of a code string on which retrieval is to be made with the use of a key string and for generating dictionary data representing pairs each consisting of said leading string and its position within said code string; generating a dictionary tree, which is a binary tree, based on said dictionary data; generating text data based on said code string; and retrieving trailing strings each containing the whole or part of a key string as the leading string, based on said dictionary tree.

According to the data retrieval system of the 24th illustrative implementation and the data retrieval method of the 25th illustrative implementation, a simply-configured data retrieval system composed of the dictionary data generating means, dictionary tree generating means, text data generating means, and retrieving means finds, within the text, the positions of all the non-duplicating appearances of a pattern to be retrieved even when the code string is not changed.

An invention according to a 26th illustrative implementation is a data retrieval system comprising: dictionary data generating means for arranging lexicographically the leading strings to be used for retrieving trailing strings each of which is a trailing part of a code string on which retrieval is to be made with the use of a key string and for generating dictionary data representing pairs each consisting of the leading string and its position within the code string; text data generating means for generating text data based on the code string; and retrieving means for retrieving trailing strings each containing the whole or part of a key string as the leading string, based on the dictionary data.

And an invention according to a 27$^{th}$ illustrative implementation is a data retrieval method comprising the steps of: arranging lexicographically the leading strings to be used for retrieving trailing strings each of which is a trailing part of a code string on which retrieval is to be made with the use of a key string and for generating dictionary data representing pairs each consisting of said leading string and its position within said code string; generating text data based on said code string; and retrieving trailing strings each containing the whole or part of a key string as the leading sting, based on said dictionary data.

According to the data retrieval system of the 26$^{th}$ illustrative implementation and the data retrieval method of the 27$^{th}$ illustrative implementation, a simply-configured data retrieval system composed of the dictionary data generating means, text data generating means, and retrieving means finds, within the text, the positions of all the non-duplicating appearances of a pattern to be retrieved when the code string is not changed.

An invention according to a 28$^{th}$ illustrative implementation is a data retrieval system of the 24$^{th}$ illustrative implementation wherein the length of a key-candidate substring constituting the dictionary data is limited.

And an invention according to a 29$^{th}$ illustrative implementation is a data retrieval system of the 26$^{th}$ illustrative implementation wherein the length of a key-candidate substring constituting the dictionary data is limited.

According to the invention of the 28$^{th}$ and 29$^{th}$ illustrative implementations, limiting the length of a key-candidate substring saves storage space where key-candidate substrings are stored. In addition, limiting the length of a key-candidate substring eliminates the need for redundant comparison.

An invention according to a 30$^{th}$ illustrative implementation is a data retrieval system of the 24$^{th}$ illustrative implementation wherein the length of a key-candidate substring constituting the dictionary data is not limited.

And an invention according to a 31$^{st}$ illustrative implementation is a data retrieval system of the 26$^{th}$ illustrative implementation wherein the length of a key-candidate substring constituting the dictionary data is not limited.

According to the invention of the 30$^{th}$ and 31$^{st}$ illustrative implementations, not limiting the length of a key-candidate substring eliminates the need for a subsequent check on the subsequent portion of each substring in the text. This allows a substring of any length to be retrieved by simply retrieving it directly from the index.

An invention according to a 32$^{nd}$ illustrative implementation is a data retrieval system of the 24$^{th}$ illustrative implementation, further comprising text tree generating means for generating a text tree, which is a binary tree, based on the text data, wherein trailing strings each containing the whole or part of a key string as the leading string are retrieved based on the dictionary tree and text tree.

According to the invention of the 32$^{nd}$ illustrative implementation, the data retrieval system finds the positions of all the non-duplicating appearances of a pattern to be retrieved.

An invention according to a 33$^{rd}$ illustrative implementation is data processing system comprising: dictionary data generating means for arranging lexicographically the leading strings to be used for retrieving trailing strings each of which is a trailing part of a code string on which retrieval is to be made with the use of a key string and for generating dictionary data representing pairs each consisting of the leading string and its position within the code string; retrieving means for retrieving trailing strings each containing the whole or part of a key string as the leading string, based on the dictionary data; comparing means for comparing two code strings; storing means for determining the position of a trailing string within the index and storing it in the index based on the comparison with another trailing string already registered in the index and composed of the same characters except one; changing means for changing the code string; re-arrange determining means for determining if, when part of the code string is changed, the leading string of the trailing string including the changed position of the code string must be re-arranged; and updating means for updating, based on the determination result of the comparing means and re-arrange determining means, the dictionary data of the code string associated with the change.

And an invention according to a 34$^{th}$ illustrative implementation is a data processing method comprising the steps of: arranging lexicographically the leading strings to be used for retrieving trailing strings each of which is a trailing part of a code string on which retrieval is to be made with the use of a key string and for generating dictionary data representing pairs each consisting of said leading string and its position within said code string; retrieving trailing strings each containing the whole or part of a key string as the leading string, based on said dictionary data; comparing two code strings; determining the position of a trailing string within the index and storing it in the index based on the comparison with another trailing string already registered in the index and composed of the same characters except one; changing said code string; determining if, when part of said code string is changed, the leading string of the trailing string including the changed position of the code string must be re-arranged; and updating, based on the determination result of said comparing means and re-arrange determining means, the dictionary data of said code string associated with said change.

According to the data processing system of the 33$^{rd}$ illustrative implementation and the data processing method of the 34$^{th}$ illustrative implementation, the data processing system having the comparing means and the re-arrange determining means efficiently compares code strings required when retrieving a specified code string from the index or when registering a trailing string into the index.

An invention according to a 35$^{th}$ illustrative implementation is a data processing system of the 35$^{th}$ illustrative implementation wherein the retrieving means determines, based on the position of a character on which comparison was performed last, the character position where comparison is to start next, when performing binary search on an lexicographically arranged table with a code string as the key.

According to the invention of the 35$^{th}$ illustrative implementation, the data processing system does not compare the common leading string but starts comparing the codes immediately after the last common character, increasing code string comparison efficiency.

An invention according to a 36$^{th}$ illustrative implementation is a data processing system of the 33$^{rd}$ illustrative implementation wherein, in a table arranged lexicographically with a code string as the key and when the trailing strings, generated by removing a matching leading string from two code strings, are in the table at the time both code strings are compared, the comparing means determines the relation of two code strings based on the comparison of the trailing strings of the two code strings.

According to the invention of the $36^{th}$ illustrative implementation, if the trailing strings of two code strings to be compared, from which the common leading string has been removed, are in the table, the data processing system compares these two trailing strings in the table instead of comparing the two code strings, increasing code comparison efficiency.

An invention according to a $37^{th}$ illustrative implementation is a data processing system of the $33^{rd}$ illustrative implementation wherein, when registering the leading string of the trailing string αw in a table arranged lexicographically with the leading string of the trailing string as the key, said registering means registers the leading string of αw immediately after the leading string of βx, if the difference β between the shortest trailing string βx which is longer than the trailing string x coming immediately before w which is the longest trailing string shorter than said trailing string αw in said table and the said trailing string x coming immediately before w matches the difference α between said trailing string αw and the shorter and longest trailing string w, and registers the leading string of αw immediately before the leading string of γy, if the difference γ between the shortest trailing string γy which is longer than the trailing string y coming immediately after the longest trailing string w which is shorter than said trailing string αw in said table and the trailing string y immediately after w matches the difference α between said trailing string αw and the shorter and longest trailing string w.

An invention according to a $38^{th}$ illustrative implementation is a data processing system of the $33^{rd}$ illustrative implementation wherein, when registering the leading string of the trailing string w in a table arranged lexicographically with the leading string of the trailing string as the key, said registering means registers the leading string of w between the leading string of x and the leading string of y if, for the trailing strings βx and γy which are immediately before and after the shortest trailing string αw which is longer than said trailing string w in said table, the leading string of the longest trailing string x which is shorter than βx is adjacent to the leading string of the longest trailing string y which is shorter than γy, preceded by the leading string of x in said table, and if α=β or α=γ.

According to the inventions of the $37^{th}$ and $38^{th}$ illustrative implementations, if one of two trailing strings each having the same characters in all positions except one is already in the index, the data processing system compares the two differing characters in one position to determine the position in which the other trailing string is to be registered.

An invention according to a $39^{th}$ illustrative implementation is a data processing system of the $33^{rd}$ illustrative implementation wherein, after part of the code string has been changed, the re-arrange determining means compares, in a table arranged lexicographically with the leading string of a trailing string as the key, the leading string immediately before and after the leading string in the table with the leading string itself, determines that, for at least the trailing string and longer trailing strings, their leading strings need not be re-arranged if the leading string is equal to or larger than the leading string immediately before and is equal to or smaller than the leading string of the leading string immediately after and, otherwise, determines that, for at least the trailing string and shorter trailing strings which contain the changed part, their leading strings must be re-arranged.

An invention according to a $40^{th}$ illustrative implementation is a data processing system of the $33^{rd}$ illustrative implementation wherein, after part of the code string has been changed, the re-arrange determining means compares, in a table arranged lexicographically with the leading string of a trailing string as the key, the leading string immediately before and after the leading string in the table with the leading string itself, determines that, for at least the trailing string and shorter trailing strings, their leading strings must be re-arranged if the characters of the leading strings to the position immediately before the changed position match and, otherwise, determines that, for at least the trailing string and longer trailing strings which contain the changed part, their leading strings need not be re-arranged.

An invention according to a $41^{st}$ illustrative implementation is a data processing system of the $33^{rd}$ illustrative implementation wherein, after part of the code string has been changed, the re-arrange determining means determines, in a table arranged lexicographically with the leading string of a trailing string as the key, if the leading strings of trailing strings containing the changed part must be re-arranged, in order of the leading strings of shorter trailing strings.

An invention according to a $42^{nd}$ illustrative implementation is a data processing system of the $33^{rd}$ illustrative implementation wherein, after part of the code string has been changed, the re-arrange determining means determines, in a table arranged lexicographically with the leading string of a trailing string as the key, if the leading strings of trailing strings containing the changed part must be re-arranged while selecting leading strings in binary search mode, one at a time, from those arranged in order of start positions.

According to the inventions of the $39^{th}$ to $42^{nd}$ illustrative implementations, whether or not the leading string of a trailing string which contain the changed part is to be re-arranged can be determined easily when a part of the code string is changed.

An invention according to a $43^{rd}$ illustrative implementation is a data retrieval system comprising: retrieving means for retrieving a trailing string containing the whole or part of a key string as the leading string, based on an index composed of pairs, each consisting of a leading string to be used for retrieving the trailing string and its position within the code, arranged lexicographically by the leading string, for a code string on which retrieval is performed with the use of a key string; and index generating means for generating the index.

And an invention according to the $44^{th}$ illustrative implementation is a data retrieval method comprising the steps of: retrieving a trailing string containing the whole or part of a key string as the leading string, based on an index composed of pairs, each consisting of a leading string to be used for retrieving the trailing string and its position within said code, arranged lexicographically by said leading string, for a code string on which retrieval is performed with the use of a key string; and generating said index.

According to the data retrieval system of the $43^{rd}$ illustrative implementation and the data retrieval method of the $44^{th}$ illustrative implementation, a simply-structured data retrieval system and the data retrieval method, which does not generate text, can be configured.

An invention according to a 45th illustrative implementation is a data processing system comprising: retrieving means for retrieving a trailing string containing the whole or part of a key string as the leading string, based on an index composed of pairs, each consisting of a leading string to be used for retrieving the trailing string and its position within the code, arranged lexicographically by the leading string, for a code string on which retrieval is performed with the use of a key string; and updating means for updating, based on a change to the code string, the index of the code string associated with the change.

And an invention according to a 46th illustrative implementation is a data processing method comprising the steps of: retrieving a trailing string containing the whole or part of a key string as the leading string, based on an index composed of pairs, each consisting of a leading string to be used for retrieving the trailing string and its position within said code, arranged lexicographically by said leading string, for a code string on which retrieval is performed with the use of a key string; and updating, based on a change to said code string, the index of said code string associated with the change.

According to the data processing system of the 45th illustrative implementation and the data processing method of the 46th illustrative implementation, a simply-structured data processing system and the data processing method, which does not generate text, can be configured.

An invention according to a 47th illustrative implementation is a data processing system comprising: retrieving means for retrieving a trailing string containing the whole or part of a key string as the leading string, based on an index composed of pairs, each consisting of a leading string to be used for retrieving the trailing string and its position within the code, arranged lexicographically by the leading string, for a code string on which retrieval is performed with the use of a key string; index generating means for generating the index; changing means for changing the code string; and updating means for updating, based on a change to the code string, the index of the code string associated with the change.

And an invention according to a 48th illustrative implementation is a data processing method comprising the steps of: retrieving a trailing string containing the whole or part of a key string as the leading string, based on an index composed of pairs, each consisting of a leading string to be used for retrieving the trailing string and its position within said code, arranged lexicographically by said leading string, for a code string on which retrieval is performed with the use of a key string; generating said index; changing said code string; and updating, based on a change to said code string, the index of said code string associated with the change.

According to the data processing system of the 47th illustrative implementation and the data processing method of the 48th illustrative implementation, a simply-structured data processing system and the data processing method, which does not generate text, can be configured.

An invention according to a 49th illustrative implementation is a data retrieval system comprising: retrieving means having a retrieving function for retrieving a trailing string of a code string containing the whole or part of a key string as the leading string, based on an index composed of pairs, each consisting of a leading string to be used for retrieving the trailing string and its position within the code string, arranged lexicographically by the leading string, for a code string on which retrieval is performed with the use of a key string, and having a restoring function for restoring the whole or part of a code string beginning in the specified position, based on a text composed of pairs, each consisting of a leading string of a trailing string residing in the trailing part of the code string and its position within the code string, arranged in order of appearance of the leading string within the code string; index generating means for generating the index; and text generating means for generating the text.

And an invention according to a 50th illustrative implementation is a data retrieval method comprising the steps of: retrieving a trailing string of a code string containing the whole or part of a key string as the leading string, based on an index composed of pairs, each consisting of a leading string to be used for retrieving the trailing string and its position within said code string, arranged lexicographically by said leading string, for a code string on which retrieval is performed with the use of a key string, restoring the whole or part of a code string beginning in the specified position, based on a text composed of pairs, each consisting of a leading string of a trailing string residing in the trailing part of said code string and its position within said code string, arranged in order of appearance of the leading string within said code string; generating said index; and generating said text.

According to the data retrieval system of the 49th illustrative implementation and the data retrieval method of the 50th illustrative implementation, an efficient data retrieval system and the data retrieval method, which can compare two substrings easily and can restore the whole or a part of a code string, can be configured.

An invention according to a 51st illustrative implementation is a data processing system comprising: retrieving means having a retrieving function for retrieving a trailing string containing the whole or part of a key string as the leading string, based on an index composed of pairs, each consisting of a leading string to be used for retrieving the trailing string and its position within the code string, arranged lexicographically by the leading string, for a code string on which retrieval is performed with the use of a key string, having a function for retrieving the leading string of a trailing string residing in the trailing part of the code string, and having a restoring function for restoring the whole or part of a code sting beginning in the specified position, based on a text arranged in order of positions within the code string; and updating means for updating, based on a change to the code string, the index and the text of the code string associated with the change.

And an invention according to a 52nd illustrative implementation is a data processing method comprising the steps of: retrieving a trailing string of a code string containing the whole or part of a key string as the leading string, based on an index composed of pairs, each consisting of a leading string to be used for retrieving the trailing string and its position within said code string, arranged lexicographically by said leading string, for a code string on which retrieval is performed with the use of a key string, retrieving the leading string of a trailing string residing in the trailing part of said code string, restoring the whole or part of a code string beginning in the specified position, based on a text arranged in order of positions within said code string; and updating, based on a change to said code string, the index and the text of said code string associated with the change.

According to the data processing system of the 51st illustrative implementation and the data processing method of the 52nd illustrative implementation, an efficient data processing system and the data processing method, which can compare two substrings easily and can restore the whole or a part of a code string, can be configured.

An invention according to a 53$^{rd}$ illustrative implementation is a data processing system comprising: retrieving means having a retrieving function for retrieving a trailing string of a code string containing the whole or part of a key string as the leading string, based on an index composed of pairs, each consisting of a leading string to be used for retrieving the trailing string and its position within the code string, arranged lexicographically by the leading string, for a code string on which retrieval is performed with the use of a key string, having a function for retrieving the leading string of a trailing string residing in the trailing part of the code string, and having a restoring function for restoring the whole or part of a code string beginning in the specified position, based on a text arranged in order of positions within the code string; index generating means for generating the index; text generating means for generating the text; changing means for changing the code string; and updating means for updating, based on a change to the code string, the index and the text of the code string associated with the change.

And an invention according to a 54$^{th}$ illustrative implementation is a data processing method comprising the steps of: retrieving a trailing string of a code string containing the whole or part of a key string as the leading string, based on an index composed of pairs, each consisting of a leading string to be used for retrieving the trailing string and its position within said code string, arranged lexicographically by said leading string, for a code string on which retrieval is performed with the use of a key string, retrieving the leading string of a trailing string residing in the trailing part of said code string, restoring the whole or part of a code string beginning in the specified position, based on a text arranged in order of positions within said code string; generating said index; generating said text; changing said code string; and updating, based on a change to said code string, the index and the text of said code string associated with the change.

According to the data processing system of the 53$^{rd}$ illustrative implementation and the data processing method of the 54$^{th}$ illustrative implementation, an efficient data processing system and the data processing method, which can compare two substrings easily, can restore the whole or a part of a code string, and can update an index and text according to a change in the code string, can be configured.

An invention according to a 55$^{th}$ illustrative implementation is a data retrieval system of the 43$^{rd}$ or 49$^{th}$ illustrative implementations wherein the index has items to which sequence numbers are assigned, wherein the retrieving means has an output function for outputting, based on the sequence, the number of trailing strings each of which contains the whole or part of a specific key string, and wherein the index generating means generates index items to which sequence numbers are assigned.

According to the invention of the 55$^{th}$ illustrative implementation, a data retrieval system, which can easily find the number of substrings satisfying the retrieval condition, may be built by assigning sequence numbers to index items, by providing the function for counting the number of trailing strings containing the whole or a part of the key string as their leading strings based on the sequence, and by making the index generating means to generate index items to which sequence numbers are assigned.

An invention according to a 56$^{th}$ illustrative implementation is a data processing system of the 45$^{th}$ or 51$^{st}$ illustrative implementations wherein the index has items to which sequence numbers are assigned, wherein the retrieving means has an output function for outputting, based on the sequence, the number of trailing strings each of which contains the whole or part of a specific key string, and wherein the updating means updates the sequence too.

According to the invention of the 56$^{th}$ illustrative implementation, a data processing system, which can easily find the number of substrings satisfying the retrieval condition even when the code string has been changed, may be built by assigning sequence numbers to index items, by providing a function for outputting the number of trailing strings containing the whole or a part of the key string as their leading strings based on the sequence, and by making the updating means update the sequence too.

An invention according to a 57$^{th}$ illustrative implementation is a data processing system of the 47$^{th}$ or 53$^{rd}$ illustrative implementations wherein the index has items to which sequence numbers are assigned, wherein the retrieving means has an output function for outputting, based on the sequence, the number of trailing strings each of which contains the whole or part of a specific key string, wherein the index generating means generates index items to which sequence numbers are assigned, and wherein the updating means updates the sequence too.

According to the invention of the 57$^{th}$ illustrative implementation, a data processing system, which can easily find the number of substrings satisfying the retrieval condition even when the code string has been changed, may be built by assigning sequence numbers to index items, by providing, in the retrieving means, a function for outputting the number of trailing strings containing the whole or a part of the key string as their leading strings based on the sequence, by causing the index generating means to generate index items to which sequence numbers are assigned, and by making the updating means update the sequence too.

An invention according to a 58$^{th}$ illustrative implementation is a data retrieval system of the 43$^{rd}$ or 49$^{th}$ illustrative implementations wherein the length of a key-candidate substring constituting the index is limited.

An invention according to a 59$^{th}$ illustrative implementation is a data processing system of the 45$^{th}$, 47$^{th}$, 51$^{st}$ or 53$^{rd}$ illustrative implementations wherein the length of a key-candidate substring constituting the index is limited.

According to the inventions of the 58$^{th}$ and 59$^{th}$ illustrative implementations, limiting the length of a key-candidate substring saves storage space where key-candidate substrings are stored. At the same time, limiting the length of a key-candidate substring eliminates the need for redundant comparison.

An invention according to a 60$^{th}$ illustrative implementation is a data retrieval system of the 43$^{rd}$ or 49$^{th}$ illustrative implementations wherein the length of a key-candidate substring constituting the index is not limited.

An invention according to a 61$^{st}$ illustrative implementation is a data processing system of the 45$^{th}$, 47$^{th}$, 51$^{st}$, or 53$^{rd}$ illustrative implementations wherein the length of a key-candidate substring constituting the index is not limited.

According to the inventions of the 60$^{th}$ and 61$^{st}$ illustrative implementations, not limiting the length of a key-candidate substring eliminates the need for a subsequent check on the subsequent portion of each substring in the text. This allows a substring of any length to be retrieved simply by retrieving it directly from the index.

An invention according to a 62$^{nd}$ illustrative implementation is a data processing system of the 53$^{rd}$ illustrative implementation wherein the pairs in the index and the pairs in the text are integrated.

An invention according to a 63$^{rd}$ illustrative implementation is a data retrieval system of the 49$^{th}$ illustrative implementation wherein the pairs in the index and the pairs in the text are integrated.

According to the inventions of the 62$^{nd}$ and 63$^{rd}$ illustrative implementations, integrating the pairs of index nodes and text nodes significantly reduces the required storage space.

An invention according to a 64$^{th}$ illustrative implementation is a data processing system of the 59$^{th}$ illustrative implementation wherein the index is represented by a binary tree.

An invention according to a 65$^{th}$ illustrative implementation is a data processing system of the 61$^{st}$ illustrative implementation wherein the index is represented by a binary tree.

An invention according to a 66$^{th}$ illustrative implementation is a data retrieval system of the 58$^{th}$ illustrative implementation wherein the index is represented by a binary tree.

An invention according to a 67$^{th}$ illustrative implementation is a data retrieval system of the 60$^{th}$ illustrative implementation wherein the index is represented by a binary tree.

According to the inventions of the 64$^{th}$ trough 67$^{th}$ illustrative implementations, representing the index as a binary tree significantly increases retrieval efficiency.

An invention according to a 68$^{th}$ illustrative implementation is a data processing system of the 59$^{th}$ illustrative implementation wherein the text is the code string stored in contiguous addresses, each location being represented by an address.

An invention according to a 69$^{th}$ illustrative implementation is a data processing system of the 61$^{st}$ illustrative implementation wherein the text is the code string stored in contiguous addresses, each location being represented by an address.

An invention according to a 70$^{th}$ illustrative implementation is a data retrieval system of the 58$^{th}$ illustrative implementation wherein the text is the code string stored in contiguous addresses, each location being represented by an address.

An invention according to a 71$^{st}$ illustrative implementation is a data retrieval system of the 60$^{th}$ illustrative implementation wherein the text is the code string stored in contiguous addresses, each location being represented by an address.

According to the inventions of the 68$^{th}$ through 71$^{st}$ illustrative implementations, storing the code string in contiguous addresses and representing the positions with addresses reduces the required storage space and increases text retrieval efficiency.

An invention according to a 72$^{nd}$ illustrative implementation is a data processing system of the 45$^{th}$, 46$^{th}$, 51$^{st}$ and 53$^{rd}$ illustrative implementations wherein the updating means combines the updates for a plurality of changes to the code string into one unit of work.

According to the invention of the 72$^{nd}$ illustrative implementation, combining a plurality of changes to the code string significantly increases update efficiency.

An invention according to a 73$^{rd}$ illustrative implementation is data processing method of the 22$^{nd}$ illustrative implementation wherein the retrieving step has counting step for counting the number of substrings, each containing an identical leading string, using the sequence numbers of the first dictionary data item and the last dictionary data item.

According to the invention of the 73$^{rd}$ illustrative implementation, the counting step checks the positions of two items in the dictionary data to find the number of appearances of a pattern.

An invention according to a 74$^{th}$ illustrative implementation is a data processing method of the 34$^{th}$ illustrative implementation wherein the retrieving step determines, based on the position of a character on which comparison was performed last, the character position where comparison is to start next, when performing binary search on an lexicographically arranged table with a code string as the key.

According to the invention of the 74$^{th}$ illustrative implementation, the data processing method does not compare the common leading string but starts comparing the codes immediately after the last common character, increasing code string comparison efficiency.

An invention according to a 75$^{th}$ illustrative implementation is a data processing method of the 34$^{th}$ illustrative implementation wherein, in a table arranged lexicographically with a code string as the key and when the trailing strings, generated by removing a matching leading string from two code strings, are in the table at the time both code strings are compared, the comparing step determines the relation of two code strings based on the comparison of the trailing strings of the two code strings.

According to the invention of the 75$^{th}$ illustrative implementation, if the trailing strings of two code strings to be compared, from which the common leading string has been removed, are in the table, the data processing method compares these two trailing strings in the table instead of comparing the two code strings, increasing code comparison efficiency.

An invention according to a 76$^{th}$ illustrative implementation is a data processing method of the 34$^{th}$ illustrative implementation wherein, when registering the leading string of the trailing string αw in a table arranged lexicographically with the leading string of the trailing string as the key, said registering step registers the leading string of αw immediately after the leading string of βx, if the difference β between the shortest trailing string βx which is longer than the trailing string x coming immediately before w which is the longest trailing string shorter than said trailing string αw in said table and the said trailing string x coming immediately before w matches the difference α between said trailing string αw and the shorter and longest trailing string w, and registers the leading string of αw immediately before the leading string of γy, if the difference γ between the shortest trailing string γy which is longer than the trailing string y coming immediately after the longest trailing string w which is shorter than said trailing string αw in said table and the trailing string y immediately after w matches the difference α between said trailing string αw and the shorter and longest trailing string w.

An invention according to a 77$^{th}$ illustrative implementation is a data processing method of the 34$^{th}$ illustrative implementation wherein, when registering the leading string of the trailing string w in a table arranged lexicographically with the leading string of the trailing string as the key, said registering step registers the leading string of w between the leading string of x and the leading string of y if, for the trailing strings βx and γy which are immediately before and after the shortest trailing string αw which is longer than said trailing string w in said table, the leading string of the longest trailing string x which is shorter than βx is adjacent to the leading string of the longest trailing string y which is shorter than γγ, preceded by the leading string of x in said table, and if α=β or α=γ.

According to the inventions of the 76$^{th}$ and 77$^{th}$ illustrative implementations, if one of two trailing strings each having the same characters in all positions except one is already in the index, the data processing method compares the two differing characters in one position to determine the position in which the other trailing string is to be registered.

An invention according to a 78$^{th}$ illustrative implementation is a data processing method of the 34$^{th}$ illustrative implementation wherein, after part of the code string has been changed, the re-arrange determining step compares, in a table arranged lexicographically with the leading string of a trailing string as the key, the leading string immediately before and after the leading string in the table with the leading string itself, determines that, for at least the trailing string and longer trailing strings, their leading strings need not be re-arranged if the leading string is equal to or larger than the leading string immediately before and is equal to or smaller than the leading string of the leading string immediately after and, otherwise, determines that, for at least the trailing string and shorter trailing strings which contain the changed part, their leading strings must be re-arranged.

An invention according to a 79$^{th}$ illustrative implementation is a data processing method of the 34$^{th}$ illustrative implementation wherein, after part of the code string has been changed, the re-arrange determining step compares, in a table arranged lexicographically with the leading string of a trailing string as the key, the leading string immediately before and after the leading string in the table with the leading string itself, determines that, for at least the trailing string and shorter trailing strings, their leading strings must be re-arranged if the characters of the leading strings to the position immediately before the changed position match and, otherwise, determines that, for at least the trailing string and longer trailing strings which contain the changed part, their leading strings need not be re-arranged.

An invention according to an 80$^{th}$ illustrative implementation is a data processing method of the 34$^{th}$ illustrative implementation wherein, after part of the code string has been changed, the re-arrange determining step determines, in a table arranged lexicographically with the leading string of a trailing string as the key, if the leading strings of trailing strings containing the changed part must be re-arranged, in order of the leading strings of shorter trailing strings.

An invention according to an 81$^{st}$ illustrative implementation is a data processing method of the 34$^{th}$ illustrative implementation wherein, after part of the code string has been changed, the re-arrange determining step determines, in a table arranged lexicographically with the leading string of a trailing string as the key, if the leading strings of trailing strings containing the changed part must be re-arranged while selecting leading strings in binary search mode, one at a time, from those arranged in order of start positions.

According to the inventions of the 78$^{th}$ to 81$^{st}$ illustrative implementations, whether or not the leading string of a trailing string which contain the changed part is to be re-arranged can be determined easily when a part of the code string is changed.

An invention according to an 82$^{nd}$ illustrative implementation is a data retrieval method of the 44$^{th}$ and 50$^{th}$ illustrative implementations wherein the index has items to which sequence numbers are assigned, wherein the retrieving step has an output function for outputting, based on the sequence, the number of trailing strings each of which contains the whole or part of a specific key string, and wherein the index generating step generates index items to which sequence numbers are assigned.

According to the invention of the 82$^{nd}$ illustrative implementation, a data retrieval method, which can easily find the number of substrings satisfying the retrieval condition, may be built.

An invention according to an 83$^{rd}$ illustrative implementation is a data processing method of the 46$^{th}$ and 52$^{nd}$ illustrative implementations wherein the index has items to which sequence numbers are assigned, wherein the retrieving step has an output function for outputting, based on the sequence, the number of trailing strings each of which contains the whole or part of a specific key string, and wherein the updating step updates the sequence too.

According to the invention of the 83$^{rd}$ illustrative implementation, a data processing method, which can easily find the number of substrings satisfying the retrieval condition even when the code string has been changed, may be built.

An invention according to an 84$^{th}$ illustrative implementation is a data processing method of the 48$^{th}$ or 54$^{th}$ illustrative implementations wherein the index has items to which sequence numbers are assigned, wherein the retrieving step has an output function for outputting, based on the sequence, the number of trailing strings each of which contains the whole or part of a specific key string, wherein the index generating step generates index items to which sequence numbers are assigned, and wherein the updating means updates the sequence too.

According to the invention of the 84$^{th}$ illustrative implementation, a data processing method, which can easily find the number of substrings satisfying the retrieval condition even when the code string has been changed, may be built.

BRIEF DESCRIPTION OF THE DRAWINGS

FIG. 8 is an example of data in a data processing system using the "interval control method";

FIG. 47 is an example of a pattern appearing in a character string in a conventional code string retrieval;

FIG. 53 is an example of data used in the conventional first method;

FIG. 54 is an example of data used in the conventional first method (insert);

FIG. 55 is an example of data used in the conventional second method;

[SYMBOLS]

Figure 1:
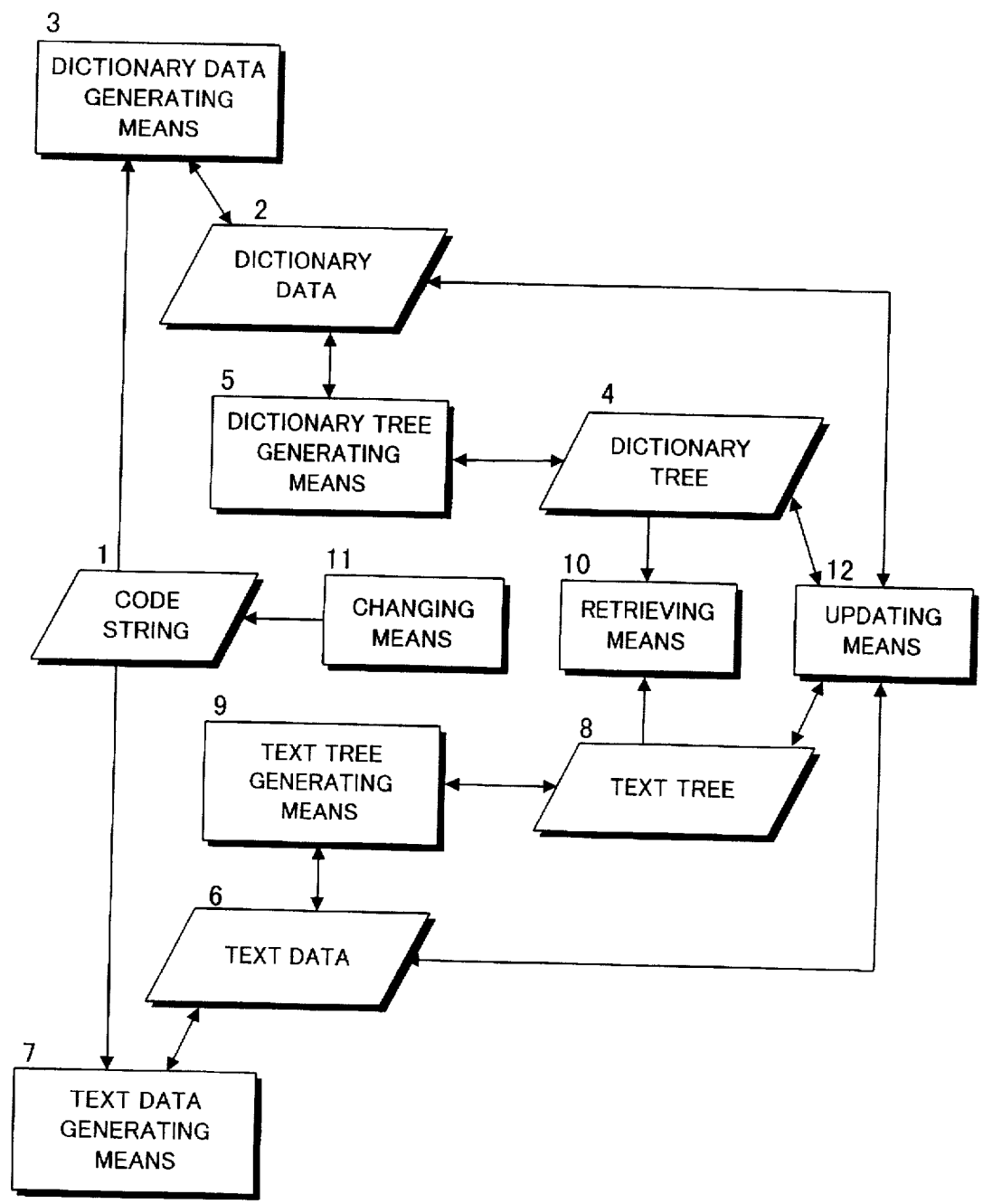
FIG. 1 is a functional block diagram showing the configuration of the first embodiment of this invention.

1 ... Code string
2 ... Dictionary data
3 ... Dictionary data generating means
4 ... Dictionary tree
5 ... Dictionary tree generating means
6 ... Text data
7 ... Text data generating means
8 ... Text tree
9 ... Text tree generating means
10 ... Retrieving means
11 ... Changing means
12 ... Updating means
13 ... Comparing means
14 ... Re-arrange determining means
15 ... Registering means
20 ... Adjustment range setting means
21 ... Index
22 ... Index generating means
23 ... Text 24 ... Text generating means
30 ... Sequence assigning means
31 ... Binary tree
32 ... Binary tree generating means
33 ... Interval retrieving means
34 ... Binary tree updating means
35 ... Interval identifying means
41 ... Interval length changing means
42 ... Adding means
43 ... Deleting means
45 ... Structure adjusting means

DETAILED DESCRIPTION

Referring to the attached drawings, there is shown a preferred embodiment of the this invention. Notice that the embodiment described below is implemented on a computer and that each function of the embodiment is implemented by a procedure (program) controlling this computer.

Each "means" mentioned in this specification refers to a conceptual equivalent of each function of this embodiment; that is, there is not always a one-to-one correspondence between means and particular pieces of hardware or software routines. One piece of hardware sometimes comprises different means. For example, a computer serves as a means when executing an instruction, but serves as another means when executing another instruction. In addition, one means may be implemented by one instruction in some cases, but by a plurality of instructions in some other cases.

Therefore, this specification describes an embodiment with the use of virtual circuit blocks (means) each having its own function of the embodiment. Note that an embodiment implemented by a computer is only an example; all or part of this invention may be packaged, if possible, on an electronic circuit such as a custom chip (custom-made integrated circuit).

The computer used in the embodiment usually consists of the CPU (central processing unit) and main storage composed of RAM (random-access memory). A computer of any size, for example, a microcomputer, personal computer, small computer, workstation, or mainframe computer may be used.

Typically, the computer has input devices such as a keyboard and a mouse, external storage units such as a hard disk, output devices such as a CRT display or a printer, and other required input/output control circuits.

The computer may be built in any configuration, and one or more components may be added, changed or removed as far as the configuration does not depart from the characteristics of this invention. For example, the embodiment may be built on a computer network to which a plurality of computers are connected. Any type of CPU may be used, a plurality of CPUs may be used at the same time, or a single CPU may be used in the time-sharing manner to process a plurality of processes concurrently. Other types of input device (pointing devices such as a touch panel, light pen, and track ball, image input devices such as a digitizer, image reader, and video camera, voice recognition devices, or various types of sensors) may be used. Other external storage devices (floppy disk device, RAM card reader, magnetic tape device, optical disk device, magneto-optical (MO) disk device, bubble memory device, and flash memory card) may be used. Other output devices (liquid crystal display, plasma display device, video projector, LED display device, voice generator, and voice synthesizer) may be used.

In a typical software configuration of this computer, a program executing each function of this embodiment runs as an application program under the operating system (OS). Typically, the machine language generated by compiling a program coded in a high-level language or assembler is used. However, the software configuration of this computer is free, and may be changed as far as this invention is implemented. For example, the OS need not always be used, and any programming language may be used. An interpreter (serially interpretive execution) such as BASIC may be used to code a program.

The program may be stored on any storage device. It may be in ROM (Read-Only Memory) or it may be on an external storage device such as a hard disk; in the latter case, the program is loaded (read) into main memory when the computer or the process is started. In addition, the program may be divided into a plurality of modules which are stored on an external storage device. In this case, only the modules necessary for processing are read into main memory. Each program module may be stored on a storage device most suitable for it.

The sequence of steps of a procedure used in this embodiment may be changed, a plurality of steps may be executed concurrently, or the steps may be executed in a different sequence each time the program is executed, as far as the steps do not depart from the characteristics of this invention. The ability to change the sequence of execution is implemented by the menu-driven interface which allows the user to select processing he wants to execute.

The "input" mentioned in this specification implies not only the input of data but also other types of processing closely related with data input. They include the echo-back, modification, and editing of entered data. And, the "output" mentioned in this specification implies not only the output of data but also other types of processing closely related with data output. They include the entry of ranges to be output or instruction of screen scrolling. Also, input and output may be integrated into an interactive input/output operation and, through this integrated operation, the user may select, specify or identify processing to be performed.

Data (information) or data storage means mentioned in this specification may exist on the computer in any form. For example, data, which is described in this specification to reside on a hard disk, may be in main storage, an external storage unit, CPU register, or cache memory. In addition, data may be held in any form. For example, data may be stored in a file or in memory or a disk to allow direct access by means of physical addresses. The code of a character string may be represented in characters or words. Data may be stored for any period of time; it may be volatile after a specified time. Data not to be changed, for example dictionary data, may be stored in ROM.

References in this specification to a specific item do not imply that only that item is used. That is, in this invention, general items needed for the operation of this invention, such as pointers, counters, flags, parameters, and buffers are used as necessary.

Unless otherwise specified, information necessary for each portion of this embodiment is obtained from other portions holding the information. For example, information may be obtained by accessing variables or memory holding necessary information. Information may be erased or deleted, not only by deleting the information from a storage area, but also by setting a flag indicating the erasure of the information.

[1. First Embodiment]

The object of the first embodiment is to provide a data processing system which updates data for retrieval speedily.

It is another object of the first embodiment to provide a data processing system which processes data speedily. It is also an object of the first embodiment to provide a data processing system which uses a simple processing procedure. It is still another object of the first embodiment to provide a data retrieval system which retrieves all, but non-duplicating, data strings containing the whole or a part of a key string of a specified length or shorter.

[1-1. Configuration of the First Embodiment]

FIG. 1 is a functional block diagram showing the configuration of the first embodiment.

The data processing system in this embodiment orders lexicographically the leading strings which are used in retrieving trailing strings of a code string 1 from which one or more strings containing a key string are to be retrieved. This data processing system has a dictionary data generating means 3 which generates dictionary data 2 containing pairs, each consisting a leading string and its position within the code string (that is, the start position of the leading string). The data processing system also has a dictionary tree generating means 5 which generates a dictionary tree 4 based on the dictionary data 2.

In addition, the data processing system in this embodiment has a text data generating means 7 which generates text data 6. It also has a text tree generating means 9 which generates a text tree 8 based on the text data 6. The dictionary tree generating means 5 and the text tree generating means 9 also establish pointers between nodes in the dictionary tree 4 and the text tree 8.

The data processing system in this embodiment has a retrieving means 10 which, based on the dictionary tree 4 and the text tree 8, retrieves trailing strings having the whole or a part of a key string as the leading string. In addition, the data processing system in this embodiment has a changing means 11 which changes the code string 1 as well as an updating means 12 which updates the dictionary data 2, dictionary tree 4, text data 6, and text tree 8 according to the change.

[1-2. Operation And Effects of the First Embodiment]

The first embodiment having the configuration described above performs operation as follows.

[1-2-1. Generating Dictionary Data And Text Data]

Figure 2:
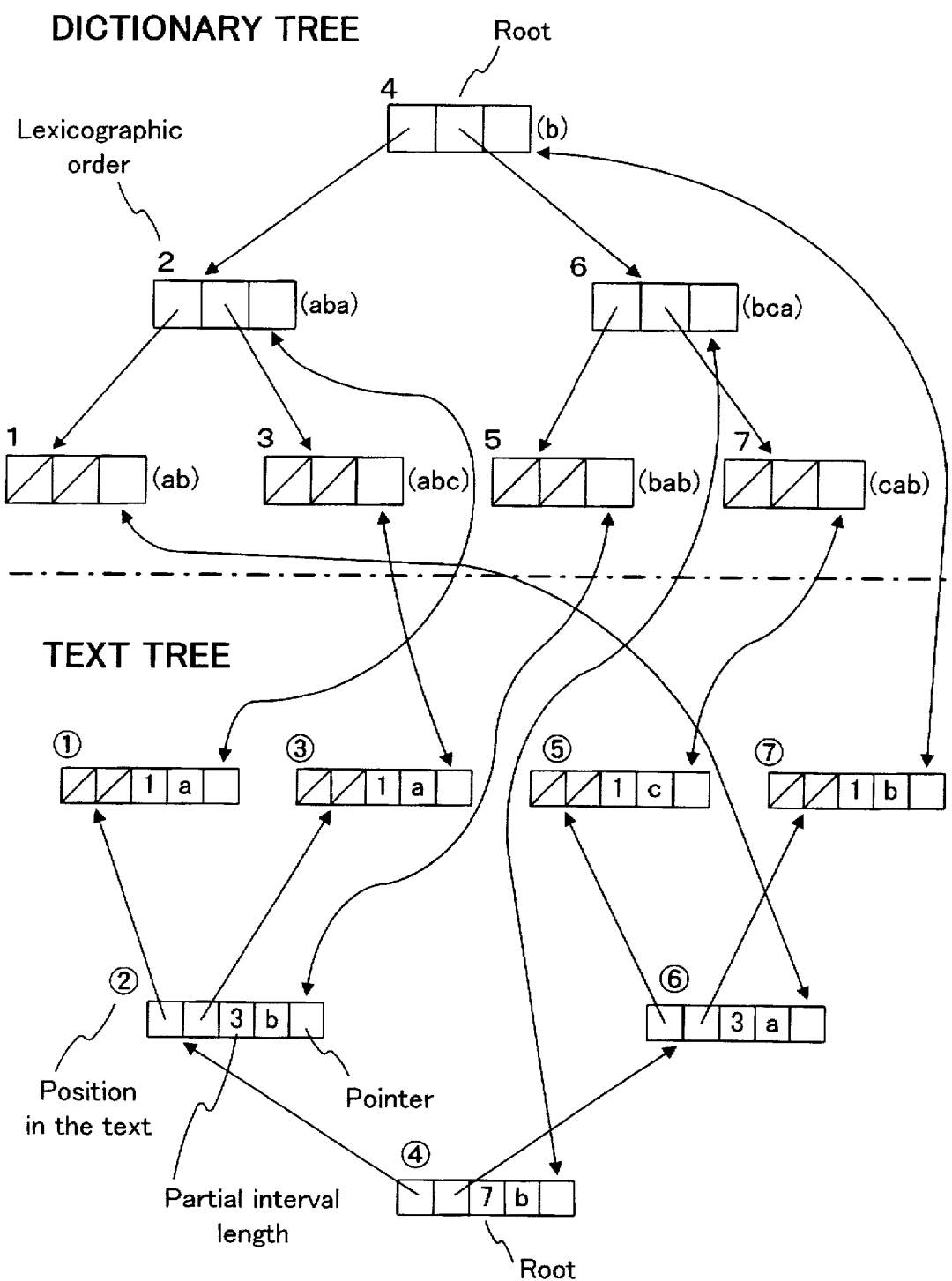
FIG. 2 is a diagram showing the data structure used in the first embodiment of this invention.

The following explains the data structure used in this embodiment. Assume that the code string 1 is "ababcab". FIG. 2 shows a data structure which can be used in retrieving a substring of the length 3 or less. In this figure, the top half shows the structure of the dictionary (dictionary tree 4) and the bottom half shows the structure of the text (text tree 8). A double-headed arrow in the figure is a pointer established between a node in the dictionary tree 4 and the corresponding node in the text tree 8.

Before taking a look at the data structure shown in FIG. 2, see Table 2. It shows the key-candidate substrings, contained in the dictionary data 2, which can be used in retrieving a substring of the length 3 or less. "Key-candidate substrings" refer to those leading strings (ab, aba, abc, b, bab, bca, cab) used for retrieving seven trailing strings (ababcab, babcab,abcab, bcab, cab, ab, b) of the code string "ababcab". Table 2 shows those leading strings arranged lexicographically. Table 2 also shows the correspondence between the integers (1 to 7), each indicating the start position of a trailing string, and the characters (more precisely, the storage elements holding those characters).

[TABLE 2]

(Text)
a b a b c a b
1 2 3 4 5 6 7
(Dictionary)

| Lexicographic order | Key-candidate substring | Start position |
|---|---|---|
| 1 | a b | 6 |
| 2 | a b a | 1 |
| 3 | a b c | 3 |
| 4 | b | 7 |
| 5 | b a b | 2 |
| 6 | b c a | 4 |
| 7 | c a b | 5 |

A number to the left of a key-candidate substring indicates the lexicographic order of the substring, while a number to the right shows a pointer to the start position of that substring. That is, a number to the right of each substring indicates the start position of that substring relative to the leftmost position of the text.

The following details the data structure in FIG. 2. The top half of the figure shows how substrings are represented in the dictionary in the tree-structured format (dictionary tree). That is, lexicographically-arranged (arranged in the lexicographic order) key-candidate substrings shown here are equivalent to those shown in Table 2.

The substring "b", the center of the substrings arranged lexicographically, is the root of the tree. And, three substrings preceding "b" in Table 2 (ab, aba, abc) are placed in the left part of the tree, while three substrings following "b" (bab, bca, cab) are placed in the right part of the tree. Note that a substring is higher than any of those to the left and is lower than any of those to the right.

The bottom half of the figure shows how text is represented in the tree-structured format (text tree), which is similar to the format of the dictionary tree structure. That is, this tree is formed with the center "b" of the code string "ababcab" being the root and with the interval length of each character being 1. The dictionary tree and the text tree are associated with the pointers.

Scanning the text tree allows the text to be restored at any start position. Therefore, if a node in the dictionary tree contains only a pointer to the corresponding node in the text tree, there is no need to store a key-candidate substring. Notice that key-candidate substring symbols shown in FIG. 2, such as (abc), are not stored in nodes; they are shown for reference only.

[1-2-1-1. Retrieving a Position Where a Specified Pattern Occurs]

The following explains how to retrieve a pattern, such as "ab", in a tree representing the dictionary data 2 (hereafter called a dictionary tree). If the dictionary data 2 consists only of alphabetic characters "a", "b", and "c" and if the key-candidate substrings are arranged lexicographically, then a substring containing the pattern "ab" is located between "aa" and "ac".

Retrieving the pattern "ab" from Table 2 determines the range indicated by two items: the item with the lowest key which is equal to or higher than the key "ab" (that is "ab") and the item with the highest key which is equal to or lower than the key "ab" (In this embodiment, the corresponding item is "abc"). If there are items that satisfy the requirement and if the former (the item with the lowest key) precedes (or matches) the latter (the item with the highest key) in the table, then it can be said that the leading strings of the keys of the former item, the latter item, and the intervening items are "ab" and that there is no other items whose leading strings of the keys are "ab".

On the other hand, retrieving the pattern "ab" from the dictionary tree shown in FIG. 2 determines the range indicated by two items: the item with the lowest key which is equal to or higher than the key "ab" (that is node "ab") and the item with the highest key which is equal to or lower than the key "ab" (that is, the node "abc"). If there are items that satisfy the requirement and if the former is to the left of (or matches) the latter in the figure, then it can be said that the leading strings of the keys of the former item, the latter item, and the intervening items are "ab" and that there is no other items whose leading strings of the keys are "ab".

Therefore, the pointers to the corresponding positions in the text tree which are assigned to those items (ab, aba, abc) enable us to get the corresponding starting positions (6, 1, 3) in the text. For example, in FIG. 2, following the pointer assigned to the dictionary data (ab) gives us the position "6" in the text, and following the pointer assigned to the dictionary data (aba) gives us the position "1" in the text.

As described above, in this embodiment, the appearance positions of the pattern "ab" in the text can be determined easily with no duplication.

[1-2-1-2. Updating the Dictionary When Characters in the Text Are Changed]

The following describes how the dictionary is updated when one or more characters are changed. Assume that the forth character "b" in the text "ababcab" is changed to the character "c" (The changing means 11 shown in FIG. 1 changes characters).

[TABLE 3]

| | (Text) | |
|---|---|---|
| a b a b c a b | → | a b a c c a b |
| 1 2 3 4 5 6 7 | | 1 2 3 4 5 6 7 |
| | (Dictionary) | |
| Lexicographic order | Key-candidate substring | Start position |
| 1 | a b | 6 |
| 2 | a b a | 1 |
| 3 | a c c | 3 |
| 4 | b | 7 |
| 5 | b a c | 2 |
| 6 | c a b | 5 |
| 7 | c c a | 4 |

In this example, those dictionary items in Table 2 (bca, a bc, bab) containing the character "b"—the forth character in the text—in the key have that character changed to "c" in Table 3 (cca, acc, bac). Because their contents have been changed, they must be re-ordered in the table. As shown, the position of the item "cab" and the position of the changed item "cca" have been changed in Table 3. (In Table 2, "cab" is the seventh item and "bca" is the sixth item). The updating means 12 shown in FIG. 1 updates the dictionary data 2 as described above.

Figure 3:
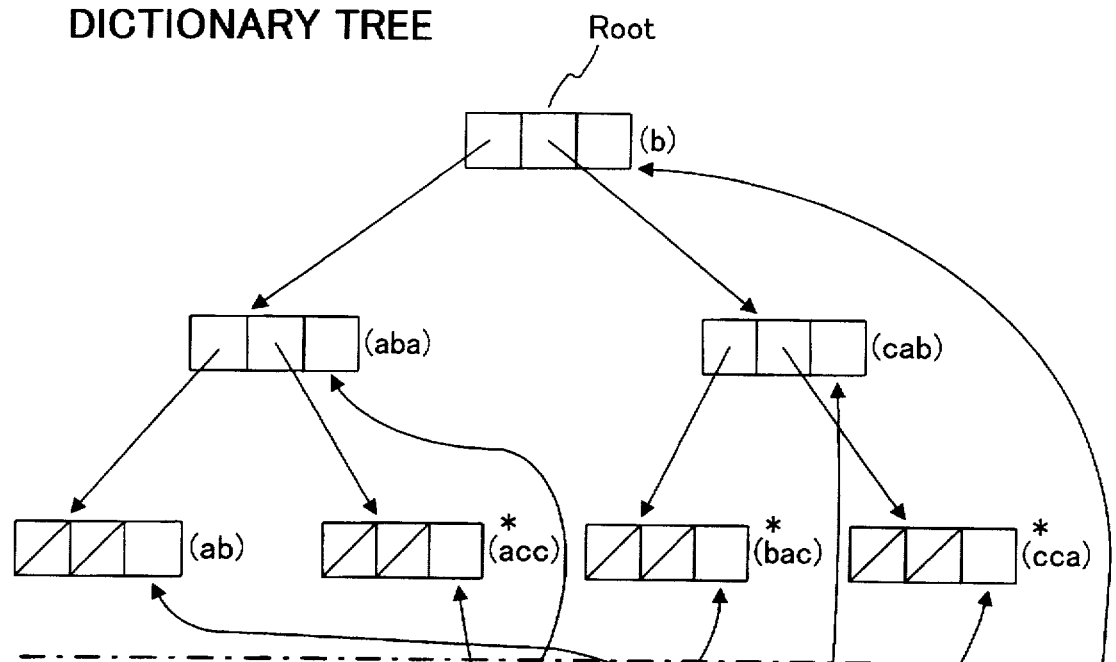
FIG. 3 is a diagram showing the data structure when a character in the text is changed in the first embodiment of this invention.
Figure 3:
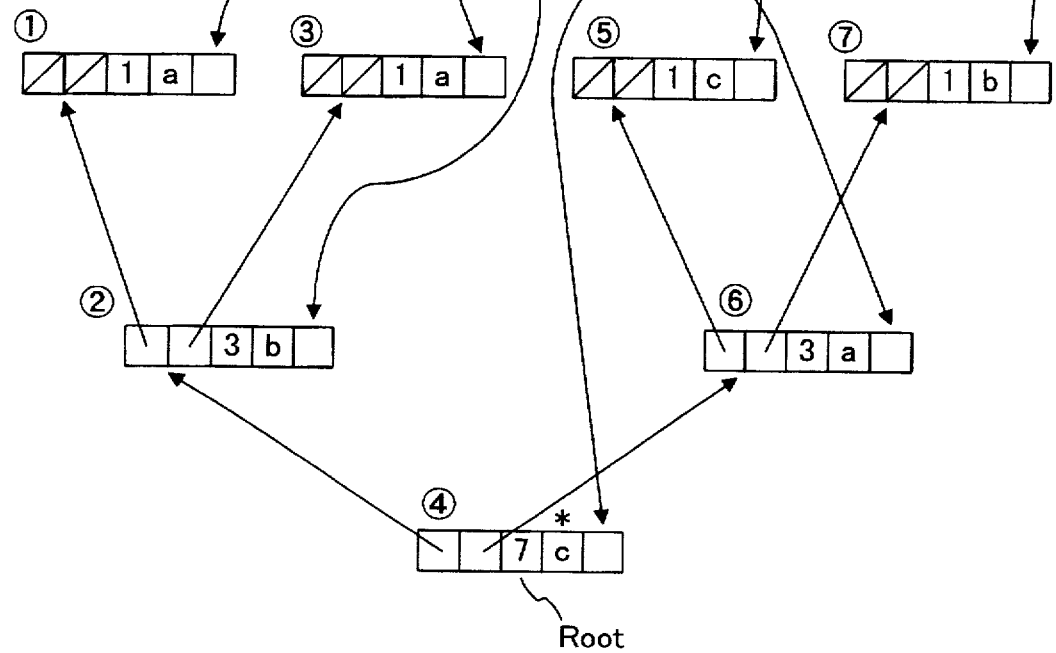

An item containing a character to be changed ("b" in the forth position in this example) and the position of the character within the key can be determined by the position ("4") of the character within the text and the (maximum) length ("3") of a substring entered into the table. That is, the start position of a substring which contains the character that is in the forth position in the text and whose length is 3 is 4, 3, or 2. Thus, as shown in FIG. 3, the items to be changed are determined by following the pointers to positions 4, 3, and 2 in the text tree, in the backward direction. (nodes marked by * in the dictionary tree in FIG. 3).

In addition, the position of the character to be changed within each substring can be obtained by calculating the difference between the position of the character to be changed (that is, 4) and the start position of a substring to be changed (4, 3, or 2) and by adding 1 to the result. In the above example, the start position of the substring "abc" is 3. So, because 4−3+1=2, the second character "b" must be changed to "c".

In the tree representation shown in FIG. 3, a node in the dictionary tree contains, not a key itself, but a pointer to the corresponding node in the text tree. This means that all that must be done is to simply change the character in a node in the text tree (In this example, the character "b" in the root node, marked with * in FIG. 3, is changed to "c") and then to re-arrange the associated nodes in the dictionary tree.

After the character has been changed, the relation between the dictionary tree and the text tree is as shown in FIG. 3. That is, the character in position 4 (in this example, this is the root node) in the text tree has been changed to "c". There is no change in the pointers between the dictionary tree and the text tree because they remain unchanged. Note that the nodes in the dictionary tree marked with * has been re-arranged. They are re-arranged in the same positions, in FIG. 3; but, normally, the key-candidate substring changes and therefore the nodes are relocated in different positions. The nodes corresponding (cca) (previously corresponding (bca)) and (cab) have been exchanged in the dictionary tree.

According to this embodiment, changing a character in the text tree automatically changes the key-candidate substring represented by the dictionary tree, significantly reducing the time required for updating the dictionary associated with the change of the character in the text.

[1-2-1-3. Inserting a Character String into a Text]

When a character string is inserted into a text, the updating means 12 re-arranges the affected dictionary items as with the change of a character in the text and, at the same time, adds new items. The updating means 12 also adjusts the start position of each substring (character positions) in the text tree.

In the following discussion, assume that the character string "ba" is inserted after position 4 ("b") of the text "ababcab". Before inserting the character string "ba", the substrings (bca-456, abc-345) containing the characters in positions 4 and 5 ("b", "c"), which are immediately before and after the insertion point, are changed to the substrings (b ba-456, abb-345), respectively, and re-arranged (items marked with # in Table 4). Note that the notation "bca-456", consisting of a substring and its character positions, is used for easy understanding. The underlined portion indicates the part changed as a result of insertion of the character string "ab".

Then, the items, each containing a substring generated by inserting the character string "ba" and the pointer to the start position of that substring within the text, are added to the dictionary data 2 (items marked with * in Table 4). As a result, the text data 6 and the dictionary data 2 are changed as follows:

[TABLE 4]

| | (Text) | |
|---|---|---|
| a b a b c a b | → | a b a b b a c a b |
| 1 2 3 4 5 6 7 | | 1 2 3 4 5 6 7 8 9 |
| | (Dictionary) | |
| Lexicographic order | Key-candidate substring | Start position |
| 1 | a b | 8 |
| 2 | a b a | 1 |
| 3 | #a b b | 3 |
| 4 | *a c a | 6 |
| 5 | b | 9 |

[TABLE 4]-continued

| 6 | b a b   | 2 |
|---|---------|---|
| 7 | *b a c  | 5 |
| 8 | #b b a  | 4 |
| 9 | *c a b  | 7 |

(* indicates an added item; # indicates a changed item)

After the character string is inserted, the dictionary tree and the text tree are as described below. A node in the dictionary tree contains, not a key itself, but a pointer to the corresponding node in the text tree. Comparing the substrings before insertion (bca-456, abc-345) with those after insertion (bba-456, abb-345) indicates that the pointers remains unchanged. This means that, after insertion, there is no need to change a pointer, both forward and backward, between a node in the dictionary tree and the corresponding node in the text tree.

Figure 4:
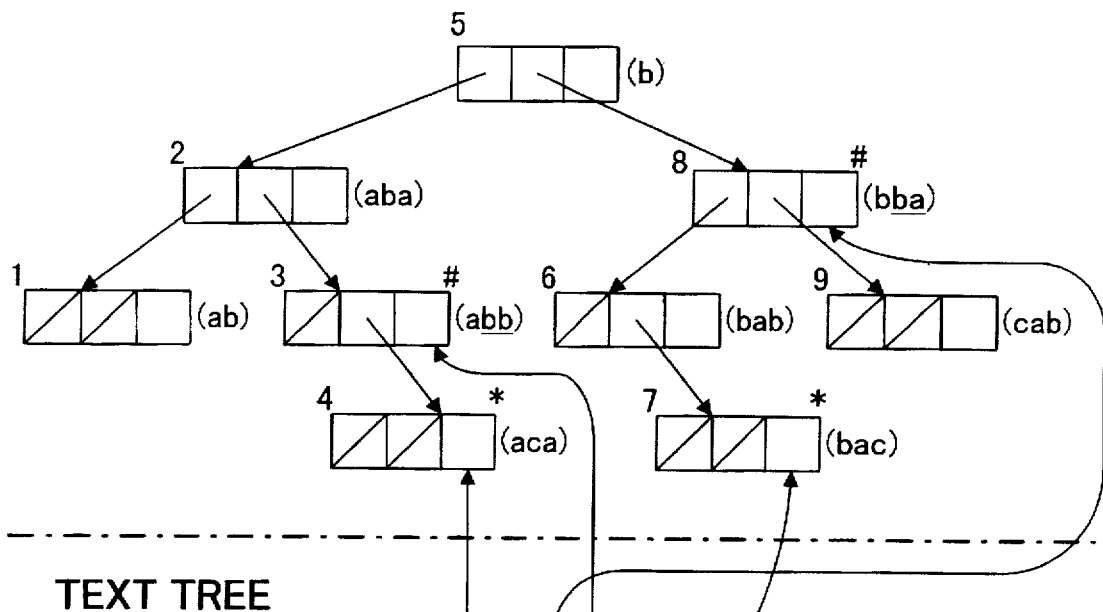
FIG. 4 is a diagram showing the data structure when a character is inserted into or deleted from the first embodiment of this invention.
Figure 4:
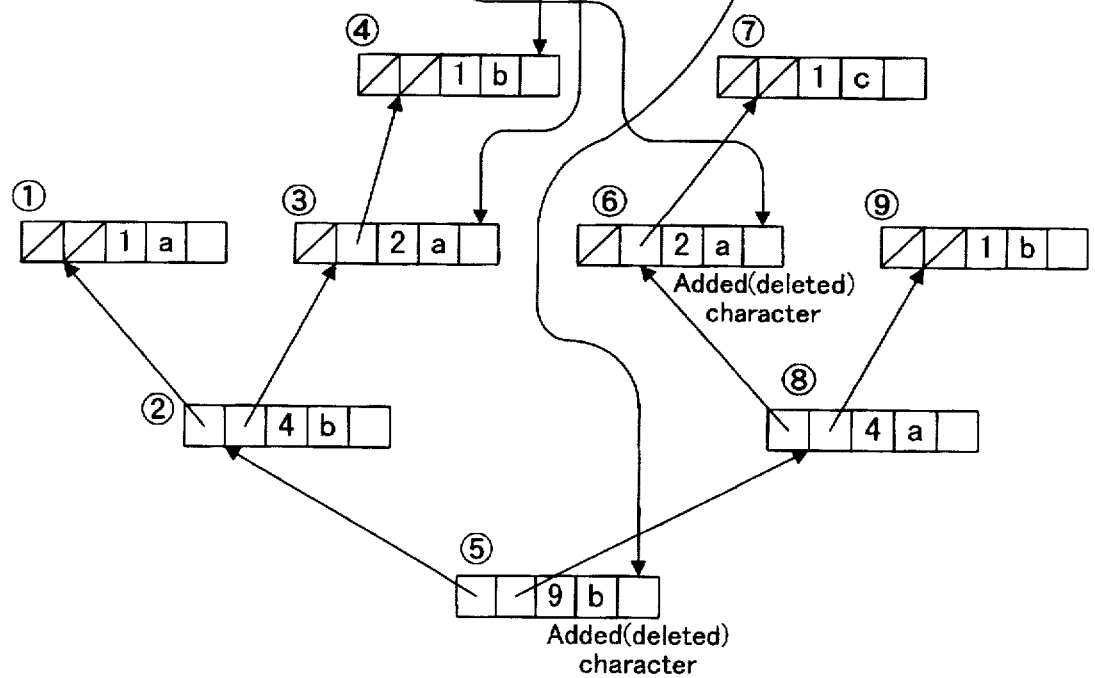

In the text tree, two new nodes, one for "b" and the other for "a", are added and the partial interval length of the node of each character is adjusted according to the "interval control method", the patent applied separately by the applicant of this patent, as shown in FIG. 4. Also, a pointer from a node added to the dictionary tree to a node added to the text tree is added. The "interval control method" will be described later in detail.

FIG. 4 shows the dictionary tree and the text tree to which the character string "ba" has been added. In the text tree, the character "b" is added to position 5 (the root node after change), and the character "a" to position 6. In the dictionary tree, although "abc" in FIG. 2 is changed to "abb" (Remember that the dictionary tree does not contain a key itself), the pointer need not be changed because, as described above, it remain unchanged after insertion. Similarly, although "bca" in FIG. 2 is changed to "bba", the pointer need not be changed because it remains unchanged. In the dictionary tree, the nodes representing "bac" and "aca", which are added to the dictionary table, are added, with the pointers pointing to positions 5 and 6 in the text tree, respectively. Note that, for simplicity, only the pointers associated with the above discussion are shown in FIG. 4.

As explained above, when a character string consisting of one or more characters is added to the text, this embodiment creates, in the dictionary tree, the nodes corresponding to the key-candidate substring added to the dictionary table as a result of the addition of this character string, and establishes the pointers between the new nodes in the dictionary tree and the nodes of the characters added to the text tree, thus changing the key-candidate substring represented by the dictionary tree automatically. Therefore, when one or more characters are added to the text, this embodiment significantly reduces the time needed to update the dictionary.

Interval Control Method

The interval control method, another patent applied by the applicant of this patent, performs the operation described below to store code strings each consisting of a plurality of intervals, to retrieve a desired code value from a code string, and to edit the retrieved code string as necessary.

[A. Configuration]

Figure 5:
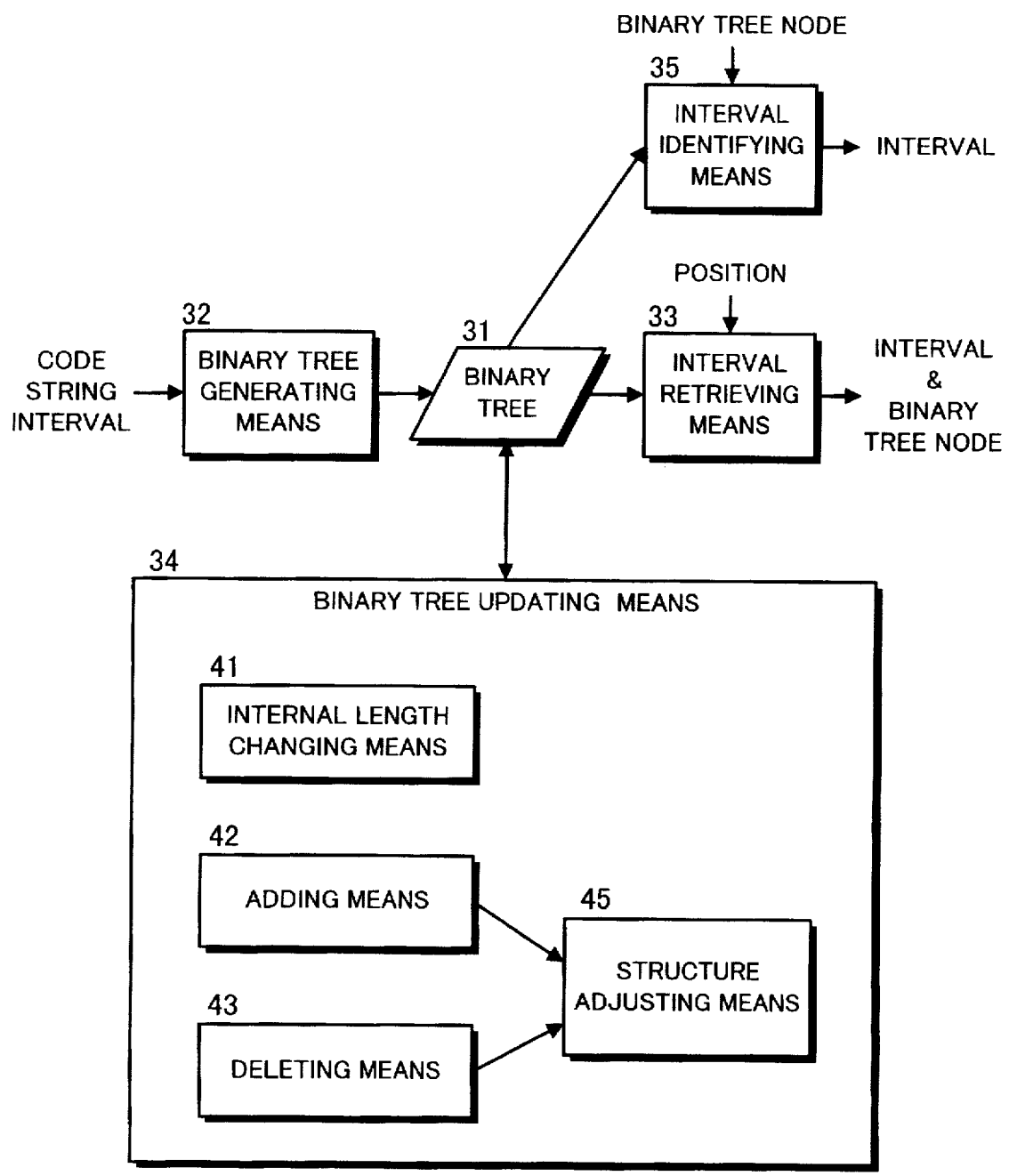
FIG. 5 is a functional block diagram showing the structure of a data processing system using an "interval control method"

As shown in FIG. 5, the data processing system using the interval control method has the binary tree generating means 32 for generating the binary tree 31 representing the range of each interval based on the intervals in a code string, the interval retrieving means 33 for retrieving an interval including to the specified position according to the binary tree 31, the binary tree updating means 34 for updating the binary tree 31 according to the contents of a change when an interval is changed, and the interval identifying means 35 for identifying the interval (and position) according to the binary node.

The binary tree updating means 34, in turn, has the interval length changing means 41 for changing an interval length, the deleting means 43 for deleting a node corresponding to a deleted interval, and the adding means 42 for adding a node corresponding to an added interval. In addition, the data processing system has the structure adjusting means 45 for adjusting the structure of a binary tree by changing the connection sequence of the nodes.

[B. Operation and Effects]

The data processing system which has the above configuration performs the following operation: that is, it allows the user to store a code string containing a plurality of intervals, to obtain a code value at a specific position within a code string, and to edit a code string as he or she wants.

[B-1. Generating a Binary Tree]

First, the binary tree generating means 32 generates the binary tree 31 representing the range of each interval according to the intervals in the code string. The binary tree may also be generated, with the use of the adding means 42, by adding a node each time an interval is entered. A code string and the intervals may be entered, for example, via the keyboard. The binary tree 31 is a tree-like data structure consisting of nodes, each corresponding to an interval, connected from the root to the ends. On the end side of each node, the preceding node, which corresponds to the preceding interval of the node and/or the following node, which corresponds to the following interval of the node, is connected. And, in each node, the sum of the interval length of the node itself and the total interval length of the nodes on the end side of the node (sub-tree), is set. This sum is called a partial interval length.

Figure 6:
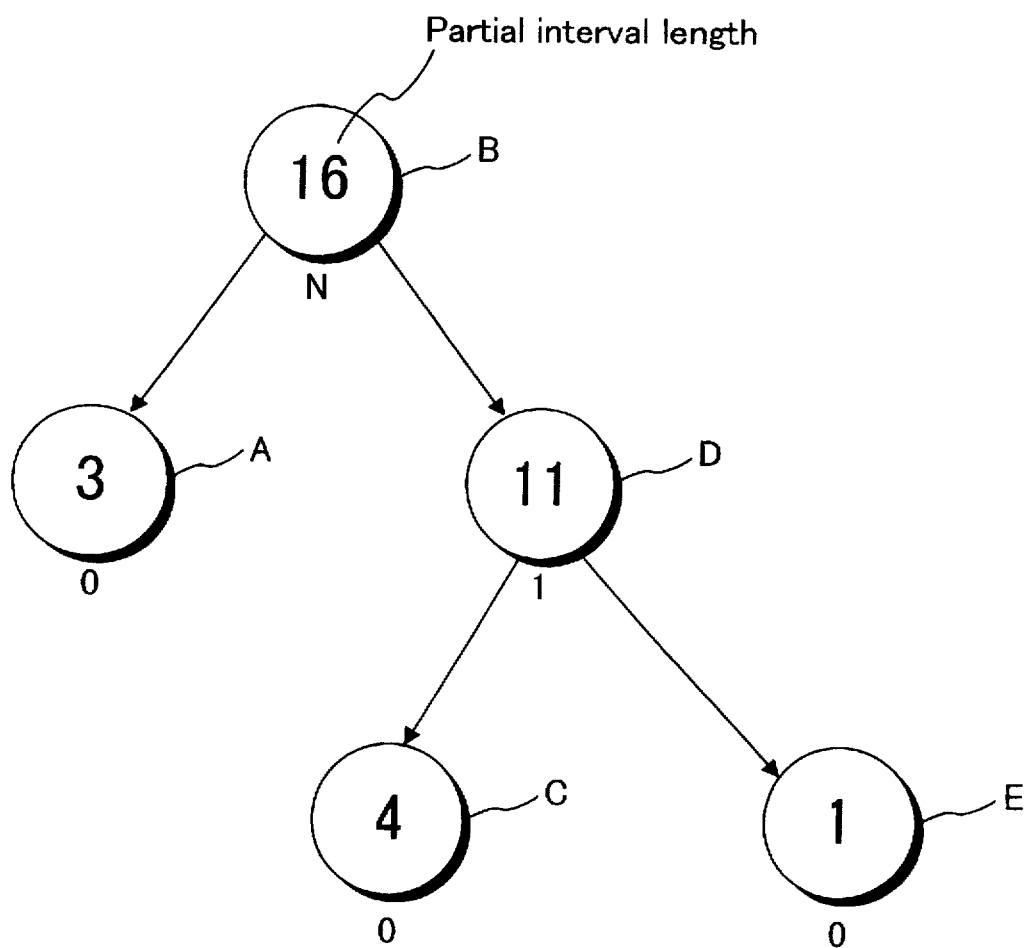
FIG. 6 is an example of a binary tree in a data processing system using the "interval control method"
Figure 7:
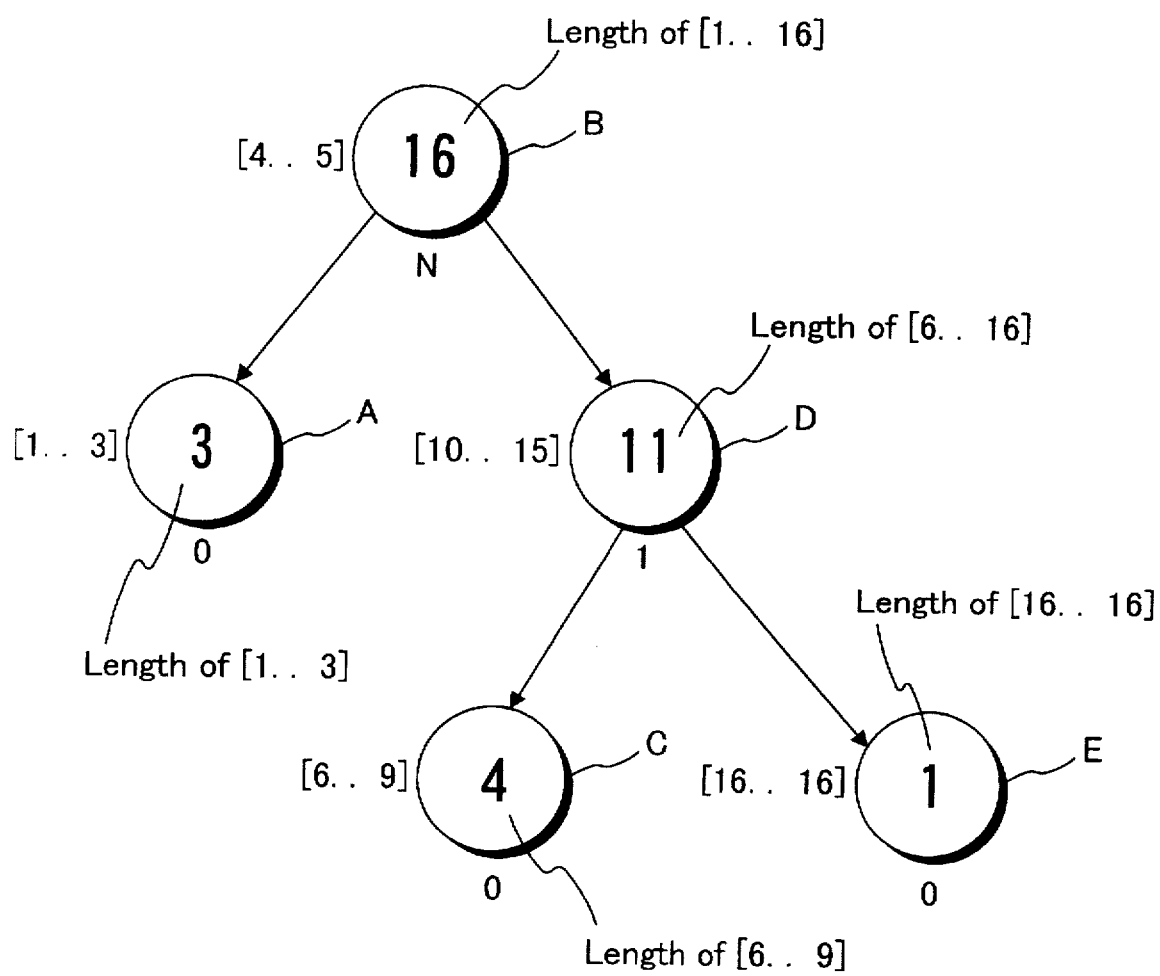
FIG. 7 is a diagram illustrating a binary tree in a data processing system using the "interval control method"

FIG. 6 shows an example of the binary tree 31, and FIG. 7 explains the binary tree 31 in FIG. 6. These figures indicate the interval length and the code value, shown in FIG. 8, in the binary tree. The binary tree 31 is a tree, consisting of nodes A, B, C, D, and E corresponding to the intervals [1 . . . 3], [4 . . . 5], [6 . . . 9], [10 . . . 15], and [16 . . . 16] respectively, connected with node B as the root.

In each of nodes A, B, C, D and E, the partial interval lengths 3, 16, 4, 11, and 1, each representing the sum of the length of the node itself and the total of the lengths of the nodes on the end side of that node are set. For example, as shown in FIG. 7, in node D, the sum (11) of the length (6) of the interval [10 . . . 15] corresponding to node D and the total of the lengths (4 and 1) of the intervals [6 . . . 9] and [16 . . . 16] is set.

The data processing system using the interval control method, which has one node for each interval as described above, requires as many data blocks as intervals and so eliminates the need to use as many memory units as there are nodes, thereby increasing memory usage efficiency. In particular, a binary tree in which data storage areas for the nodes are connected by pointers does not require a large consecutive area and therefore uses memory efficiently. The ability to use a precision most suitable for each interval allows the user to use any type of interval data such as floating-point data.

In this data processing system, the position of the interval of a node can be calculated, during retrieval or some other processing, based on the interval length of the preceding node. The net interval length of a node can be calculated by subtracting the total of the interval lengths of the preceding and following nodes, contained in the sub-tree connected to the node, from the partial interval length of the node. The interval length of the preceding (following) nodes can be obtained from the partial interval length of the left (right) child. Therefore, the code at a specific position within a code can be identified easily by comparing the specified position with the position and the interval length of each node.

Thus, the interval position of a node can be calculated by the total of the interval lengths of the preceding nodes. And, the positional relation among nodes can be represented by the relation among nodes, the position of each node being calculated by the partial interval length of other nodes. This means that a change in part of an interval affects only the changed node and one or more nodes on the path from that node to the root, thus simplifying the change procedure. More specifically, even when the length of an interval is changed, the required data processing time is approximately proportional to the logarithm of the number of intervals.

[B-2. Retrieval]

Figure 9:
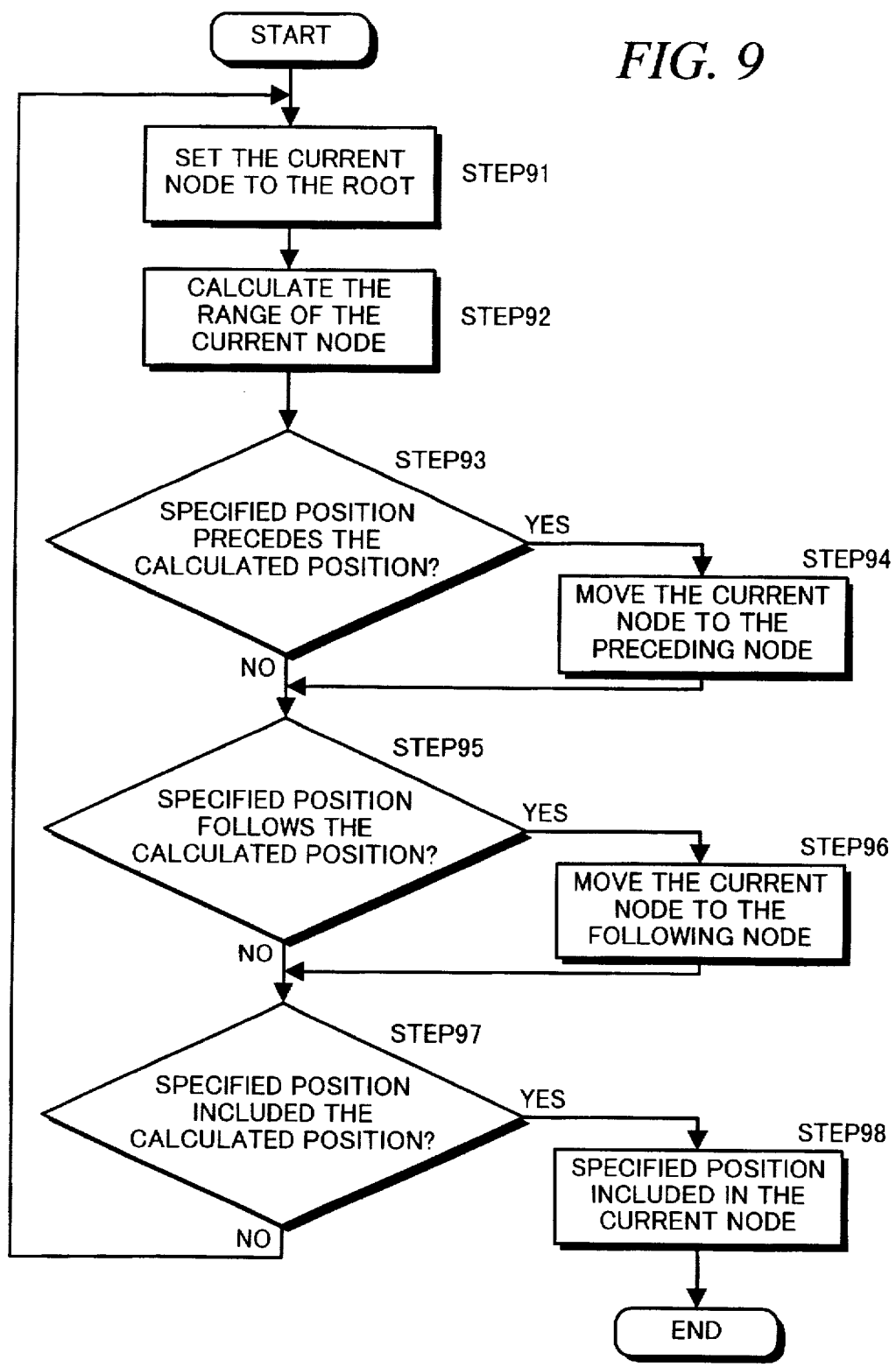
FIG. 9 is a flowchart showing the procedure for retrieving data in a data processing system using the "interval control method"

Using this data processing system, the user will be able to retrieve and so on, as described below. As shown in FIG. 9, to identify the interval to which a specific position within the code string belongs during retrieval or some other processing, the interval retrieving means 33 performs the following procedure while moving the current node pointed to by the pointer from the root (step 91) to lower-level nodes, one level at a time.

The interval retrieving means 33 calculates the range of the current node based on the interval lengths of the current node and the lower-level nodes (step 92), and compares the calculated range with the specified position. If the specified position precedes the calculated range (step 93), the interval retrieving means 33 moves the current node to the preceding node (step 94); if the specified position follows the calculated range (step 95), the interval retrieving means 33 moves the current node to the following node (step 96); if the specified position is included in the calculated range (step 97), the specified range is included in the current node (step 98).

Figure 10:
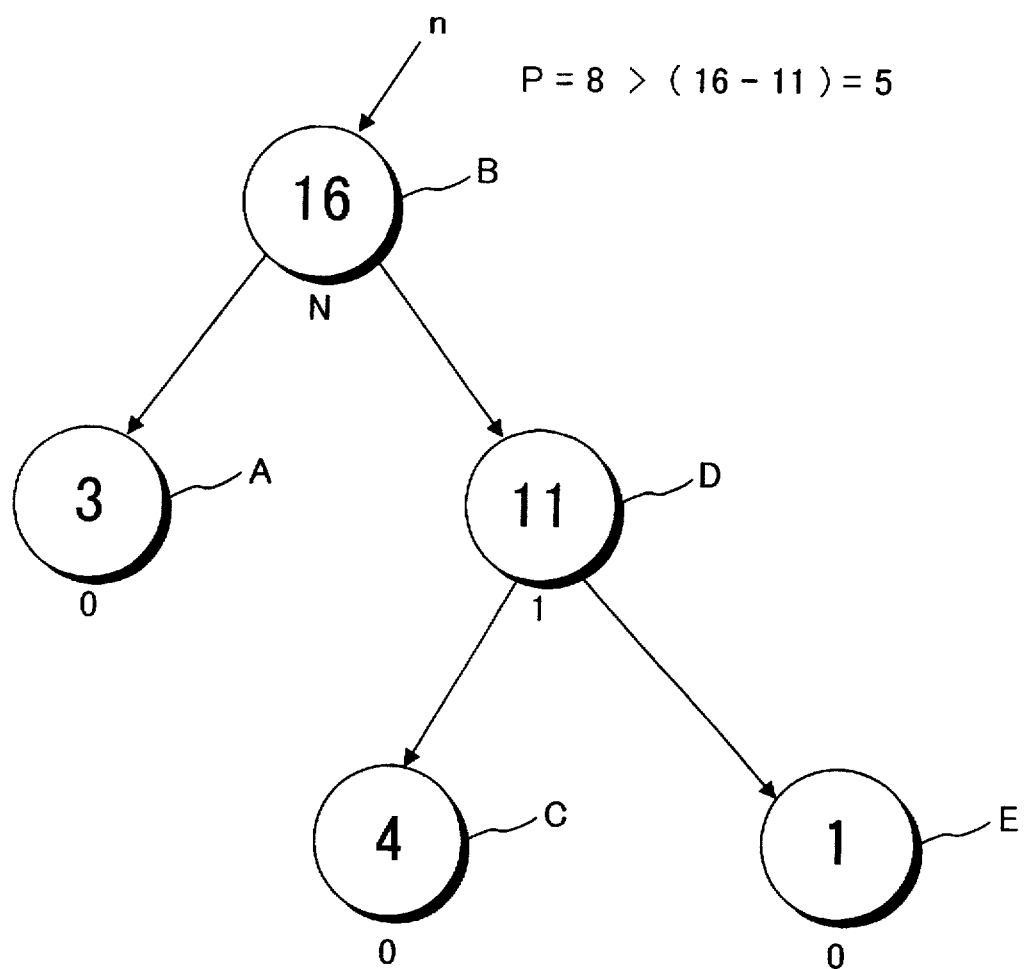
FIG. 10 is an example of a binary tree in a data processing system using the "interval control method" (retrieval)

For example, the node corresponding to the interval containing the specified position 8 is identified by following operation. As shown in FIG. 10, if node B is the current node, the interval lengths included in node A and node B is 5 (16−11=5). Thus, the interval length 5 is smaller than the specified position 8. So, it determined that the specified position 8 belongs in the right side of node B.

Figure 11:
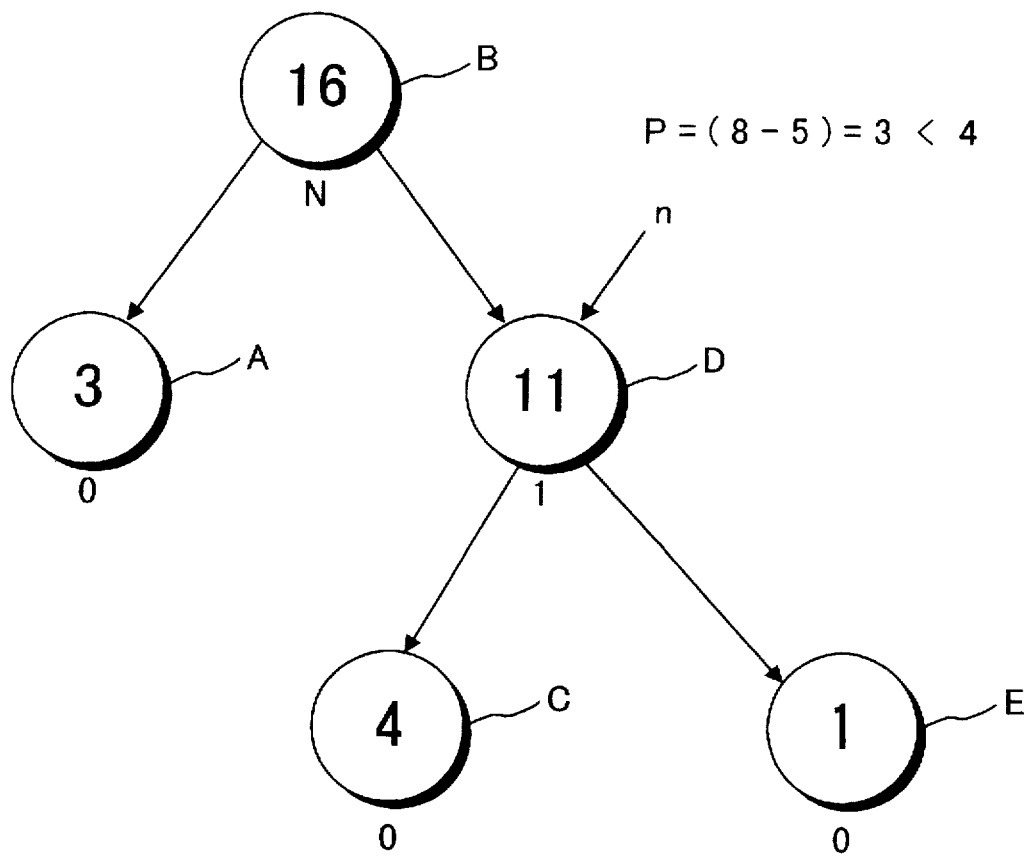
FIG. 11 is an example of a binary tree in a data processing system using the "interval control method" (retrieval)
Figure 12:
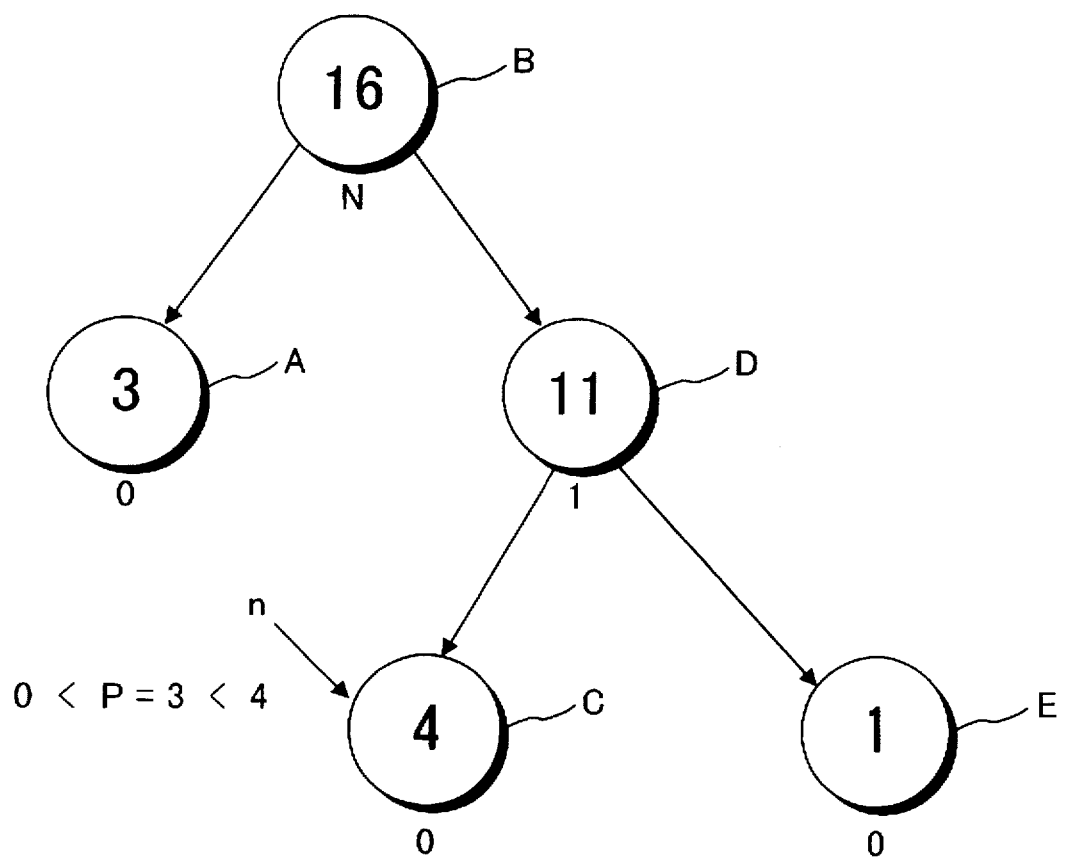
FIG. 12 is an example of a binary tree in a data processing system using the "interval control method" (retrieval)

Then, as shown in FIG. 11, the current node is moved to node D. In this case, the parameter P, indicated the specified position, becomes 3 (P=8−5=3). This parameter P (3) is smaller than the interval length (4) of node C which is the preceding node of node D. So, as shown in FIG. 12, it determined that the node corresponding to the interval containing the specified position 8 belongs in node C.

As described above, in the data processing system using the interval control method, the interval retrieving means 33 compares the specified position with the range of the current node while moving the current node downward, one level at a time, from the root. This simple procedure identifies an interval containing the specified position, facilitating various types of processing such as retrieval.

[B-3. Interval Identification]

In the data processing system using the interval control method, it is also possible to identify an interval corresponding to a node that is specified. A right interval or a left interval (total interval) means that the specified interval is on the right or on the left of the root interval.

Figure 13:
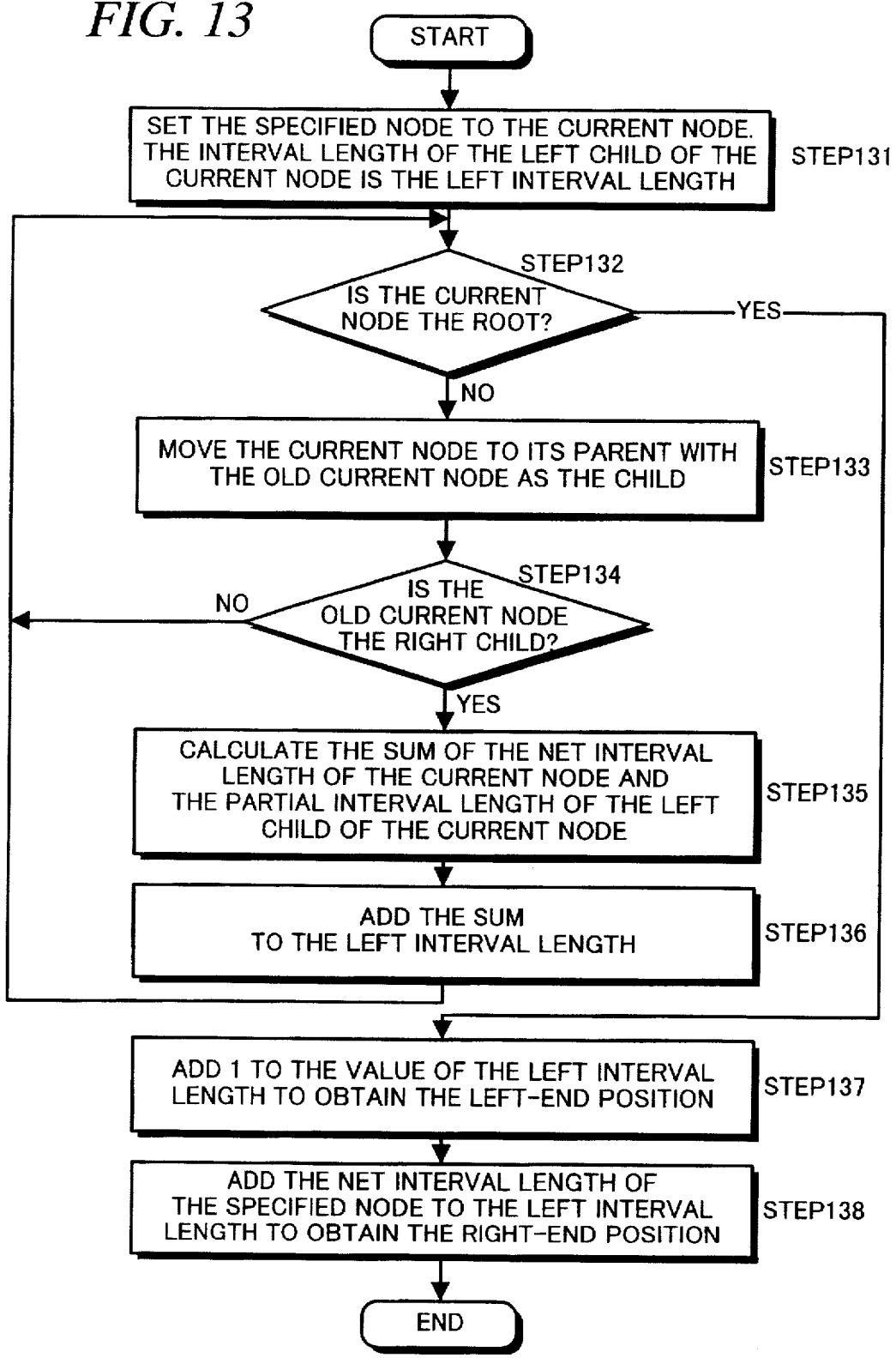
FIG. 13 is a flowchart showing the procedure for identifying an interval in a data processing system using the "interval control method"

To identify a node interval, the current node is moved sequentially from the specified node to its parent node until the root is reached. As the current node is moved, either the left interval length which is the total of the lengths of the nodes preceding the specified node or the right interval length which is the total or the lengths of the nodes following the specified node is obtained. FIG. 13 is a flowchart showing an example of a procedure for identifying the interval corresponding to the specified node.

In this procedure, the partial interval length of the left child of the current node that is specified is first set to the left interval length (step 131). Remember that the left interval (length) is the total interval (length) preceding the specified node.

Then, the following steps are repeated until the current node becomes the root (step 132). That is, the current node is moved to the parent with the old current node as the child node (step 133). At this time, when the child node, which was the old current node, is the right child of the current node (step 134), the sum of the net interval length of the current node and the partial interval length of the left child of the current node is calculated (step 135) and the sum is added to the left interval length (step 136). Note that the partial interval length of a node represents the total (interval length) of the net interval length of the nodes included in the subtree rooted at the node. The sum of net interval length of the current node and the partial interval length of the left child of the current node is calculated by subtracting the partial interval lengths of the right child( the old current node) from the partial interval length of the current node.

When the current node becomes the root (step 132), the left end of the specified node is immediately left to the left interval; that is, it is calculated by adding 1 to the left interval length (step 137). If an interval is represented in a floating-point number, the value of the left interval length is the left end of the interval. The right end of the specified node is obtained by adding the net interval length of the specified node to the left interval length (step 138).

The right interval of the specified node (total of the intervals following the interval corresponding to the specified node) begins at the position following (adding 1 to) the partial interval length of the current node, which is the root, minus the right-end value of the specified node, and ends at the end of the whole interval represented by the binary tree. This end is represented by the value of the partial interval length of the root.

Figure 14:
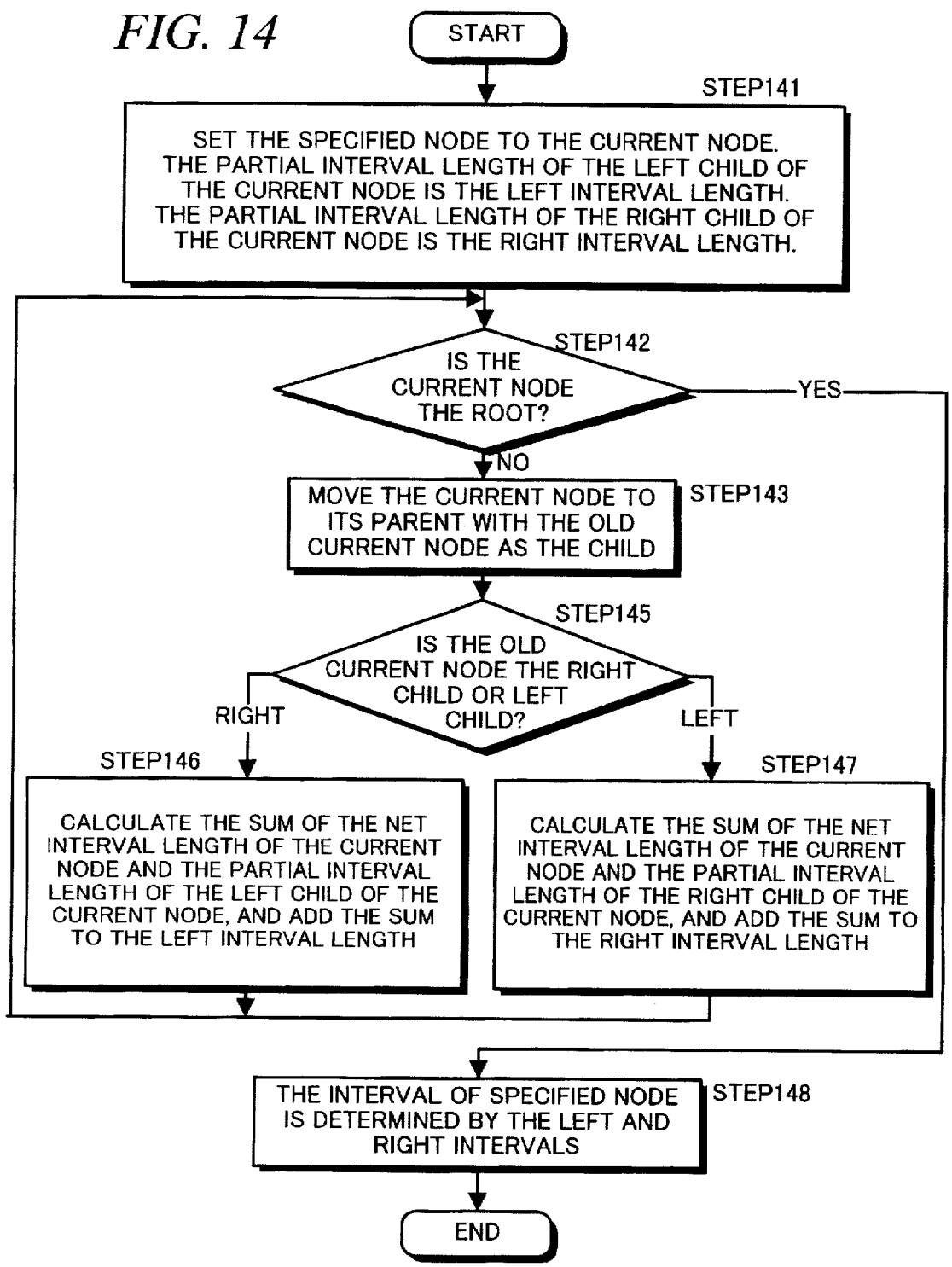
FIG. 14 is a flowchart showing the procedure for identifying an interval in a data processing system using the "interval control method"

FIG. 14 is an another example of a flowchart of a procedure for identifying an interval corresponding to the specified node. In the procedure shown in FIG. 13, the left interval that is on the left of the specified node interval is determined, and the right side of the specified node interval is calculated based on the left interval length. In the procedure shown in FIG. 14, the lengths of both the right interval and the left interval are obtained, and the interval of the specified node is determined as an interval between these two intervals.

In this procedure, the specified node is first set to the current node, with the partial interval length of the left child of the current node being the left interval length and with the partial interval length of the right child of the current node being the right interval length (step 141). Then, the following steps are repeated until the current node becomes the root node (step 142).

The current node is moved to its parent with the old current node as the child node (step 143). And, when the child node, which was the old current node, is the right child (step 145), the sum of the net interval length of the new current node and the partial interval length of the left child of the current node is added to the left interval length (step 146); when the child node, which was the old current node, is the left child (step 145), the sum of the net interval length of the new current node and the partial interval length of the left child of the current node is added to the right interval length (step 147).

The sum of the net interval length of the current node and the partial interval length of the left (right) child of the current node is calculated by subtracting the partial interval lengths of the right (left) child from the partial interval length of the current node.

When the current node becomes the root (step 142), the interval of the specified node is identified as the interval between the left interval and the right interval (step 148). The right end of the specified node may be calculated by subtracting the right interval length from the partial interval length of the root.

As described above, the sum of the net interval length of a node and the partial interval length of a child of the node is sequentially added up as the current node moves from the specified node to the root node. This process determines the position of the specified node through the interval length of a node that is right or left to the specified node. This simple procedure allows the position of the specified node to be identified, making is possible to perform various types of processing.

[B-4. Updating the Binary Tree]

When an interval is changed, the binary tree updating means 34 updates the binary tree 31 according to the contents of the change.

When the length of an interval in the code string is changed, the interval length changing means 41 changes the corresponding interval length in the binary tree 31. When an interval is deleted from the code string, the deleting means 43 deletes the node corresponding to the deleted interval from the binary tree 31. When an interval is added to the code string, the adding means 42 adds the node corresponding to the added interval to the binary tree 31.

As described above, the interval length changing means, the deleting means, or the adding means updates the binary tree 31 when an interval length is changed, an interval is deleted, or an interval is added. So, it dose not need to make the binary tree over again.

[B-4-1. Changing the Interval Length]

Figure 15:
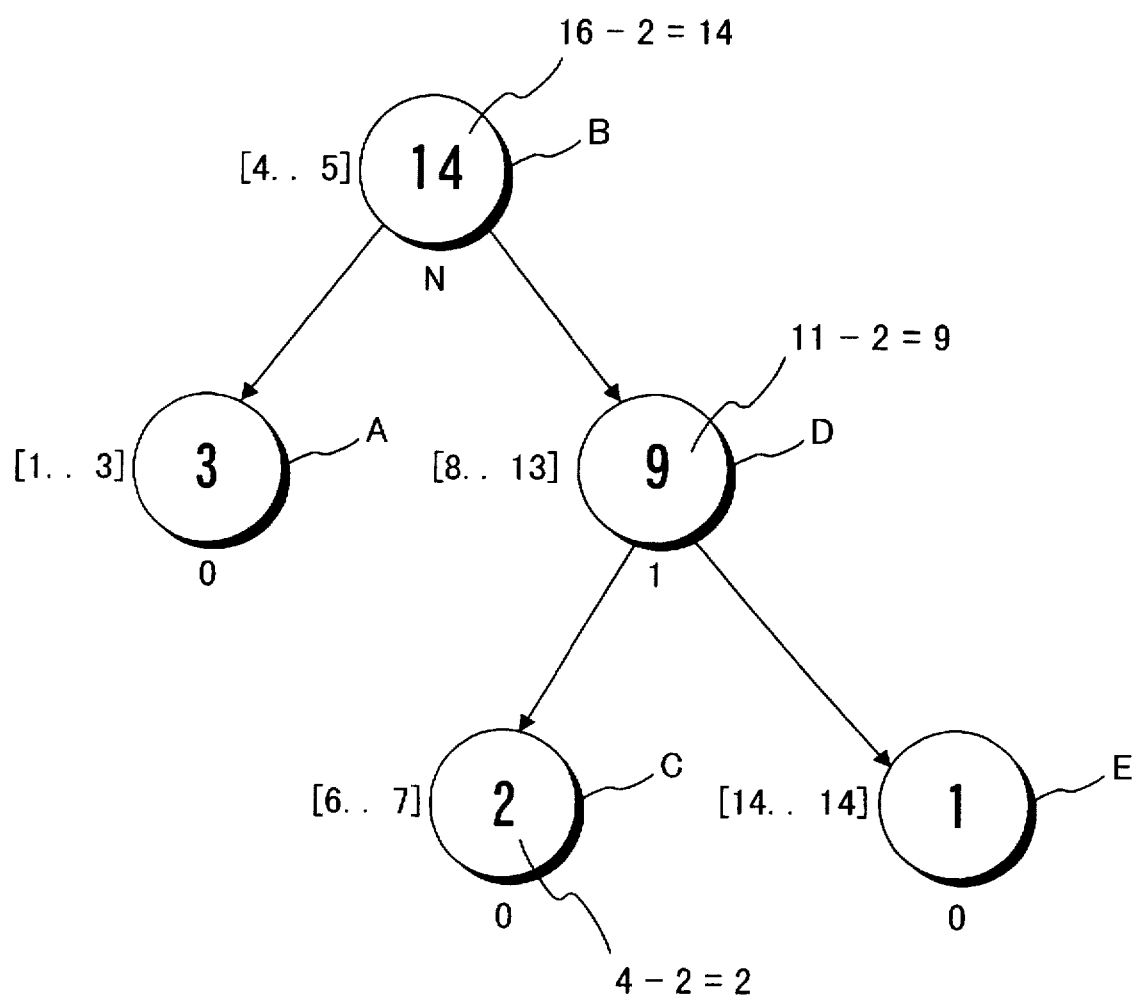
FIG. 15 is an example of a binary tree in a data processing system using the "interval control method" (interval length changed)
Figure 16:
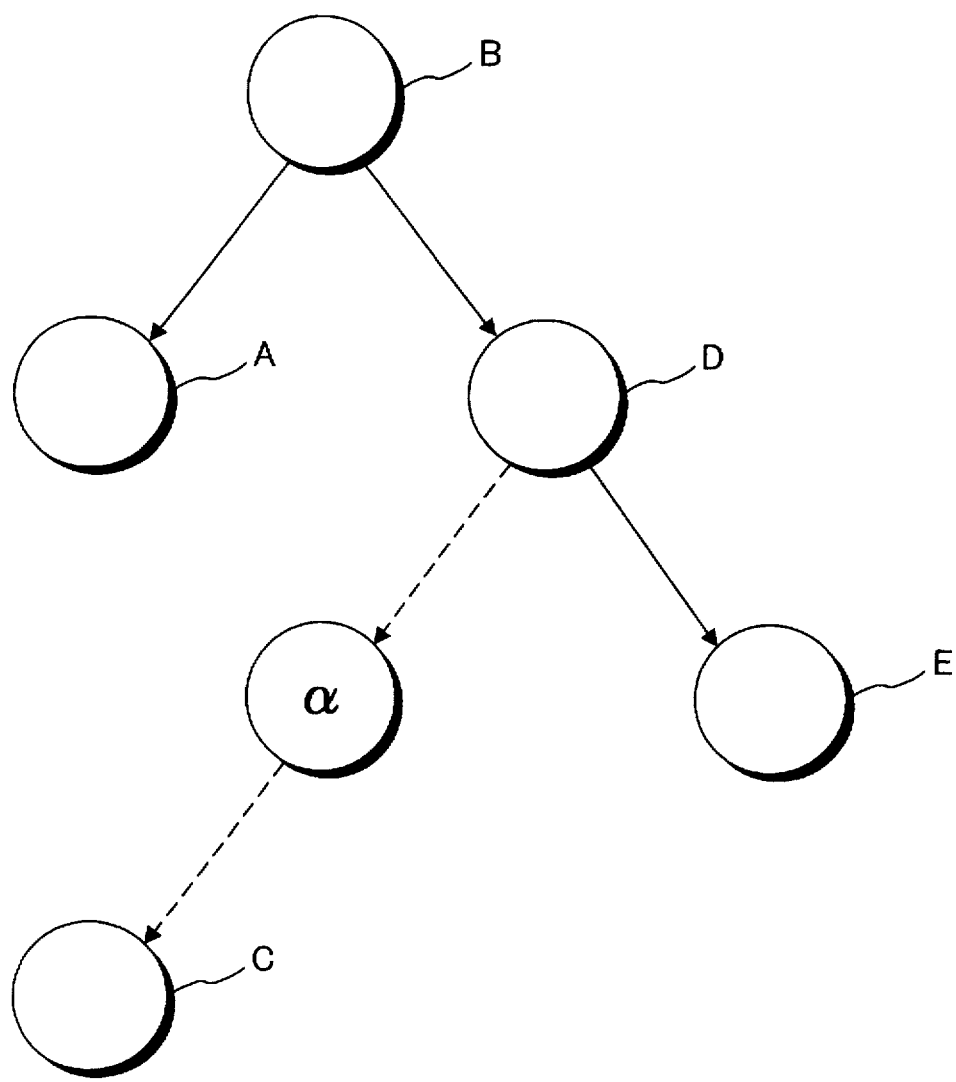
FIG. 16 is an example of a binary tree in a data processing system using the "interval control method" (interval added)

When the length of an interval is changed, the partial interval length of each node, from that node to the root, is changed by the changed value. For example, when the interval with the length of 4 ([6 . . . 9]) is changed to an interval with the length of 2 ([6 . . . 7]) in the example shown in FIG. 7, the partial interval lengths of nodes B, C, and D are reduced by 2 accordingly as shown in FIG. 15.

That is, even when the length of an interval is changed, only the nodes from that node to the root need be changed. Unlike a conventional system, the data processing system using the interval control method eliminates the need to move all the nodes corresponding to the intervals following the changed node, enhancing data processing efficiency.

[B-4-2. Adding an Interval]

When adding an interval, the adding means 42 adds to the binary tree 31 a node for an interval to be added, adjusts the node connection sequence, and adjusts the interval length of each node.

Any known method for adding a node may be used instead. For example, in FIG. 7, when an interval [10 . . . 12] with the length of 3 is added before the interval [10 . . . 15] with the intervals [10 . . . 15] and [16 . . . 16] being moved to the intervals [13 . . . 18] and [19 . . . 19], respectively, the new node is added in one of three ways shown in FIGS. 13, 14, and 15.

To adjust the interval length, the adding means 42 finds the sum of the partial interval lengths of the children (0 if there is no child) and the length of the interval to be added, and uses the result as the partial interval length of the node.

And, to each node on the path from the parent of the new node to the root, the adding means 42 adds the length of the new interval.

Figure 17:
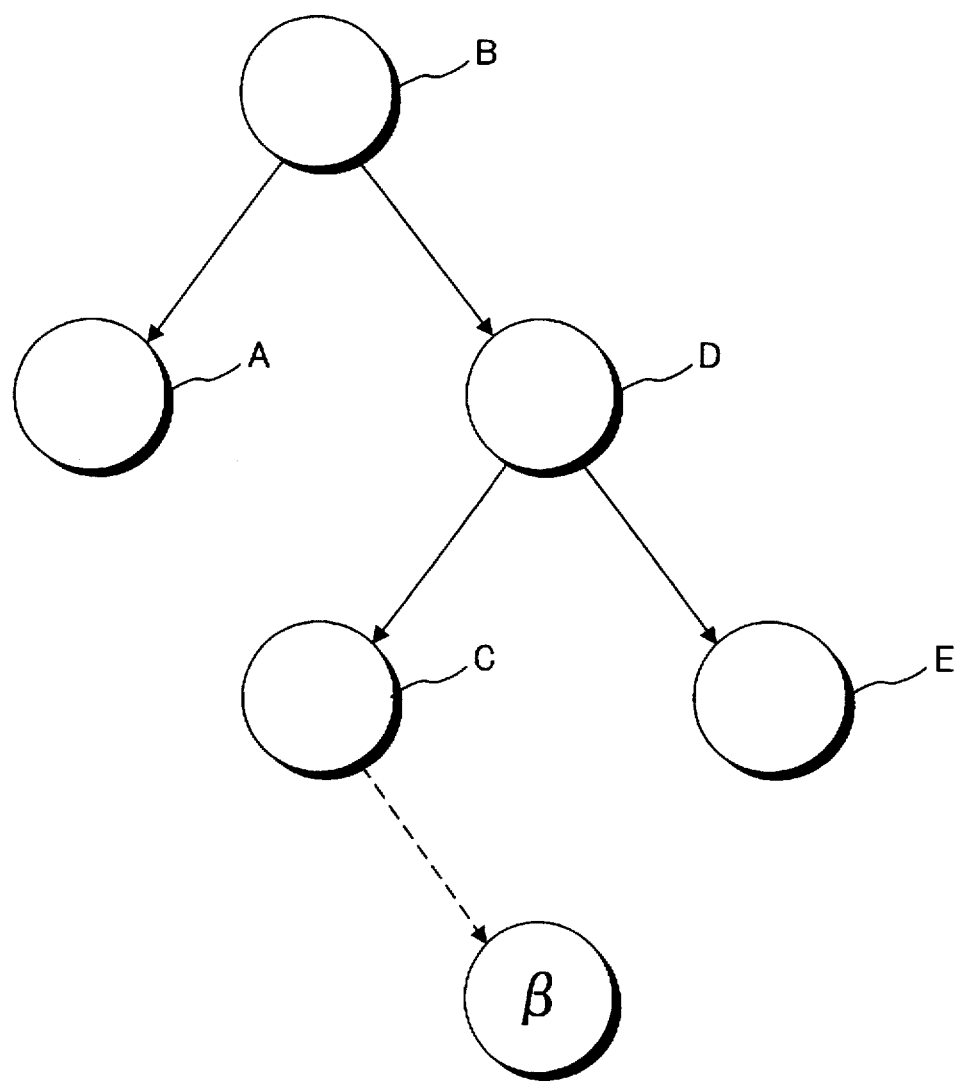
FIG. 17 is an example of a binary tree in a data processing system using the "interval control method" (interval added)
Figure 18:
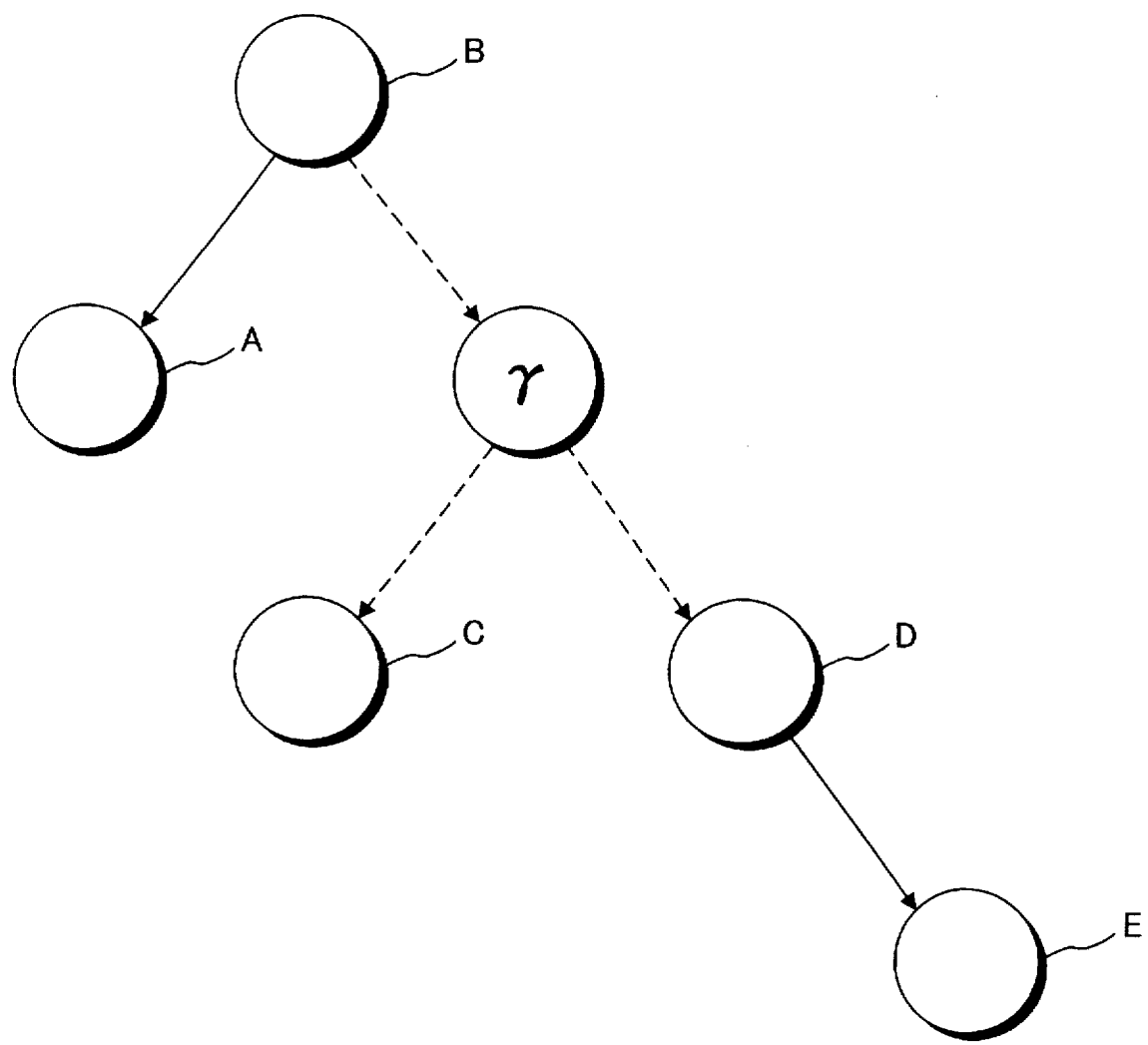
FIG. 18 is an example of a binary tree in a data processing system using the "interval control method" (interval added)
Figure 19:
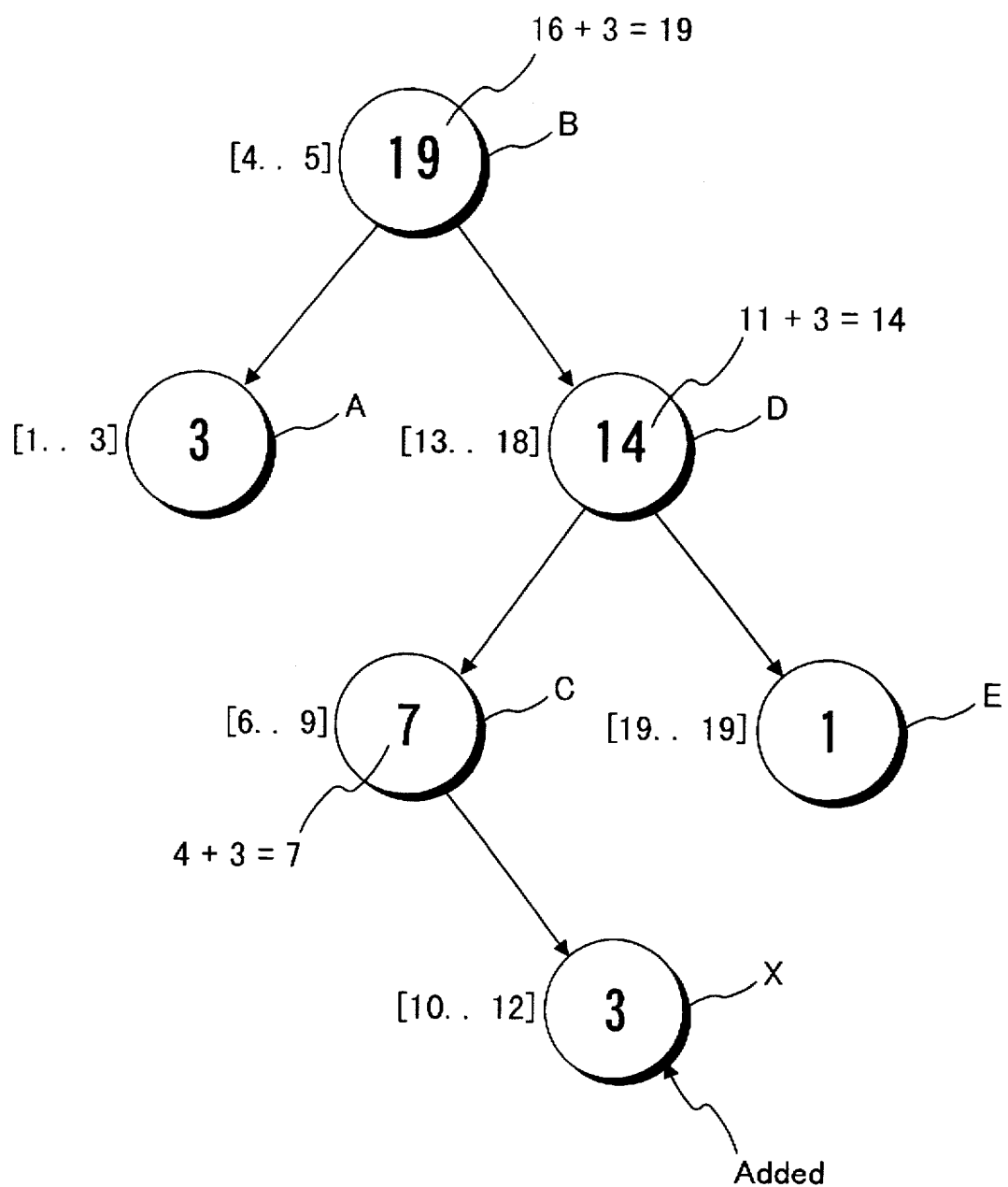
FIG. 19 is an example of a binary tree in a data processing system using the "interval control method" (interval added)

In this data processing system, the interval lengths are adjusted simply by adding the length of the new interval to each node on the path from the parent of the added node to the root. FIG. 19 shows the binary tree 31 to which a new node has been added at the position β shown in FIG. 17.

[B-4-3. Deleting an Interval]

When deleting an interval, the deleting means 43 deletes from the binary tree 31 the node corresponding to the interval to be deleted, adjusts the connection among the nodes, and adjusts the partial interval lengths.

Figure 20:
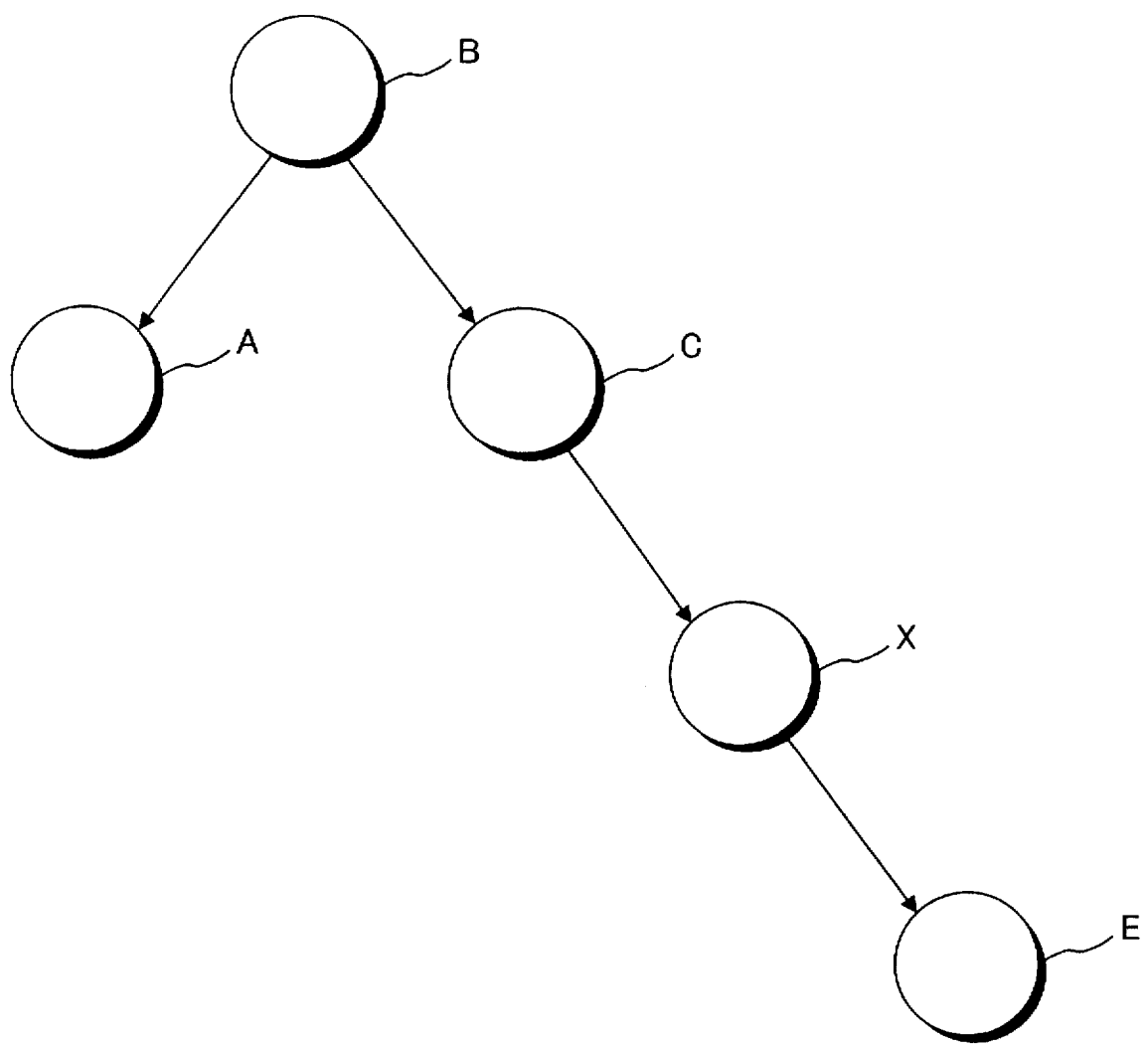
FIG. 20 is an example of a binary tree in a data processing system using the "interval control method" (interval deleted)
Figure 21:
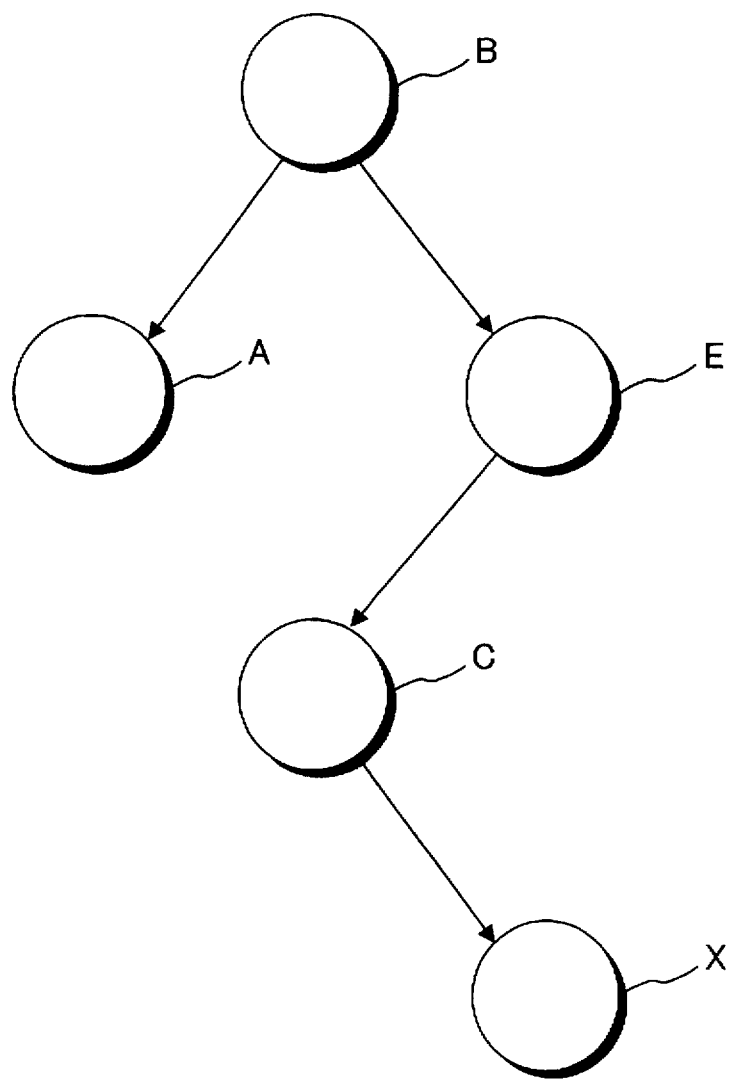
FIG. 21 is an example of a binary tree in a data processing system using the "interval control method" (interval deleted)

Any known method for deletion and adjustment may be used instead. For example, when node D is deleted from the binary tree 31 in FIG. 19, the structure after deletion may be the one shown in FIG. 20 or the one shown in FIG. 21.

[B-4-4. Adjusting the Structure]

When adding or deleting an interval, the structure adjusting means 45 changes the connection sequence of nodes to maintain the balance of the number of nodes in the binary tree 31.

This structure adjustment method prevents only a particular part of the binary tree 31 from being increased, making a plurality of paths, each from the root to a node, approximately equal in length. In this way, it prevents the data processing time from being increased just because the associated path is too long, thereby making various types of data processing, such as retrieval or update, more efficient. Another structure adjustment method eliminates variations in processing times of retrieval, addition, and deletion for a binary tree.

Structure adjustment is necessary for node deletion, addition, or reference. A plurality of structure adjustment methods are known. Any of them may be used. The length of a path from the root to a node is usually proportional to the logarithm of the total number of nodes. For this reason, the time required for processing, such as retrieval, interval length adjustment, and structure adjustment, is approximately proportional to the logarithm of the total number of intervals.

The following explains this embodiment again:

[1-2-1-4. Deleting a Character String from the Text]

To delete a character string from the text, this embodiment performs the insertion procedure described above in the reverse order.

Assume that the character string "ba" is deleted from the text "ababbacab". First, the items (bac-567, aca-678) starting in one of the characters of the character string "ba", which is to be deleted, are deleted from the dictionary. Then, the items (abb-345, bba-456) containing the start character ("b" in position 5) of "ba", which is to be deleted, are changed to the substrings after deletion (abc-345, bca-456), and are re-arranged in the dictionary. Note that this change does not apply to the substrings already deleted. For the text data, "ba" is deleted from the text "ababbacab", and the position of the following substring (cab-789) is adjusted to the position of cab-567. The updating means 12 shown in FIG. 1 does this processing. The following table shows how the text data 6 and the dictionary data 2 have been changed:

[TABLE 5]

| (Text) | | |
|---|---|---|
| ababbacab<br>123456789 | → | ababcab<br>1234567 |

[TABLE 5]-continued (Dictionary)

| Key-candidate substring | Start position |
| --- | --- |
| a b | 6 |
| a b a | 1 |
| #a b c | 3 |
| b | 7 |
| b a b | 2 |
| #b c a | 4 |
| c a b | 5 |

(# indicates a changed item)

The following explains the dictionary tree and the text tree using FIG. 4. A node in the dictionary tree contains, not a key itself, but a pointer to the corresponding node in the text tree. Comparing the substrings before deletion (b ba-456, abb-345) with those after deletion (bca-456, abc-345) indicates that the pointers to the nodes in the text tree remain unchanged. This means that, after deletion, there is no need to change a pointer, both forward and backward, between a node in the dictionary tree and the corresponding node in the text tree.

In the text tree, the above-mentioned "interval control method" is used to delete two nodes corresponding to the characters to be deleted, one for "b" and the other for "a", and to adjust the partial interval length of the node representing the position of each character.

As explained above, when a character string consisting of one or more characters is deleted from the text, this embodiment deletes, from the dictionary tree, the nodes corresponding to the key-candidate substring deleted from the dictionary table as a result of the deletion of this character string, and deletes the pointers between the nodes deleted from the dictionary tree and the nodes of the characters deleted from the text tree, thus automatically changing the key-candidate substring represented by the dictionary tree. Therefore, when one or more characters are deleted from the text, this embodiment significantly reduces the time needed to update the dictionary.

[1-3. Effects of the First Embodiment]

In the first embodiment, the time needed to retrieve items from the dictionary or to add or delete one item to or from the dictionary is proportional to the logarithm of the total number of items in the dictionary. Similarly, the time needed to add or delete one character to or from the text tree is proportional to the logarithm of the total number of text characters (or the number of nodes in the tree).

Thus, when a character string is inserted or deleted, the data structure is adjusted for use in retrieval within the time calculated by the following formula:

(Length of a character string to be changed+Length of a substring used as a key)×log {Total number of characters (Number of nodes in the tree)}

If (Length of a character string to be changed+Length of a substring used as a key) in the above formula is a constant not too large which does not depend on the length of the whole text, then it can be said that the update operation on this data structure can be done in a time proportional to the logarithm of the text length. In addition, the high-speed update of data for retrieval makes data processing more speedily and the processing procedure simpler.

[1-4. Variation of the First Embodiment]

A data retrieval system, described below, comprising some components of the data processing system in this embodiment may be built.

That is, a data retrieval system comprising: dictionary data generating means for arranging lexicographically the leading strings used for retrieving trailing strings each of which is a trailing part of a code string on which retrieval is made with the use of a key string and for generating dictionary data representing pairs each consisting of a leading string and its position within the code string; dictionary tree generating means for generating a dictionary tree, which is a binary tree, based on the dictionary data; text data generating means for generating text data based on the code string; and retrieving means for retrieving trailing strings, each containing the whole or a part of a key string as a leading string, based on said dictionary tree.

This simply-structured data retrieval system with the configuration described above finds, within the text, the positions of all the non-duplicating appearances of a pattern to be retrieved.

Another variation of the above-mentioned data retrieval system may be built by further adding a text tree generation means for generating a text tree, which is a binary tree, based on the text data. This data retrieval system retrieves trailing strings, each having the whole or a part of a key string as a leading string, based on the dictionary tree and the text tree.

This data retrieval system with the configuration described above finds, within the text, the positions of all the non-duplicating appearances of a pattern to be retrieved even when the text is changed.

[2. Second Embodiment]

It is an object of the second embodiment to provide a data processing system which stores less character strings in the dictionary and text and, therefore, requires a smaller storage area.

[2-1. Configuration of the Second Embodiment]

This embodiment simplifies the dictionary tree 4 and the text tree 8 and thus reduces the storage area with the use of the dictionary tree generating means 5 and text tree generating means 9 shown in FIG. 1.

That is, in this embodiment, only the substrings—leading strings—that are likely to be retrieved are registered in the dictionary; those substrings not likely to be retrieved are not registered. This configuration makes the dictionary smaller. For example, in the text "ababcab", if there is no need to retrieve a character string beginning with "b", three substrings beginning with "b", that is, "b", "bab", and "bca", are not registered in the dictionary; only four items beginning with "a" or "c", that is "ab", "aba", "abc", and "cab", need to be registered. The following shows the contents of the dictionary and text:

[TABLE 6]

(Text)

a b a b c a b
1 2 3 4 5 6 7

(Dictionary)

| Key-candidate substring | Start position |
| --- | --- |
| a b | 6 |
| a b a | 1 |
| a b c | 3 |
| c a b | 5 |

[2-2. Operation And Effects of the Second Embodiment]

The second embodiment having the configuration described above performs operation as follows.

[2-2-1. Storing the Text in the Dictionary]

In this embodiment, a pointer is used to associate the positional element of each character in the text with the corresponding item in the dictionary. This enables the user to determine in which tree, text or dictionary, the characters are to be stored. For example, in the example shown in FIG. 2 of embodiment 1, the characters are stored in the text tree.

Figure 22:
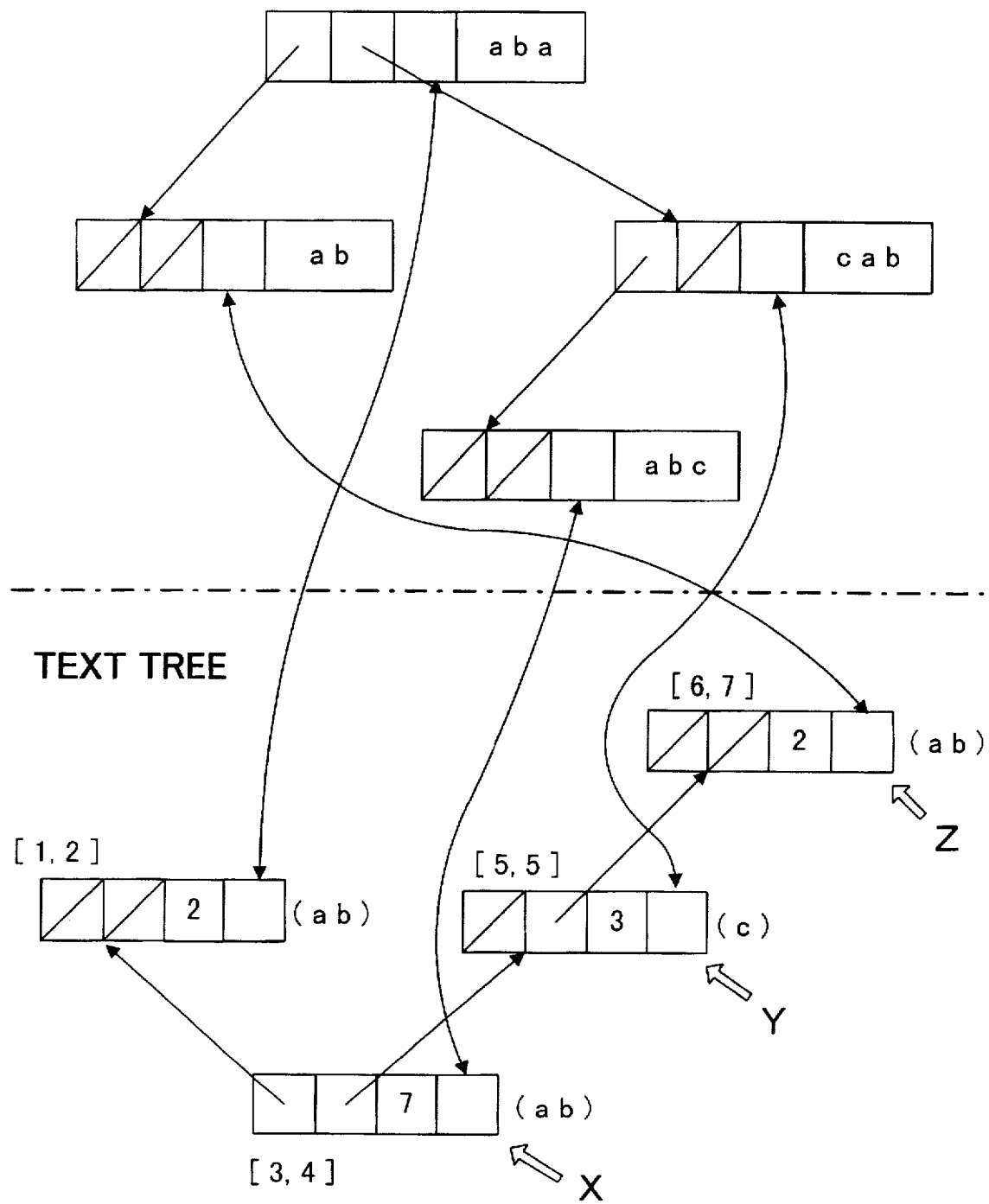
FIG. 22 is a diagram showing the data structure in the second embodiment of this invention.

As shown in FIG. 22, characters (strings) may also be stored in the node corresponding to a dictionary item. Note that, in FIG. 22, substrings beginning with "b" are not contained in the dictionary tree. In the text tree, the nodes with no corresponding item in the dictionary are omitted.

[2-2-2. Restoring the Text]

The data processing system in this embodiment uses the text tree and the dictionary tree alternately to restore a text beginning with a specific position. The retrieving means 10 shown in FIG. 1 is used to restore a text. For example, to restore a text beginning in position 4 in FIG. 22, the method explained in the "interval control method" is used to retrieve the node in the text tree including position 4 to get node X. In this case, position 4 is the second position of the interval [3, 4] represented by node X. Notice that the pointer in node X points to the node in the dictionary tree containing "abc". This means that the second character "b" of the character string "abc" (registered in the dictionary), which begins in position 3, is in position 4.

The character in position 5 is retrieved in one of the following two ways:

(1) Because the character "b" in position 4 is the second character "b" of the dictionary item "abc", the character "c" which follows that character is in position 5.

(2) Because position 4 is the rightmost position of the interval [3, 4], represented by node X, as described above, the first character of the substring following node Y, which corresponds to the interval [5, 5,], is in position 5. In this case, the pointer in node Y points to the node in the dictionary tree containing "cab". This means that the first character "c" of the dictionary item "cab" is in position 5.

The character in position 6 is retrieved as follows. In method (1) described above, because position 5 corresponds to the end of the dictionary item, the "interval control method" is used again to retrieve the node in the text tree corresponding to position 6 to get node Z. The first character of the character string in the interval [6, 7] represented by the node is in character 6. Again, the pointer in node Z points to the node in the dictionary tree containing "ab". This means that first character "a" of the dictionary item "ab" is in position 6. In method (2), because node Y corresponds to the interval consisting only of position 5, node Z corresponding to the next interval is retrieved in the same manner. Of course, methods (1) and (2) may be mixed as necessary.

Figure 23:
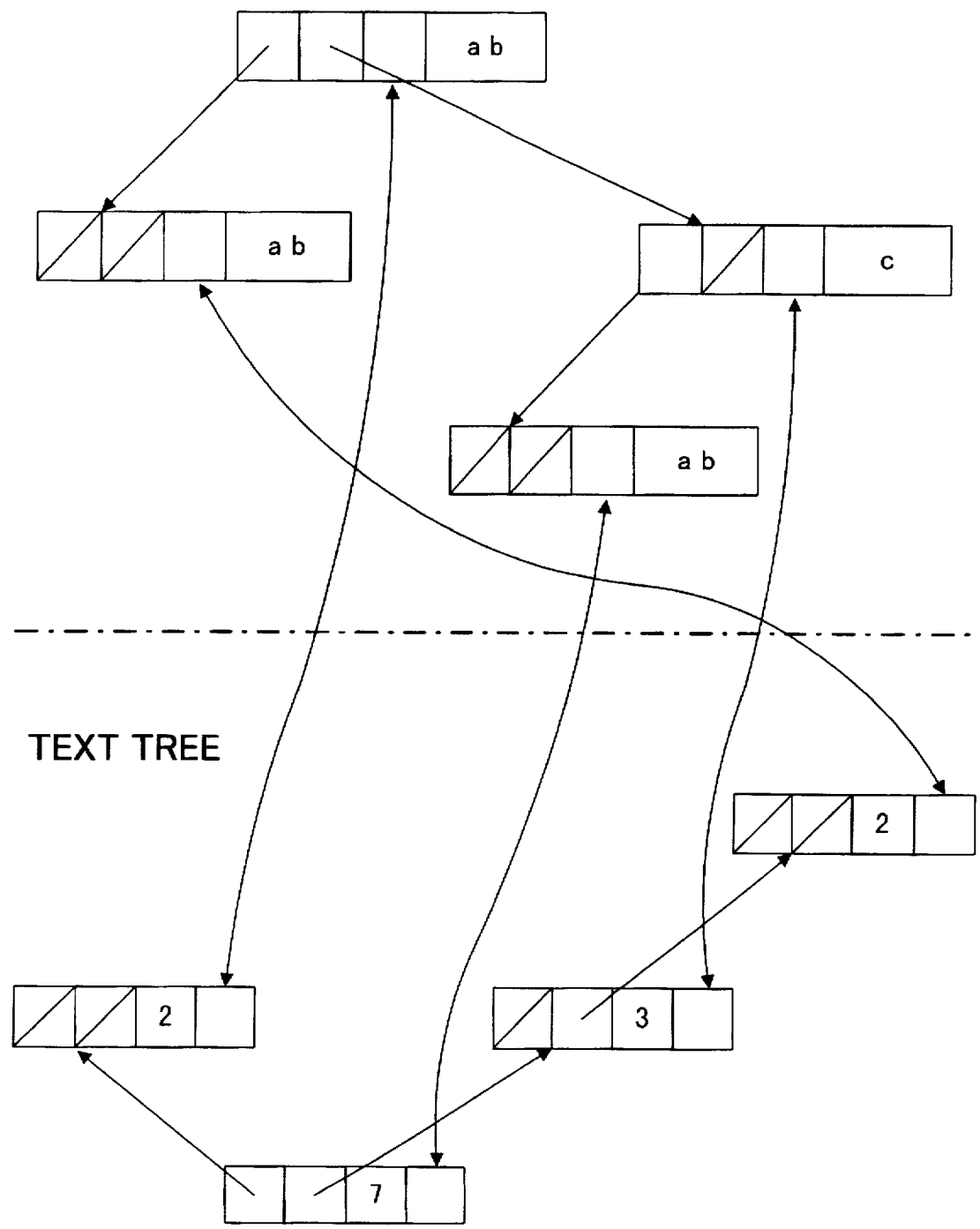
FIG. 23 is a diagram showing the data structure in the second embodiment of this invention.

When method (2) is used to "restore a text", a node in the dictionary tree needs only to contain as many characters as the item contained in the corresponding node in the text tree, as shown in FIG. 23. This is because, once a text is restored, a key can be restored. Remember that a substring registered in the dictionary tree as a dictionary item (key) is a part of the text. Therefore, in a node in the dictionary tree, all the characters in the key need not to be stored; only the characters required to restore the text need be stored. This results in a significant reduction in the space needed to store character strings of each node in the dictionary tree.

Figure 24:
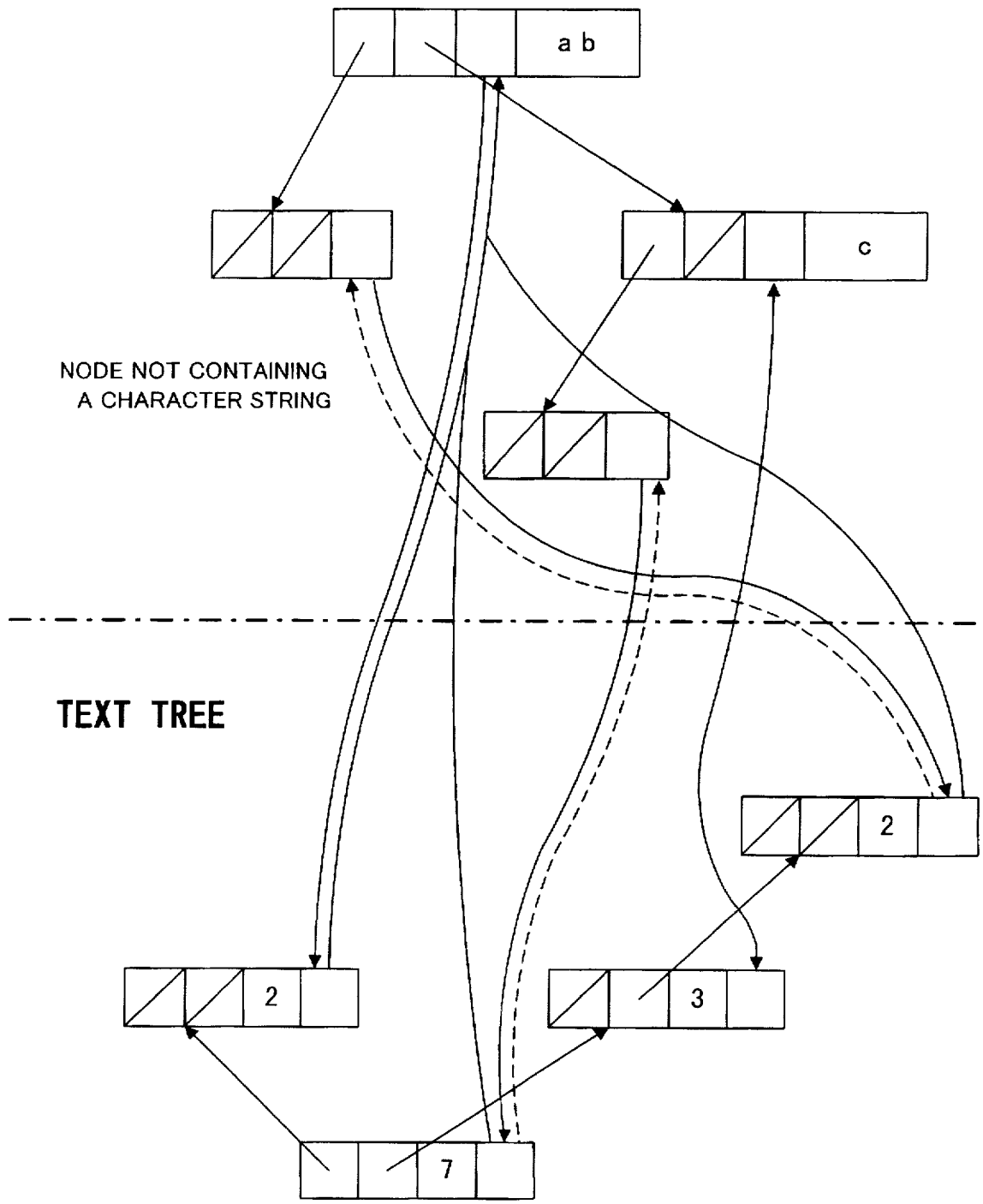
FIG. 24 is a diagram showing the data structure in the second embodiment of this invention.

In addition, notice that the character string "ab" is common to a plurality of nodes in the dictionary tree in FIG. 23. So, by storing the character string only in one node (or fewer nodes) as shown in FIG. 24, other nodes can refer to that string via the node in the text tree. This further reduces the space needed to store character strings.

In this case, although the text can be restored, the problem is that a pointer (indicated by a dotted line in FIG. 24) from a node in the text tree to the corresponding node in the dictionary tree representing the substring (key), that is, the dictionary item with the character string in that position as the leading string, is lost and that an area is required to store the pointer.

This problem may be solved by extending a key in the dictionary tree. Because the substrings in the dictionary are sorted lexicographically and because a position in the text enables the key beginning in that position to be restored (assuming that the length is known), the extended key is functionally equivalent to the pointer explained above.

The key is extended by adding a pointer value, which points to the corresponding node in the text tree, to the end of a key-candidate substring in each node in the dictionary. This extended key is used as the key. That is, if the substrings in the dictionary are sorted lexicographically, specifying a node indicating a position in the text enables the key-candidate substring beginning in that position to be restored, and searching the dictionary for a substring to which the address of the node (pointer value to that node) is added determines the node indicated by the dotted line in FIG. 24. The key may be extended simply in the comparison procedure used to add or retrieve a key to or from the dictionary tree, without having to change the configuration of nodes.

Figure 25:
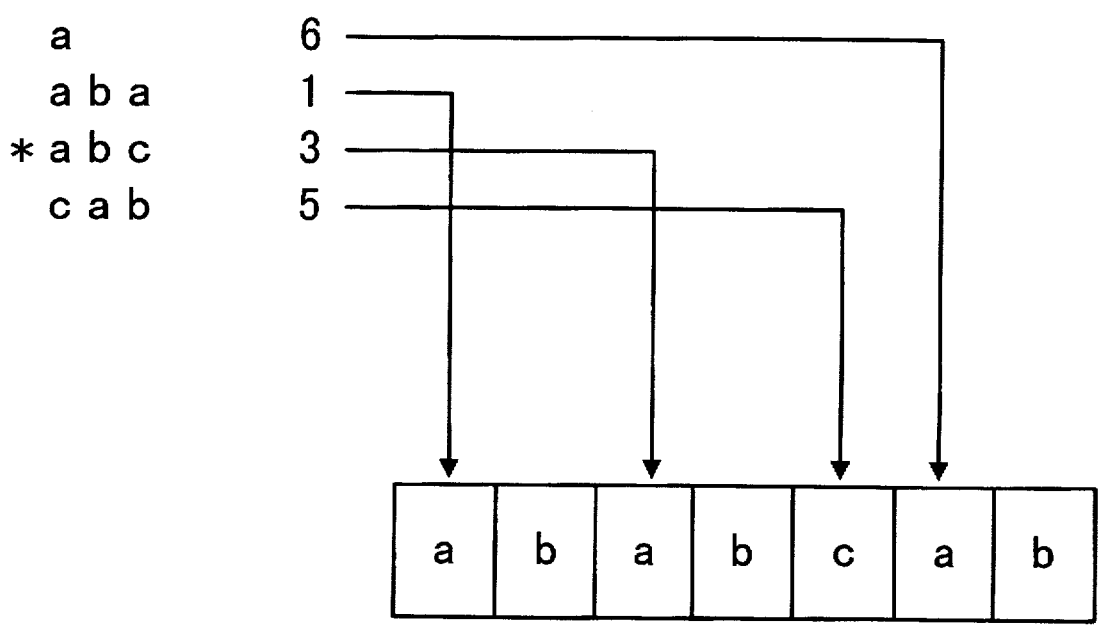
FIG. 25 is a diagram showing the data structure in the second embodiment of this invention.

FIG. 25 illustrates the items in the dictionary. Searching the dictionary for the substring to be retrieved to which the beginning address (pointer value) is added (i.e., "abc 3") results in the item "*abc" shown in the figure being retrieved.

Figure 26:
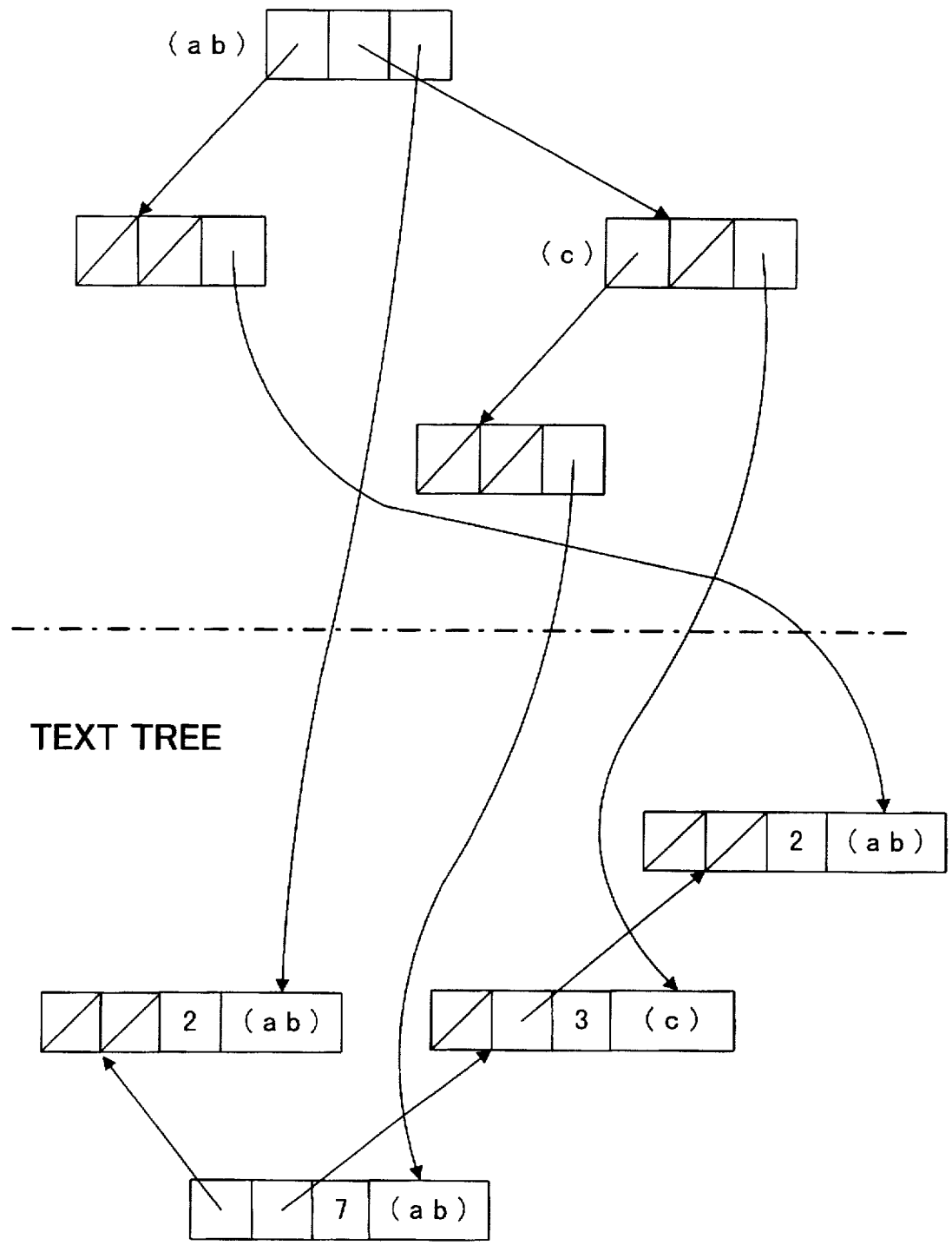
FIG. 26 is a diagram showing the data structure in the second embodiment of this invention.

The method described above may be further improved as follows. In this method, the dictionary tree consists of two types of nodes: those containing character strings and those not containing character strings, as shown in FIG. 24. All those nodes may be changed into the nodes in the unique format which do not contain character strings explicitly (that is, the spaces containing character strings are removed) as shown in FIG. 26. In other words, as shown in FIG. 26, each of the nodes of the dictionary tree consists of three spaces, the character strings "ab" and "c" not being stored in those nodes.

In this case, because the address of a node in the dictionary may be determined arbitrarily and because a character stored in a node should be unique (or grouped into one if there are a plurality of same character strings), the address of a node in which a character string is to be stored may be selected so that the address represents the character string itself (or the address contains the character string in some other form).

As a result, not only a node (some nodes) in the dictionary tree may contain a character string ("ab", "c") implicitly as part of the address but also a node in the text tree may contain a character string ("ab", "ab", "c", "ab") explicitly as part of a pointer to the corresponding node in the dictionary tree, as shown in FIG. 26. In restoring a text, this method eliminates the need to reference the contents of a node in the dictionary tree; the pointer value to a node in the text tree gives us a character string itself, ensuring efficient processing.

In FIG. 26, (ab) and (c) are addresses or pointers which are coded as "ab" and "c", respectively (or which contain codes "ab" and "c" in their addresses or pointers). The address may be a main storage address where the node is located or an index value into an array when the node is represented as an array.

[2-2-3. Combining the dictionary and the text]

As indicated by the two-head arrows in FIG. 23, there is a one-to-one correspondence between the nodes in the dictionary tree and the nodes in the text tree. However, note that the text tree may contain one or more nodes representing substrings that are not registered in the dictionary, for example, a series of spaces. In this case, there is no one-to-one correspondence. It should be kept in mind that, for those substrings registered in the dictionary, there is a one-to-one correspondence.

Figure 27:
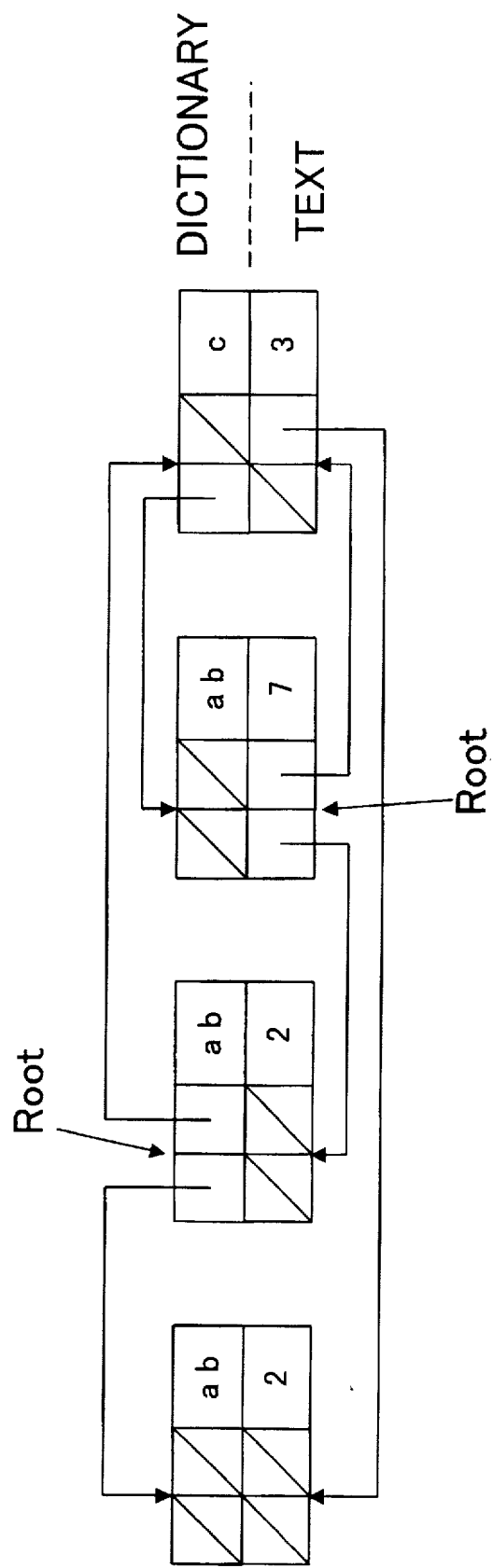
FIG. 27 is a diagram showing the data structure in the second embodiment of this invention.

If this is the case, it is possible to combine the dictionary and the text as shown in FIG. 27. This method does not require to reference both the dictionary and the text linked together by pointers; it combines these types of nodes two into one, thus eliminating the need for the pointers and saving storage.

FIG. 27 shows the dictionary in the top, and the text in the bottom. FIG. 27 shows a combination of the dictionary nodes and text nodes shown in FIG. 23. For example, in FIG. 23, the root node containing "ab" in the dictionary tree is linked to the leftmost node in the text tree by the pointer; in FIG. 27, they are combined into one item consisting of the top part and the bottom part.

Figure 28:
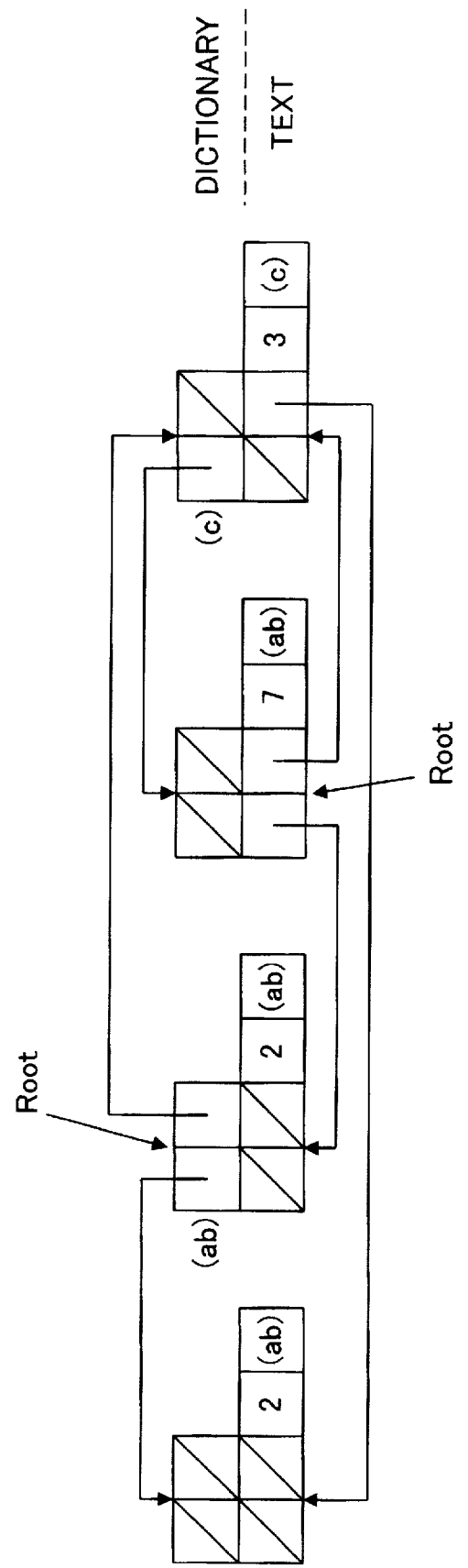
FIG. 28 is a diagram showing the data structure in the second embodiment of this invention.

Even in this format, an address may be stored instead of a character string. FIG. 28 shows this configuration. In FIG. 26, the root node of the dictionary tree implicitly containing "ab" is linked to the leftmost node of the text tree by the pointer; in FIG. 28, they are combined into one item consisting of the top part and the bottom part.

This configuration, which eliminates the need to reference the nodes in both trees, does not require pointers, resulting in a significant reduction in the amount of required storage.

Figure 29:
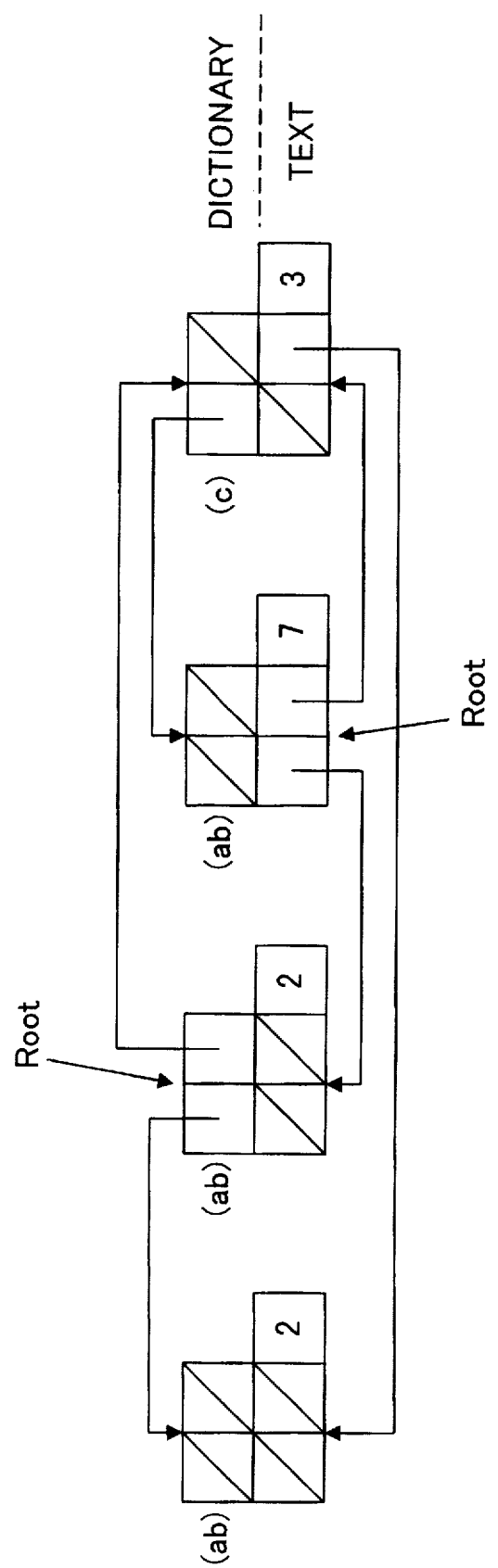
FIG. 29 is a diagram showing the data structure in the second embodiment of this invention.

In the above example, a node containing an address generated from a character string is unique. If it is possible for a plurality of nodes to contain an address generated from the same character string, a character string to be stored in each node may be included in each address. That is, as shown in FIG. 29, the system can select from nodes, each containing in its address a character string to be stored, making the configuration more compact and reducing required storage significantly.

To generate a plurality of nodes containing the same character string in their addresses, a character string is stored in the low-order bits of each address with the high-order bits containing a different bit configuration. In this case, those nodes having the identical low-order address bits are assumed to contain in their addresses the character string corresponding to the low-order address bits. Or, such methods as hashing are used to convert a character string to the high-order bits of an address. In this case, those nodes having the identical high-order address bits are assumed to contain in their addresses the character string corresponding to the high-order address bits.

[3. Third Embodiment]

Unlike the above embodiments, this embodiment relates to a data processing system or data retrieval system which does not limit the length of a key-candidate substring.

The reason for not limiting the length of a key-candidate substring is as follows. For the text "ababcab", the dictionary data used to retrieve a substring that is three characters or less in length consists of data shown in Table 7, as explained in the above embodiments. It should be remembered here that a dictionary (index) refers to data with the key-candidate substrings arranged lexicographically, each key-candidate substring being assigned its start position.

[TABLE 7]

| | (Text) | |
| --- | --- | --- |
| | a b a b c a b | |
| | 1 2 3 4 5 6 7 | |
| | (Dictionary) | |
| Lexicographic order | Key-candidate substring | Start position |
| 1 | a b | 6 |
| 2 | a b a | 1 |
| 3 | a b c | 3 |

[TABLE 7]-continued

| 4 | b | 7 |
| --- | --- | --- |
| 5 | b a b | 2 |
| 6 | b c a | 4 |
| 7 | c a b | 5 |

The first reason for limiting the length of a key-candidate substring is to reduce the size of the area where key-candidate substrings are to be stored, and the second reason is to omit comparison that would otherwise be necessary. For example, if it is necessary to check only the positions of two characters "ab", but not necessary to check whether the substring is "aba" or "abc", limiting the key length to two characters eliminates the need to compare the third character "a" in "aba" as well as the third character "c" in "abc".

However, a variable-length pattern, rather than a fixed-length pattern, is used in retrieval in most cases. Therefore, satisfying all the retrieval requests by searching a binary tree for a desired substring requires us to use a key that is equal in length to the longest pattern. This involves unnecessary comparison.

Conversely, limiting the length of a key to the minimum length that is common to all the patterns and searching the binary index tree for a desired substring with the use of that key gives us the text positions of too many leading strings. This requires us to determine (sometimes with some other method), for each of these leading strings, if the trailing part matches the corresponding part of the pattern. For example, in the above example, limiting the key length to "2" gives us text positions (ab, 6), (aba, 1), and (abc, 3), all of which have the pattern "ab" in the leading string. So, when retrieving the pattern "abc" that is longer than the pattern "ab", it is necessary to determine, for each of the results, if the trailing part matches the pattern.

Thus, in a data structure where the length of a key-candidate substring is limited and where the length of the longest pattern to be used in retrieval is unknown, another means for determining if the part of a substring exceeding the key length satisfies the requirement is necessary.

The object of this embodiment is to provide a data processing system which updates data for retrieval speedily when the length of a key-candidate substring is not limited. It is another object of this embodiment to provide a data processing system which processes data speedily. It is also an object of this embodiment to provide a data processing system which uses a simple processing procedure. It is still another object of this embodiment to provide a data retrieval system which retrieves all, but non-duplicating, data strings containing a key string of a variable length.

[3-1. Configuration of the Third Embodiment]

Figure 30:
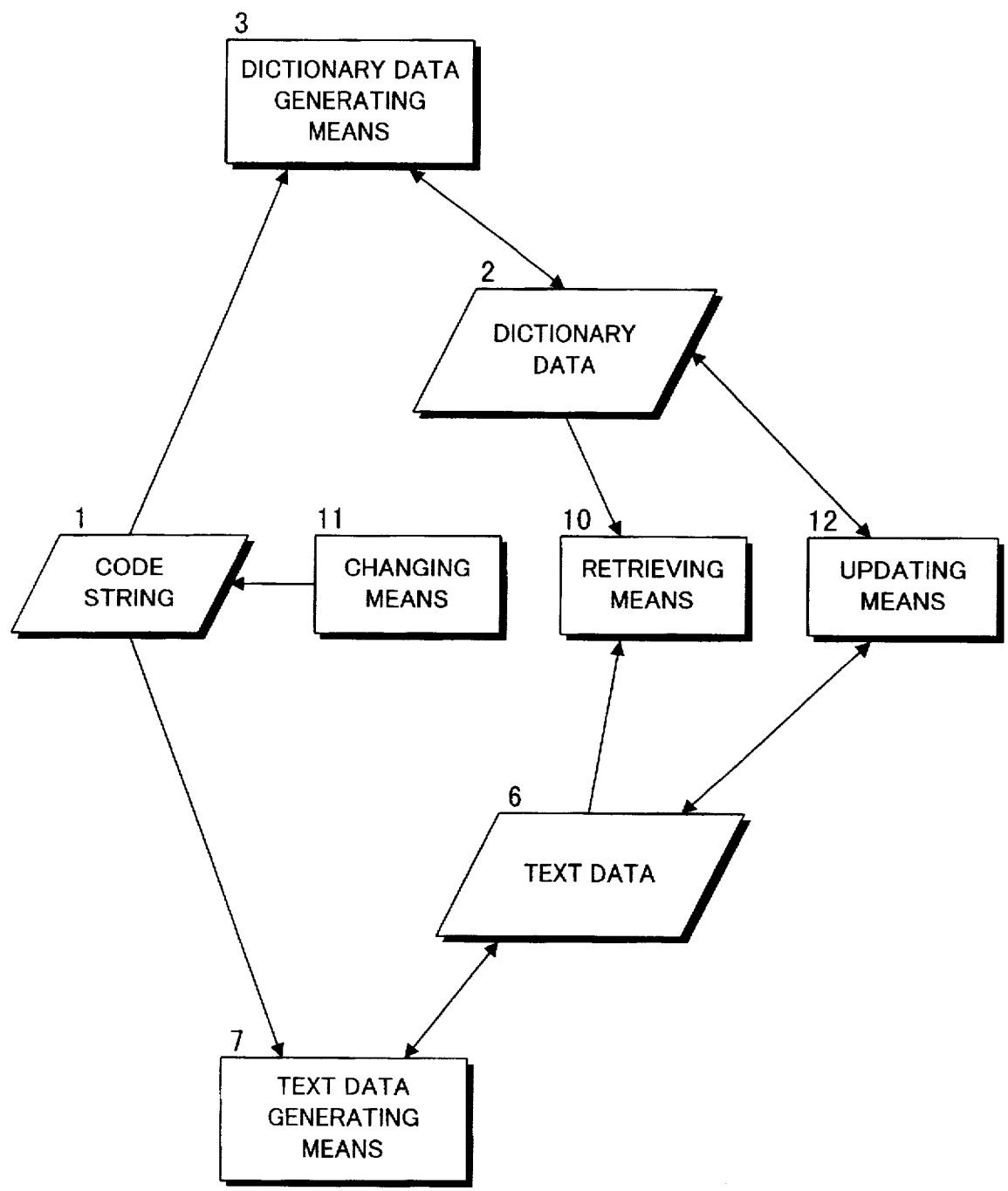
FIG. 30 is a functional block diagram showing the configuration of the third embodiment of this invention.

FIG. 30 shows a functional block diagram showing the structure of the third embodiment. That is, the data processing system used in this embodiment has the dictionary data generating means 3 for arranging lexicographically the leading strings to be used for retrieving trailing strings each of which is a trailing part of the code string 1 on which retrieval is to be made with the use of a key string and for generating the dictionary data 2 representing pairs each consisting of a leading string and its position within the code string. In this embodiment, the length a key contained in the dictionary data 2 is not limited.

In addition, the data processing system used in this embodiment has the text data generating means 7 for generating the text data 6 based on the code string 1 on which retrieval is made with the use of a key string. In this embodiment, the text data 6 consists of the characters in the code string 1, sequentially numbered from the leftmost character. And, the dictionary data generating means 3 establishes a pointer between the start position of each leading string in the dictionary data 2 and the corresponding position in the text data 6.

The data processing system in this embodiment also has the retrieving means 10 for retrieving trailing strings each containing the whole or part of a key string as the leading string, based on the dictionary data 2 and the text data 6. In addition, the data processing system in this embodiment has the changing means 11 for changing the code string 1 as well as the updating means 12 for updating, based on the contents of the change, the dictionary data 2 and the text data 6 of the code string when the change is made.

[3-2. Operation And Effects of the Third Embodiment]

The third embodiment having the configuration described above performs operation as follows.

[3-2-1. Dictionary Data Generation]

First, the following explains how data in this embodiment is structured. In this embodiment, the dictionary data consists, not of individual key-candidate substrings, but of pointers to text data each corresponding to the start position of each substring within the code string. A key-candidate substring is obtained by restoring a part of the text.

In the dictionary data used this embodiment, the length of a key-candidate substring in the index (dictionary) is not limited. So, unlike a data structure where the length of a key-candidate substring is limited, there is no need to retrieve from the lexicographically-arranged leading strings and then to check the text for a subsequent substring; rather, a substring of any length may be retrieved simply by retrieving directly from the index.

For example, for the code string 1 "ababcab", there are seven trailing strings (ababcab, babcab, abcab, bcab, cab, ab, b). They are arranged lexicographically as follows:

[TABLE 8]

| (Text) |
|---|
| a b a b c a b |
| 1 2 3 4 5 6 7 |

| (Dictionary) | | |
|---|---|---|
| Lexicographic order | Key-candidate substring | Start position |
| 1 | a b | 6 |
| 2 | a b a b c a b | 1 |
| 3 | a b c a b | 3 |
| 4 | b a b c a b | 2 |
| 6 | b c a b | 4 |
| 7 | c a b | 5 |

A number to the left of each key is the lexicographic order of the substring. A number to the right is a pointer to the start position of the substring; that is, this number is the start position of the substring when the characters in the code string are numbered sequentially from the leftmost position.

Figure 31:
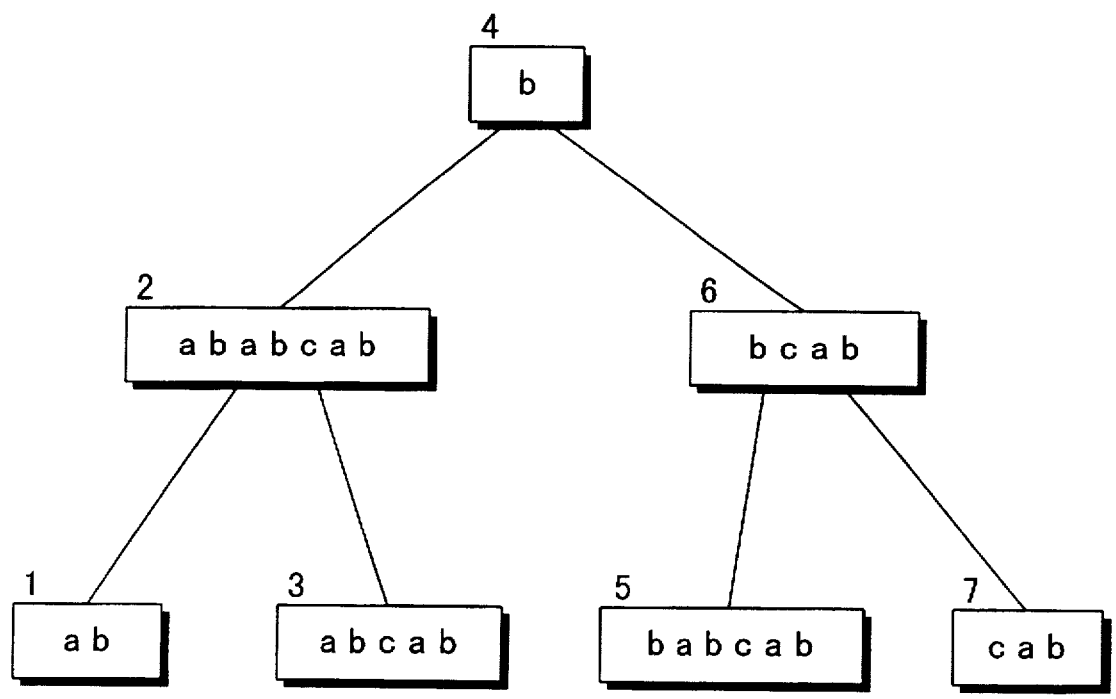
FIG. 31 is a diagram showing the configuration of the index used in the third embodiment of this invention
Figure 32A:
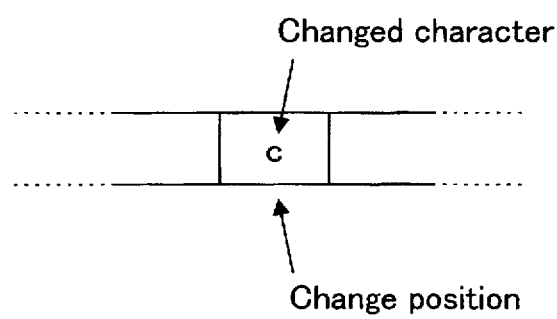
FIG. 32(A) is a diagram showing a "change position" when a character is changed in the text in the third embodiment of this invention.
Figure 32B:
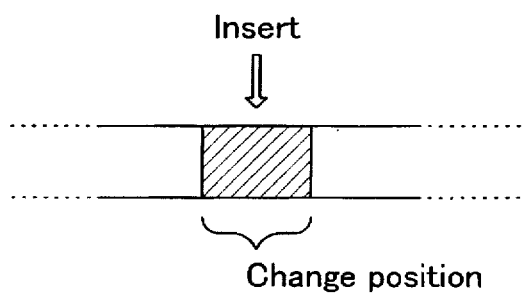
FIG. 32(B) is a diagram showing a "change position" when a character is inserted in the text in the third embodiment of this invention.
Figure 32C:
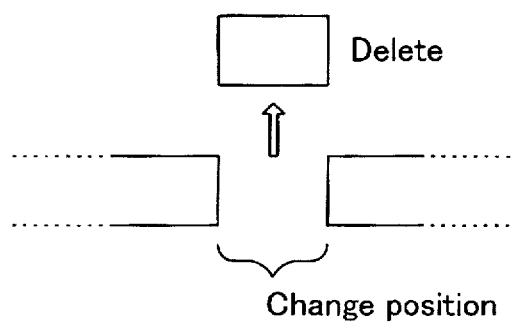
FIG. 32(C) is a diagram showing a "change position" when a character is deleted in the text in the third embodiment of this invention.
Figure 32D:
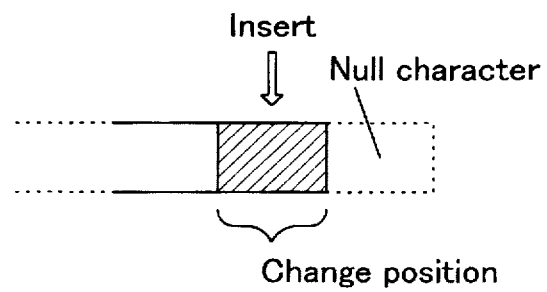
FIG. 32(D) is a diagram showing a "change position" when a character is added at the end position in the text in the third embodiment of this invention.

The amount of memory used for dictionary data for key-candidate substrings whose length are not limited, as described above, is the same as that for dictionary data for key-candidate substrings whose length are limited to 3 or less. The difference is the processing (operation time) involved in creating indexes from the text and in updating the index as part of the text is changed. That is, a longer key should require a longer comparison time, because the index is basically a binary tree that is formed by comparing the key-candidate substrings, as shown in FIG. 31.

In this embodiment, all the trailing strings (ababcab, babcab, abcab, bcab, cab, ab, b) in the text are used as key-candidate substrings and, therefore, the average key length is one half of the whole length of the text. This average time increases as the whole length of the text increases. Thus, if the key comparison time depends on the key length, forming an index by registering all the trailing strings of the text into a binary search tree requires, at least, a time that is proportional to the square of the text length (number of trailing strings).

Normally, key comparison starts at the first (leftmost) character and ends when a mismatch character (position) is found. Except for a special, redundant text which has many long matching leading strings—more precisely, a text which has more matching (common) leading strings as the text becomes longer—the number of characters used for key comparison does not increase as the text becomes longer. For example, in the example shown in Table 8, the characters used for comparison order to form an index are those enclosed by a rectangle shown in Table 9.

TABLE 9

| (Dictionary) | |
|---|---|
| Lexicographic order | Key-candidate substring |
| 1 | a b |
| 2 | a b a b c a b |
| 3 | a b c a b |
| 4 | b |
| 5 | b a b c a b |
| 6 | b c a b |
| 7 | c a b |

It is apparent from Table 9 that the portion enclosed by a rectangle is included in those key-candidate substrings that are used when the key length is limited to "3" (See Table 7). It can be said that there is no difference in time to form an index by arranging those key-candidate substrings lexicographically.

An example of a "special, redundant text" described above is "ababab". For this text, the leading string (abab) of one of trailing strings (ababab) is another trailing string (abab) of the text. In this case, most characters of a key-candidate substring are used for comparison.

Thus, by not limiting the length of a key-candidate substring, a substring of any length can be retrieved by simply retrieving directly from the index. This does not require a subsequent check on the subsequent portion of each substring in the text.

[3-2-2. Index Configuration Procedure]

When registering a substring of any length into the index (that is, when registering all the trailing strings that may be used for leading string retrieval), it is natural that the trailing strings should be registered sequentially with the shortest first. That is, the index is formed by registering the trailing strings sequentially after the text has been read. This is because a key-candidate trailing string is not determined until the end of the text is read. An attempt to register a key-candidate trailing string into the index before it is determined may require the string to be re-arranged later, decreasing efficiency.

[3-2-3. Adjustment Procedure Involved in Changing the Text]

In the data structure in this embodiment, a key-candidate substring stored in the index is created by referring to a portion of the text. Therefore, when one character is added to the end of the text, that character is added to the end of each key. The problem is that the extended keys sometimes cause a change in the sequence of the entries of the index.

Because a character is added to the end of the text, all the trailing strings are extended (changed) and, basically, all the trailing strings may have to be re-arranged. In most cases, however, the leading string part of each trailing string used for comparison does not include all the characters to the end of the trailing string.

For example, for the code string "ababcab", only two trailing strings, "b" and "ab", require the whole trailing string to be compared to determine their positions (sequences) in the index. As shown in Table 10, when one character (*) is added to the end of the text, the positions of only two trailing strings, "b" and "ab", depend on the added character. For example, when the added character (*) is "b", "ab" becomes "ab<u>b</u>" and so it must be moved after "ababcab <u>b</u>" in the index. Similarly, "b" becomes "b<u>b</u>" and so it must be moved after "babcab<u>b</u>".

TABLE 10

(Text)

a b a b c a b *
1 2 3 4 5 6 7 8

(Dictionary)

| Lexicographic order | Key-candidate substring | Start position |
|---|---|---|
| 1 | a b * | 6 |
| 2 | a b a b c a b * | 1 |
| 3 | a b c a b * | 3 |
| 4 | b * | 7 |
| 5 | b a b c a b * | 2 |
| 6 | b c a b * | 4 |
| 7 | c a b * | 5 |

On the other hand, for a substring which does not require the whole trailing substring to be compared to determine its sequence (for example, "abcab"), a character added to the end does not affect the sequence. Therefore, the key-candidate substring need not be re-arranged in order to determine its new position (sequence). All the trailing strings longer than the shortest such trailing string ("cab" in the above example) do not require the whole string to be compared and therefore need not be re-arranged.

The reason for this is as follows. Assume that, in the above example, the trailing string "Xcab" which is longer than "cab", the shortest trailing string not requiring re-arrange operation, requires the whole trailing string to be compared. Then, there should be a longer trailing string "XcabY" which has "Xcab" as its leading string. Here, because both "Xcab" and "XcabY" are trailing strings, the trailing strings from which the substring "X" has been removed (that is, "cab" and "cabY") are also trailing strings. However, there is another trailing string "cabY" whose leading string is "cab", meaning that "cab" requires the whole string to be compared. This contradicts the preposition that "cab does not require the whole trailing string to be compared". This contradiction results from the assumption that the trailing string "Xcab" which is longer than "cab" requires the whole trailing string to be compared. Thus, the presence of "Xcab" is logically negated.

When one character is added to the end of the text, a key-candidate substring is added to, or re-arranged in, the index as follows. First, a one-character trailing string, consisting of the added character only, is registered to the index. Then, a check is made to see if the relation of each trailing string with the immediately preceding or following key has changed after the character is added, beginning with the shortest trailing string. If the relation has been changed, the trailing string is re-arranged. This operation continues as far as the key relation in the index changes after the character has been added. Once a trailing string is found where there is no change in the relation, the re-arrange operation stops and no check is made on the longer trailing strings. As described above, we know that the sequence of those trailing strings remains unchanged.

There are some methods for checking whether or not there is a change in the key relation (sequence) in the index before and after a character is added. In one method, a check is made to see if, in the index before the character is added, an extended trailing string comes between the immediately preceding key and the immediately following key (If this condition is satisfied, there is no change in the relation). In another method, a check is made to see if, in the index before the character is added, an extended trailing string comes immediately after the trailing string itself (If this is satisfied, there is no change in the relation).

For example, as shown in Table 11, when "d" is added to the end of the text "ababcab", "ab" whose lexicographic order was "1" in Table 10 becomes "abd" with the lexicographical order being "3". Similarly, "b" whose lexicographic order was "4" in Table 10 becomes "bd" with the lexicographical order being "6". In addition, the added character "d" must be registered in the index. There is no need to re-arrange other key-candidate substrings, with their relative positional relation in the index remained unchanged. That is, for those substrings marked with "*" in the Start Position column in Table 11, the relative sequence remains the same as that in Table 10.

[TABLE 11]

(Text)

a b a b c a b <u>d</u>
1 2 3 4 5 6 7 8

(Dictionary)

| Lexicographic order | Key-candidate substring | Start position |
|---|---|---|
| 1 | a b a b c a b <u>d</u> | 1 * |
| 2 | a b c a b <u>d</u> | 3 * |
| 3 | a b <u>d</u> | 6 |
| 4 | b a b c a b <u>d</u> | 2 * |
| 5 | b c a b <u>d</u> | 4 * |
| 6 | b <u>d</u> | 7 |
| 7 | c a b <u>d</u> | 5 * |
| 8 | <u>d</u> | 8 |

The following explains how the index will be re-organized when a character in the middle of the text is changed. In this case, the index is processed in the same manner as described above. When a character in the middle of the text is changed (for example, a character is changed, inserted, or deleted), dictionary data using a trailing string beyond that position as a key (a trailing string not containing the change position) remains unchanged and therefore need not be re-arranged. A check is made on the trailing strings containing the change position, one at a time, whether or not the sequence of each trailing string is changed as a result of key comparison, beginning with the shortest trailing string (as in the above case where a character is added to the end). And, a trailing string whose sequence has been changed is re-arranged. A trailing string whose sequence is not changed, once found, causes the re-arrange operation to be canceled (The trailing string itself is not re-arranged).

This operation may be executed as a procedure common to various types of text data changes, such as character change, insertion, and deletion, including the addition of a character to the end of the text. When a character is changed, inserted or deleted, the change positions described above refers to the respective positions shown in FIG. 32. Addition of a character to the end of the text is assumed to be one type of character insertion, assuming that there is a null character at the end of the text and that a character is inserted between the null character and the end of the text string.

[3-3. Combining with the text]

In this embodiment, the size of the storage area may be reduced by combining the index (dictionary) with the text, as in the second embodiments. The text, which may be built so that it contains non-duplicating code string characters (that is, so that it contains as many codes as in the code string), simplifies the procedure for registering a substring into the index when creating (updating) the index. In addition, combining the index with the text enables a code string to be restored efficiently by simply giving its start position, and makes the update of the index more efficient when the code string is changed.

That is, combining the index with the text makes it possible to store as many codes as the code string characters as follows.

TABLE 12

(Dictionary)

| Lexicographic order | Key-candidate substring | Start position |
|---|---|---|
| 1 | a b | 6 |
| 2 | a b a b c a b | 1 |
| 3 | a b c a b | 3 |
| 4 | b | 7 |
| 5 | b a b c a b | 2 |
| 6 | b c a b | 4 |
| 7 | c a b | 5 |

(Text)

| Lexicographic order | Key-candidate substring (code) | Start position |
|---|---|---|
| 2 | a | 1 |
| 5 | b | 2 |
| 3 | a | 3 |
| 6 | b | 4 |
| 7 | c | 5 |
| 1 | a | 6 |
| 4 | b | 7 |

The portion of the dictionary enclosed by the rectangle in the above table (those characters except the first) can be restored from the text and therefore need not be actually (separately) stored. As described above, the index and the text are the same in that they are composed of pairs each consisting of a code and its position; they are different only in the arrangement of codes. This means that only one sequence of codes need be stored.

[3-4. Variations of the Third Embodiment]

This embodiment applies not only to the block diagram shown in FIG. 30 but also to the dictionary tree and the text tree which have the tree structure shown in FIG. 1.

Some components of the data processing system in this embodiment comprises the data retrieval system described below.

That is, a data retrieval system may be built which comprises: dictionary data generating means for arranging lexicographically the leading strings to be used for retrieving trailing strings each of which is a trailing part of a code string on which retrieval is to be made with the use of a key string and for generating dictionary data representing pairs each consisting of said leading string and its position within said code string; text data generating means for generating text data based on said code string; and retrieving means for retrieving trailing strings each containing the whole or part of a key string as the leading string, based on said dictionary tree.

This simply-configured data retrieval system allows all, but non-duplicating, appearances of a pattern to be retrieved within the text.

[4. Fourth Embodiment]

The object of the fourth embodiment is to provide a data processing system which makes adjustment work more efficient by putting a plurality of changes into one unit of processing.

[4-1. Configuration of the Fourth Embodiment]

Figure 33:
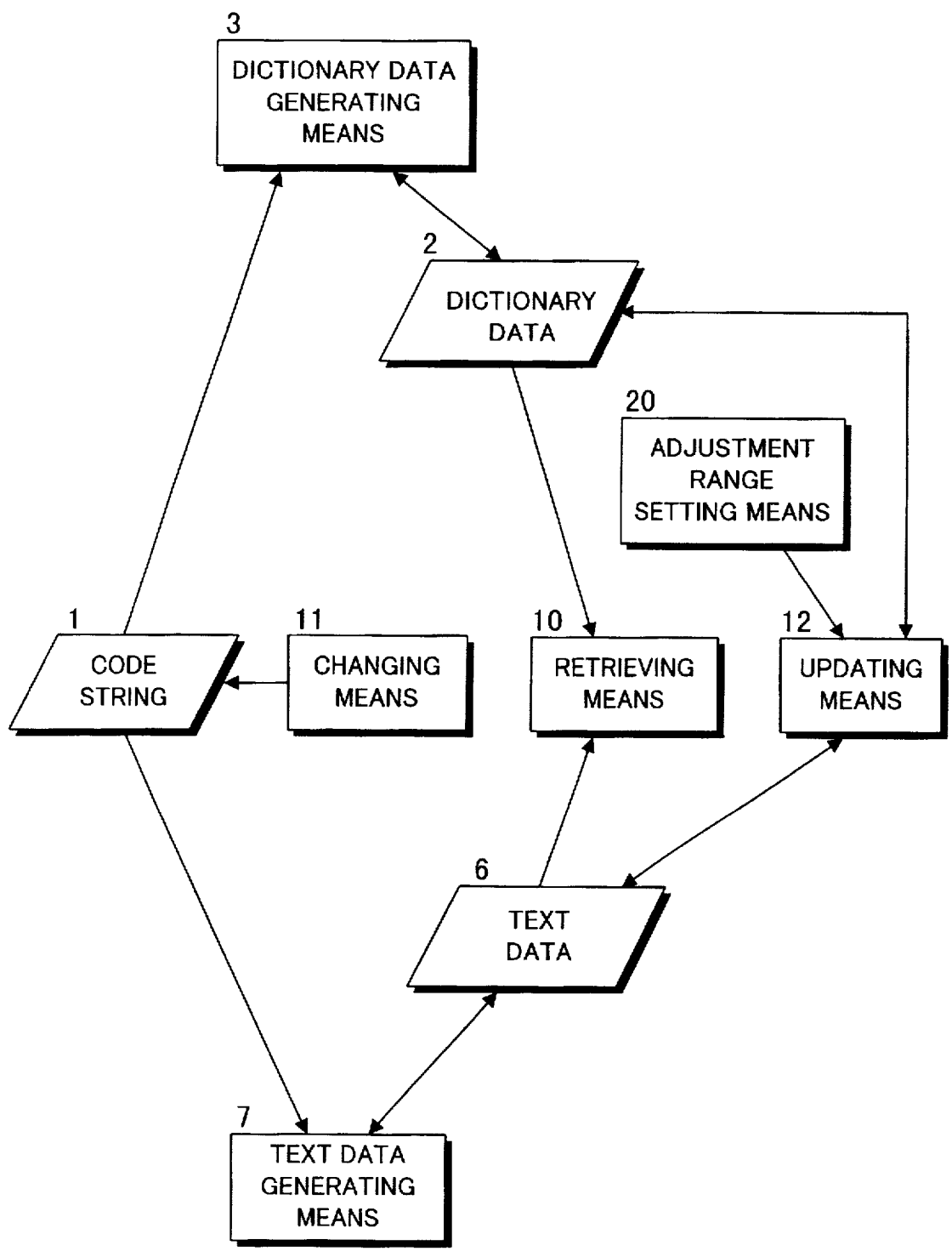
FIG. 33 is a functional block diagram showing the configuration of the fourth embodiment of this invention.

In this embodiment, the adjustment range setting means 20, which puts a plurality of changes into one unit, is provided, as shown in FIG. 33, before the updating means 12 which updates dictionary data 2. The other components are the same as those in the configuration of the third embodiment.

[4-2. Operation And Effects of the Fourth Embodiment]

The fourth embodiment having the configuration described above operates as follows. When a plurality of text changes are applied to a plurality of locations which are adjacent to each other, a trailing string beginning in the same position must sometimes be registered each time a change is made. This condition occurs most frequently, for example, when a plurality of characters, not a single character, are added to the end of the text or when every other character is deleted in a specific range. Various types of operations are sometimes mixed; for example, a character is deleted and then another character is added in an adjacent location.

Figure 34:
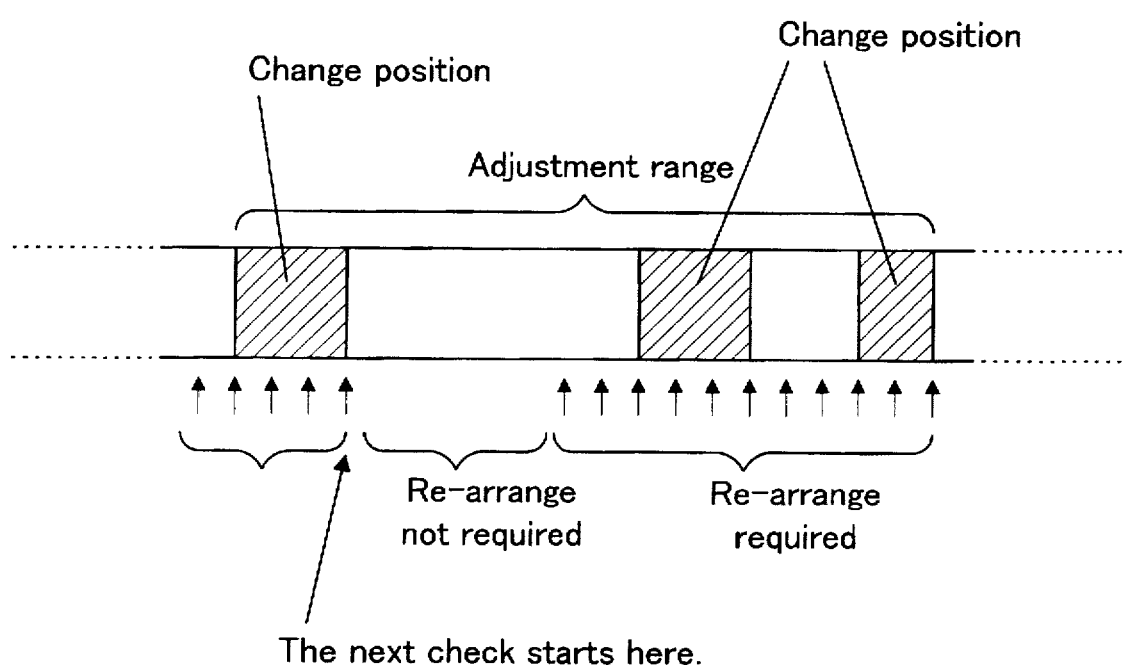
FIG. 34 is a diagram showing the operation of the fourth embodiment of this invention.

In this case, the adjustment range setting means 20 sets up an adjustment range to which a plurality of changes have been applied, and sequentially checks the trailing strings containing this range to determine whether to re-arrange them, beginning with the shortest one, as shown in FIG. 34. When a trailing string not requiring rearrangement is found, the check is re-started at the trailing string which begins at the rightmost (end) position of the change position immediately preceding (the start position of) the trailing string not requiring rearrangement. A trailing string is re-arranged in the same manner as in the third embodiment.

As described above, this embodiment puts a plurality of changes into one unit of adjustment work to reduce the number of times a trailing string is re-arranged.

[5. Fifth Embodiment]

The object of the fifth embodiment is to provide a data processing system which makes the counting of pattern appearances in the text more efficient.

[5-1. Configuration of the Fifth Embodiment]

Figure 35:
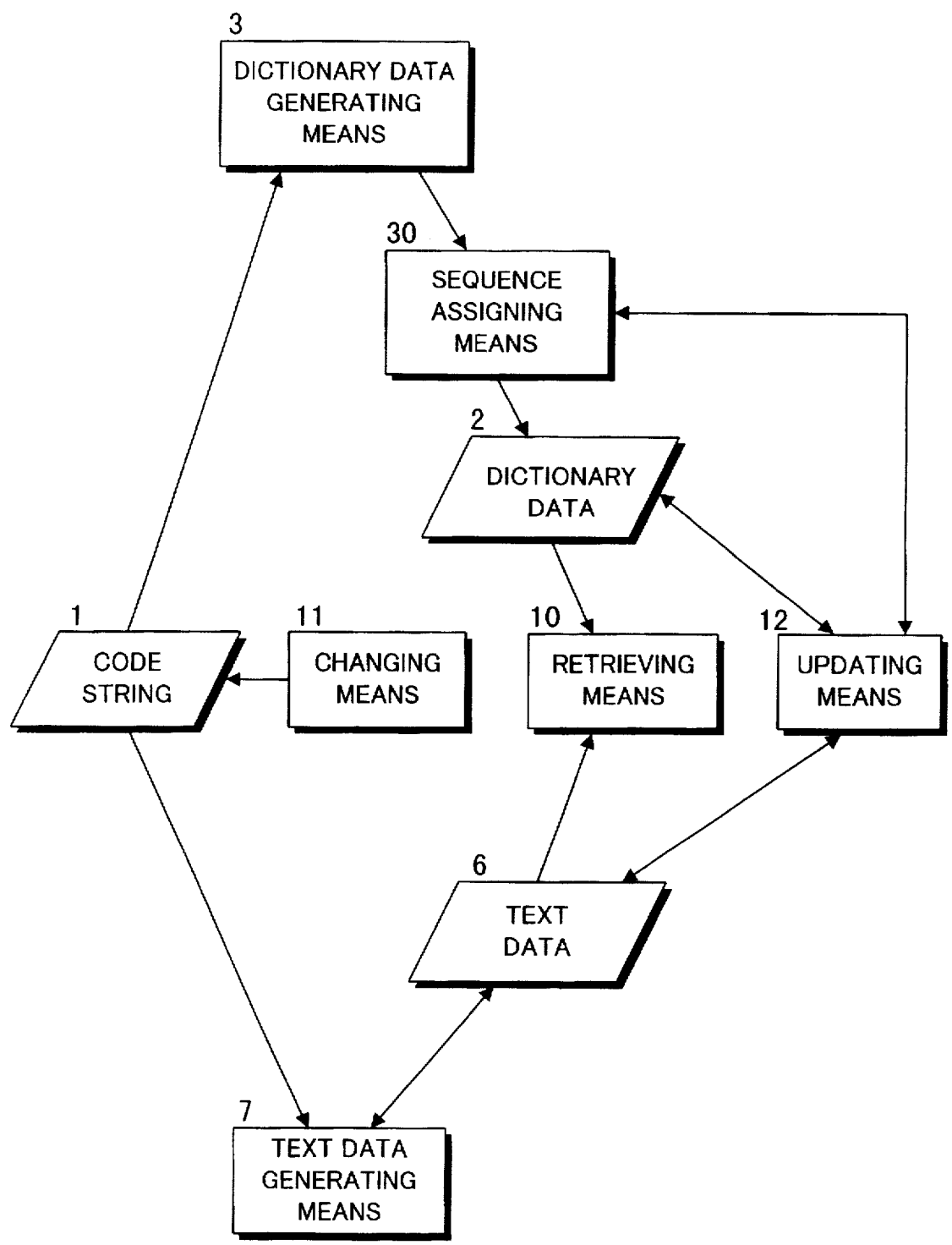
FIG. 35 is a functional block diagram showing the configuration of the fifth embodiment of this invention.

In this embodiment, the sequence assigning means 30 is provided after the dictionary data generating means 3, as shown in FIG. 35. It assigns sequential numbers (1, 2, 3, . . . ) to dictionary data items, beginning with the first item. In addition, the retrieving means 10 has the counting means which detects the first key-candidate substring with a specific leading string and the last key-candidate substring with that specific leading string to find the number of such key-candidate substrings. When the text is changed, the dictionary data is changed and, as a result, the lexicographic order is changed; in this case, the updating means 12 updates the lexicographic order of the dictionary data items via the sequence assigning means 30. The other components are the same as those in the configuration of the third embodiment.

[5-2. Operation And Effects of the Fifth Embodiment]

The fifth embodiment having the configuration described above performs operation as follows. In order to find all the positions of the pattern "ab" within the text "ababcab", the system retrieves from the index each key-candidate substring item whose leading string is "ab", and checks the position of the first character of that key-candidate substring within the text by following the pointer to the text.

However, there are times when we want to know the number of appearances of a specific pattern within the text, not the position of each pattern. In the old index structure, the system have to search the index sequentially for an item with a specific pattern as its leading string, to count the number of all the appearances of such an item. The retrieval time therefore depends on the number of appearances of the pattern.

The data processing system in this embodiment arranges lexicographically the dictionary data items to be registered in the index, and assigns sequential numbers (1, 2, 3, ...) to those items via the sequence assigning means 30, as shown in Table 13.

[TABLE 13]

(Text)

a b a b c a b
1 2 3 4 5 6 7
(Dictionary)

| Lexicographic order | Key-candidate substring | Start position |
|---|---|---|
| 1 | a b | 6 |
| 2 | a b a b c a b | 1 |
| 3 | a b c a b | 3 |
| 4 | b | 7 |
| 5 | b a b c a b | 2 |
| 6 | b c a b | 4 |
| 7 | c a b | 5 |

Thus, the number of appearances of a specific pattern can be obtained by subtracting the minimum sequence number of an item with the pattern as its leading string from the maximum sequence number of an item with the pattern as its leading string and adding one to the result. That is, in the example in Table 13, the number of appearances of the pattern "ab" is calculated as 3(3−1+1=3). The counting means in the retrieving means 10 performs this counting.

In this way, the data processing system in this embodiment gives us the number of appearances of a specific pattern by simply checking the sequences of two items in the index, making the retrieval time independent of the number of appearances.

[5-3. Variation of the Fifth Embodiment]

Because the dictionary data, to which the sequence assigning means 30 assigns lexicographic order numbers, corresponds to the text data on a one-to-one basis, their relation can be represented without using pointers as follows. It should be remembered that pointers are one of the means to represent a one-to-one relation.

[TABLE 14]

(Dictionary)

| Lexicographic order | Key-candidate substring | Start position |
|---|---|---|
| 1 | a b | 6 |
| 2 | a b a b c a b | 1 |
| 3 | a b c a b | 3 |
| 4 | b | 7 |
| 5 | b a b c a b | 2 |
| 6 | b c a b | 4 |
| 7 | c a b | 5 |

[TABLE 14]-continued (Text)

| Lexicographic order | Key-candidate substring | Start position |
|---|---|---|
| 2 | a b a b c a b | 1 |
| 5 | b a b c a b | 2 |
| 3 | a b c a b | 3 |
| 6 | b c a b | 4 |
| 7 | c a b | 5 |
| 1 | a b | 6 |
| 4 | b | 7 |

It can be said as follows. In the index, pairs, each consisting of a key-candidate substring and its start position, are arranged according to the lexicographic order of key-candidate substrings for retrieval by substring (pattern) values or are arranged (accessed) lexicographically; in the text, substrings are arranged in the sequence of their appearance positions for retrieval (access) by positions.

[6. Sixth Embodiment]

This embodiment relates to a data processing system which enhances the efficiency of code string comparison which is required when the index is retrieved using a specified code string or when a trailing string is added to the index.

[6-1. Configuration of the Sixth Embodiment]

Figure 36:
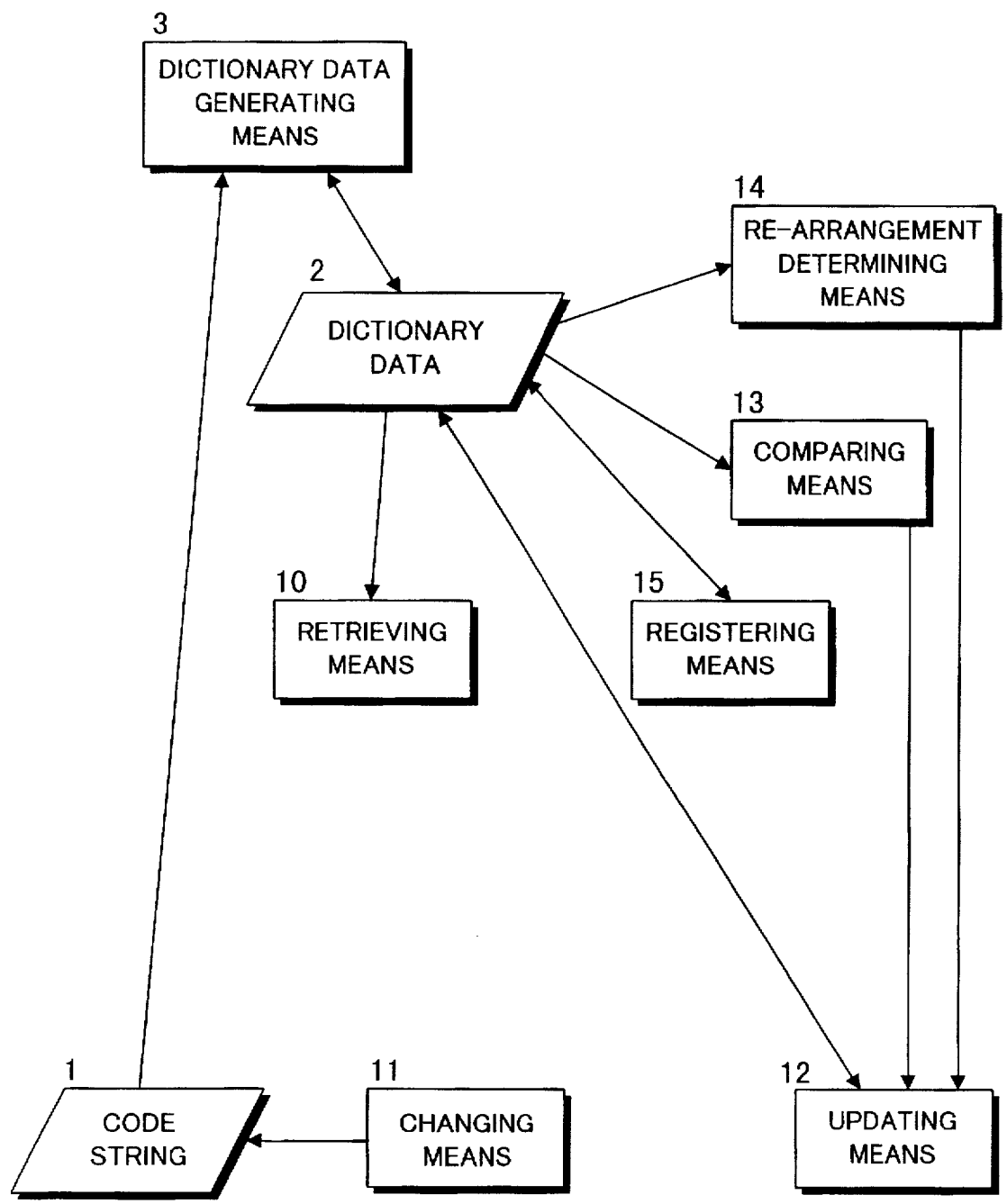
FIG. 36 is a functional block diagram showing the configuration of the sixth embodiment of this invention.

FIG. 36 is a functional block diagram showing the configuration of the sixth embodiment. The data processing system in this embodiment has the dictionary data generating means 3 for arranging lexicographically the leading strings to be used for retrieving trailing strings each of which is a trailing part of the code string 1 on which retrieval is to be made with the use of a key string and for generating the dictionary data 2 representing pairs each consisting of a leading string and its position within the code string (that is, start position of the leading string).

In addition, the data processing system in this embodiment has the retrieving means 10 which determines the next character position at which comparison is to start, based on the last character at which comparison was performed, when performing binary search operation with a code string as the key based on the dictionary data 2. The data processing system in this embodiment also has the comparing means 13; when two code strings are compared and when both trailing strings, which are generated by removing a matching leading string from both code strings, are in the dictionary data 2, this comparing means 13 determines the relation between two code strings according to the relation between the trailing strings. The data processing system in this embodiment also has the re-arrange determining means 14 which determines whether to re-arrange a trailing string, part of which has been changed. In addition, the data processing system in this embodiment has the registering means 15; when one of two trailing strings which are the same except one character is already registered in the index, this registering means 15 determines the position at which the other trailing string is to be registered by comparing one character of one trailing string with that of the other trailing string. The data processing system in this embodiment also has the changing means 11 which changes the code string 1, and the updating means 12 which updates the dictionary data 2 of the code string based on the contents of the change.

|6-2. Operation And Effects of the Sixth Embodiment|

The sixth embodiment having the configuration described above performs operation as follows.

|6-2-1. Increasing the Efficiency in Comparing Keys (Code Strings) at Index Retrieval Time|

The following explains how to increase the comparison efficiency when retrieving items from the index using a specified code string. The next section |6-2-2. Increasing the Efficiency in Comparing Trailing Strings| will explain how to increase the efficiency when retrieving trailing strings from the index with a trailing string as the key.

Conventionally, comparison between two key-candidate substrings (leading string of a trailing string) stored as index items (or text items) or comparison between a key-candidate substring (leading string of a trailing string) and a code string (specified as a pattern) is performed as follows.

The first code string (leading string of a trailing string) and the second code string (leading string of a trailing string, or a code string) are compared beginning with the first code position, one at a time. When the first mismatch is found, the relation of two code strings is determined according to the comparison result (first code string>second code string, or first code string<second code string).

When the second code string is also the leading string of a trailing string and when two code strings match, the shorter one (leading string) is smaller than the longer one. When the second code string is a code string and when the first code string matches the leading string of the second code string, the first code string<the second code string; when the second code string matches the leading string of the first code string, the first code string=the second code string.

Comparison is performed differently, as described above, depending upon whether the second code string is the leading string of a trailing string or it is simply a code string. However, by adding one or more codes, which are smaller than any code, to the end of the original code string (converted to an index or text item) and then generating the leading string (included in an index item or text item) of a trailing string, the second code string which is the leading string of a trailing string can be processed by the same procedure as is used when the second code string is a code string.

One of the problems with the retrieval of an item from the index with a code string specified is that the index contains many items whose leading strings are the same (that is, they have the common leading string). So, when comparing the code string with each of these trailing strings in the binary search mode, characters are compared repeatedly beginning with the first character, one at a time, even for the common leading string which contain characters that always match.

Normally, when retrieving an item from the index consisting of lexicographically sorted trailing strings in the binary search mode, the code string is first compared with one of the trailing strings (typically, the trailing string in the central position) to determine whether the code string, used as the key, is smaller or larger than the trailing string. When they match, the position of the trailing string itself is the result of retrieval.

The binary search method thus compares one of the trailing strings in the range where the code string is supposed to reside with that code string, narrowing the range where the code string is supposed to reside. The upper limit and the lower limit (both are not included in the range) of this range are the start of the index (before the first trailing string ) and the end of the index (after the last trailing string) or the trailing string used in the comparison described above.

Recall that the trailing strings registered in the index are sorted lexicographically. Therefore, if the upper limit trailing string and the lower limit trailing string of this range have a same leading string that is k in length, all the intervening trailing strings also have the same leading string that is k in length. The longest of this common leading string is the shorter of the leading string common to the retrieval code string and to the upper limit substring or the leading string common to the retrieval code string and to the lower limit substring. When one of trailing strings in the range is compared with the code string in the binary search method, the result of comparison in which the common leading string is bypassed is the same as the result of comparison in which comparison starts at the first code.

Retrieval procedure

When a code string is given, the retrieving means in this embodiment retrieves items from the index according to the following steps.

(1) Initialize the values as follows:
Upper limit←Start of the index
Lower limit←End of the index
Upper-limit matching leading-string length←0
Lower-limit matching leading-string length←0

(2) Let a trailing string smaller than the upper limit and larger than the lower limit be "s". Let the shorter of the upper-limit matching leading-string length and the lower-limit matching leading-string be "k". Compare (k+1)th and the following characters of "s" with the (k+1)th and the following characters of the code string, and let the number of matching characters from the comparing start position be "j".

If ((k+1)th and the following characters of "s")<((k+1)th and the following characters of the code string), then upper limit←s, upper-limit matching leading-string length←(k+j).

If ((k+1)th and the following characters of "s")>((k+1)th and the following characters of the code string), then lower limit←s, lower-limit matching leading-string length←(k+j).

(3) Repeat step (2) until an equal condition occurs (including a condition in which the code string itself equals the leading string of the trailing string) or the range does not include a trailing string (that is, the upper limit comes next to the lower limit). When an equal condition occurs, (k+j) represents the whole length of the code string; when no equal condition occurs, that is, when retrieval ends upon detecting that the range is null, the code string comes between the upper-limit trailing string and the lower-limit trailing string. In addition, the upper limit or lower limit which has a longer matching leading-string length is the leading string in the index which has the longest leading-string that matches the code string. The matching leading-string length represents the length for which the leading string of the upper limit or the lower limit matches the code string.

EXAMPLE

The following explains, with the use of an example, how retrieval is performed. In the example, the code string "bac" is retrieved.

|TABLE 15|

Upper limit 0 →
   a b
   a b a b c a b
   a b c a b
"b a c" → b
   b a b c a b

[TABLE 15]-continued

```
              b c a b
              c a b
Lower limit 0 →
```

As shown in step (1) in the "retrieval procedure" described above, initialize the upper limit to the start of the index, the lower limit to the end of the index, the upper-limit matching leading-string length to 0, and the lower-limit matching leading-string length to 0, respectively, in Table 15. Then, as shown in step (2) in the "retrieval procedure", select one trailing string that is smaller than the upper limit and larger than the lower limit (the central trailing string "b" in this example), and let it be "s". Let the shorter of the upper-limit matching leading-string length and the lower-limit matching leading-string length be "k" (Now, both are "0"). Then, compare the (k+1)th and the following character (that is, the first and the following characters) of "s" with the (k+1)th and the following characters (that is, the first and the following characters) of the code string, and let the number of matching characters be "j" (j=1 because only "b" matches). The result is (the first and the following characters of "b")<(the first and the following characters of the code string); therefore, let the upper limit be "b", and let the upper-limit matching leading-string length be (0+1=1).

[TABLE 16]

```
                    a b
                    a b a b c a b
                    a b c a b
Upper limit 1 →     b
                    b a b c a b
"b a c" →           b c a b
                    c a b
Lower limit 0 →
```

In Table 16, move the upper limit to "b", and let the upper-limit matching leading-string length be 1. The lower limit remains at the end of the index with the lower-limit matching leading-string length still being 0. Then, select one trailing string that is smaller than the upper limit and larger than the lower limit (the central trailing string "bcab" in this example), and let it be "s". Let the shorter of the upper-limit matching leading-string length and the lower-limit matching leading-string length be "k" (here, k=0). Then, compare the (k+1)th and the following character (that is, the first and the following characters) of "s" with the (k+1)th and the following characters (that is, the first and the following characters) of the code string, and let the number of matching characters be "j" (j=1 because only "b" matches). The result is (the first and the following characters of "bcab")> (the first and the following characters of the code string); therefore, let the lower limit be "bcab", and let the lower-limit matching leading-string length be (0+1=1).

[TABLE 17]

```
                    a b
                    a b a b c a b
                    a b c a b
Upper limit 1 →     b
"b a c" →           b a b c a b
Lower limit 1 →     b c a b
                    c a b
```

In Table 17, move the lower limit to "bcab", and let the lower-limit matching leading-string length be 1. Then, select one trailing string that is smaller than the upper limit and larger than the lower limit (the central trailing string "bab-cab" in this example), and let it be "s". Let the shorter of the upper-limit matching leading-string length and the lower-limit matching leading-string length be "k" (here, k=1). Then, compare the (k+1)th and the following character (that is, the second and the following characters) of "s" with the (k+1)th and the following characters (that is, the second and the following characters) of the code string, and let the number of matching characters from the comparing start position be "j" (j=1 because only "a" matches). The result is (the second and the following characters of "babcab")<(the second and the following characters of the code string); therefore, let the upper limit be "babcab", and let the upper-limit matching leading-string length be (1+1=2).

TABLE 18

```
                    a b
                    a b a b c a b
                    a b c a b
                    b
Upper limit 2 →     b a b c a b
"b a c" →
Lower limit 1 →     b c a b
                    c a b
```

Then, in Table 18, move the upper limit to "babcab", and let the upper-limit matching leading-string length be 2. Because the range becomes null, retrieval ends. The first two characters of the retrieval string "bac" match those of the upper limit "babcab", and the string comes immediately after that position.

When binary search is performed for the lexicographically-sorted trailing strings using a retrieval code-string as the key, the shorter of the matching leading string of the previously-compared trailing string can be used for the upper or lower limit. This makes the comparison between a trailing string and a code string more efficient.

This method may be used when a trailing string is used instead of a code string (as the key) and, in that case, the procedure described in [6-2-2. Increasing the efficiency of Trailing String Comparison] may be used. That is, using this method when directly comparing (the leading strings of) two trailing strings makes the comparison between trailing strings more efficient. When retrieval ends, this method gives us the maximum number of leading characters of the code string which match those of a trailing string in the index as well as the corresponding trailing string (one of trailing strings).

[6-2-2. Increasing the efficiency of Trailing String Comparison]

When a trailing string is registered in the index, it is necessary to compare it with another trailing string already registered in the index. In this case, comparing two trailing strings, each having the identical long leading string, takes long time. The following explains how to make the comparison more efficient.

The comparing means in this embodiment, if used according to the procedure for comparing two trailing strings, makes the comparison more efficient even if they have an identical long leading string. In the following discussion, it is assumed that the comparing means has a means for determining which of the two trailing strings comes before the other (is smaller) in the index.

Comparison procedure

The procedure for comparing trailing strings whose trailing strings may already be registered in the index. The trailing strings to be compared are u and v.

(1) x←u, y←v
(2) Compare the first character of x with the first character of y. If they do not match, the comparison result is the comparison result of u and v.
(3) If they match and if both x and y are in the index, the relation in the index between x and y is the comparison result of u and v.
(4) If they match but if at least one of x and y is not in the index, x←(trailing string one character shorter than current x) and y←(trailing string one character shorter than current y) and repeat the steps from (2).

This method compares in step (3) the positions (within the index) of a part of longest trailing strings which are generated by removing a matching leading string from the comparison trailing strings u and v and both of which are registered in the index.

However, when comparing the positions within the index, there is no need to always compare the longest trailing strings registered in the index. That is, direct comparison of two trailing strings and comparison of the positions within the index of the trailing strings from which a matching leading string has been removed may be combined. In addition, direct character comparison and comparison of the positions in the index may be done in any order. So, step (2) and step (3) may be exchanged.

[6-2-3. Re-arranging Trailing Strings during Index Updating When Part of the Text Is Changed]

When part of the text is changed and trailing strings must be re-arranged during index updating, most trailing strings except those in the changed part (at the changed position) and those in the adjustment range are already registered in the index. Therefore, step (2) need not be performed so often; the relation of the trailing strings may be determined in step (3) according to their relation registered in the index.

EXAMPLE

The following explains, with the use of an example, how the comparison described above is performed. In the following discussion, assume that the trailing strings of the code string "ababcab" have already been registered lexicographically in the index. Also assume that "b" is inserted before the code string "ababcab" and that a new trailing string "bababcab" must be added to the index.

When comparing the new trailing string "bababcab" with "babcab" already registered in the index, the relation between "ababcab" and "abcab" already registered in the index is used. That is, as shown in Table 19, when the leftmost character "b" is removed from the new trailing string "bababcab" and from "babcab" already registered in the index, "2. ababcab" and "3. abcab" already registered in the index are generated. This means that the new trailing string "bababcab" comes before "5. babcab" already registered in the index.

TABLE 19

| (Existing index) | |
|---|---|
| Lexicographic order | Key-candidate substring |
| 1 | a b |
| 2 | a b a b c a b |
| 3 | a b c a b |
| 4 | b |
| 5 | b a b c a b |

TABLE 19-continued

| (Existing index) | |
|---|---|
| Lexicographic order | Key-candidate substring |
| 6 | b c a b |
| 7 | c a b |

Figure 37:
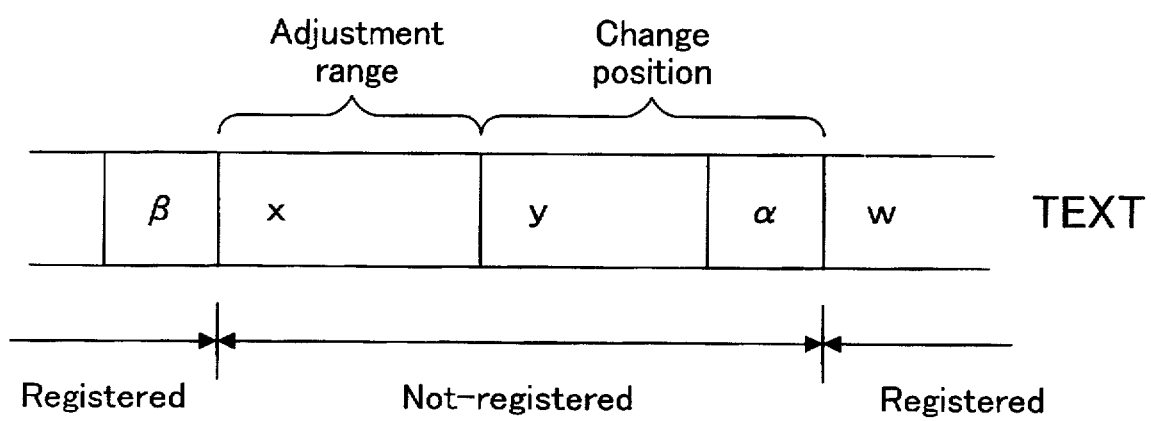
FIG. 37 is a diagram showing the operation of the sixth embodiment of this invention.

When an intermediate character in the text is changed, comparison is performed as follows. Assume that there is a changed position and an adjustment range in the text as shown in FIG. 37 and that an trailing string starting in the changed position or in the adjustment range is not registered in the index. In this case, when retrieval is made on the index in order to add a new string "αw", direct-comparison for those trailing strings after "w" is required only for "βxyαw" and only when α=β. That is, when α=β, "βxyαw" becomes "αxyαw". Because its leftmost character "α" matches the leftmost character "α" of "αw", comparison is required also for the trailing strings after "w".

However, when binary search is performed on the index, the average number of trailing strings to be compared with "αw" is log N, where N is the number of trailing strings in the index. Therefore, there is little or no probability that "αw" and "αxyαw" are compared directly. Even if "αw" and "αxyαw" must be compared, direct comparison is performed only for the not-registered range "xyα". Direct comparison need not be performed for all the matching leading strings.

The following method may also be used to improve this point. That is, when comparing with "βxyαw" registered in the index, only a trailing string beginning with "β" need be compared with "xyαw". Therefore, a trailing string beginning with a character other than "β", in those trailing strings starting in the not-registered range shown in FIG. 37 are registered first.

Then, a trailing string beginning with "β" is registered. The leading string of a trailing string beginning with "β" need be compared with the leading string of "βxyαw" until comparison proceeds to a point where both trailing strings, from which the matching part has been removed, are found in the index. The reason is that, because these trailing strings are already in the index, their relation is known.

In the not-registered part shown in FIG. 37, a trailing string beginning with a character other than "β" is already registered. Therefore, even if a trailing string beginning with "β" is compared with "βxyαw", the length to be compared is expected to be shorter than that of "xyα".

When registering those trailing strings, it is more efficient to proceed from right (end) to left (start). This is because the positions of already-registered trailing strings can be used more often. Of course, it is possible to proceed from left to right or in any other order.

The procedure described in [6.2.4 Increasing the Efficiency of Index Updating (A) (B)] may be used together in registering these index items. Therefore, even when a trailing string beginning with a character other than "β" is being registered according to the above procedure, a trailing string beginning with "β" may be registered if no comparison (retrieval) is necessary because of (A) or (B).

[6-2-4. Increasing the Efficiency of Index Updating (Addition)]

When a trailing string is added to (or registered in) the index, retrieval is performed for the index, with the trailing string to be added as the key, to determine the position at which it is to be inserted. However, when there is already another trailing string in the index whose leading string contain many leading characters that match those of the trailing string to be added, it takes long time to compare the former with the latter. This happens, for example, when a part of text is copied to another location and a trailing string beginning either at the copied part (changed position) or to the left of the copied part is registered (re-arranged) in the index.

The following explains the procedure to be used when one of two trailing strings containing the same characters except one is registered into the index where the other trailing string resides, without having to compare the same characters. This procedure is used to detect a condition under which such an insertion point is determined. When this condition is satisfied, the insertion point is also determined.

(A) Registering "αw" when the trailing string "w" is already registered in the index Assume that the trailing string "w" is registered between x and y (x<y) in the index as shown in Table 20. In the following description, let "βx" be a trailing string that is one character longer than x, and "γy" be a trailing string that is one character longer than y, respectively.

TABLE 20

| (index) |
|---|
| \| |
| \| |
| \| |
| \| |
| x |
| w |
| y |
| \| |
| \| |
| \| |
| \| |
| εt |
| βx |
| δs |
| \| |
| \| |
| \| |
| \| |
| ζp |
| γy |
| φq |
| \| |
| \| |
| \| |
| \| |

Under this condition, the position in which "αw" is to be registered may be determined based on the comparison in one character.

(1) When $\alpha=\beta$, αw is registered immediately after βx.
(2) When $\alpha=\gamma$, αw is registered immediately before γy.
(3) When δ s is immediately after βx, and when $\beta<\alpha<\delta$, αw is registered immediately after βx.
(4) When εt is immediately before βx, and when $\epsilon<\alpha<\beta$, αw is registered immediately before βx.
(5) When Δp is immediately before γy, and when $\Delta<\alpha<\gamma$, αw is registered immediately before γy.
(6) When φq is immediately after γy, and when $\gamma<\alpha<\phi$, αw is registered immediately after γy.

When none of these conditions is satisfied, retrieval is performed for the index, with "αw" as the key, to determine the insertion point.

All these conditions need not be checked. For example, if the check is made only for conditions (1) and (2) and these conditions are not true, retrieval may be performed for the index with "αw" as the key. This eliminates the need to compare keys (index retrieval) for a condition under which condition (1) or (2) is satisfied.

(B) Registering "w" when the trailing string "αw" is already registered in the index Assume that the trailing string "αw" is registered between βx and γy (βx<γy) in the index as shown in Table 21.

TABLE 21

| (index) |
|---|
| \| |
| \| |
| \| |
| \| |
| βx |
| αw |
| γy |
| \| |
| \| |
| \| |
| \| |
| x |
| y |
| \| |
| \| |
| \| |

Under this condition, the position in which "w" is to be registered may be determined in the following case, based on the comparison in one character.

(1) If x<y and x is adjacent to y in the index, and if $\alpha=\beta$ or $\alpha=\gamma$, then w is registered between x and y.

If this condition is not satisfied, retrieval is performed with "w" as the key to determine the insertion position.

[6-2-5. Increasing the Efficiency of the Procedure for Determining a Range Where Index Item Re-arranging Is Required to the Left of a Changed Position]

A procedure similar to that described in [6-2-4. Increasing the Efficiency of Index Updating (Addition)] may be used to find a position (starting position of a trailing string) where index re-arranging is required when the text is changed. This function is performed by the rearrangement determining means 14 shown in FIG. 36.

Whether or not a trailing string (including the text change position), which starts in a specific position, must be (or may be) re-arranged can be determined by checking if the trailing string immediately before or after the trailing string matches the trailing string itself in the contents of the leading string up to the changed position. To do so, the trailing string must be compared with the trailing string immediately before or after the trailing string in the index.

Figure 38:
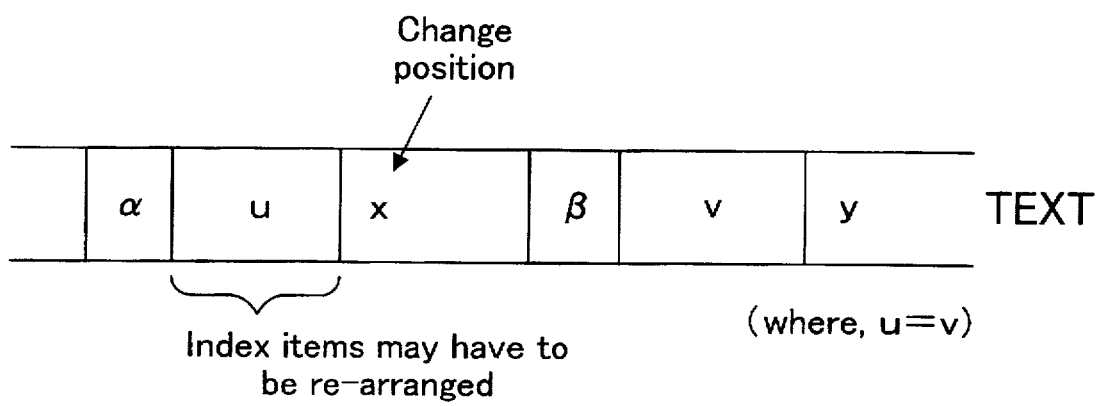
FIG. 38 is a diagram showing the operation of the sixth embodiment of this invention.

For example, when a long text is copied and a part of the text that is right to the copied text is changed as shown in FIG. 38, it is necessary to re-arrange index items for most of the copied part (all that is to the left of the changed position). However, to find all these items, it is necessary to compare approximately (length of copied part)×(length of copied part+2) characters on the average. That is, the number of characters that must be compared is proportional to the square of the length of the copied part (matching part). So, it takes longer as the matching part becomes longer.

The following procedure, which performs comparison only one character to determine whether to re-arrange index items, makes it possible to bypass the comparison of a long matching-part. In FIG. 38, assume that a long text is copied (u=v), that "vy" is immediately before or after "ux" in the index, and that the changed position is "x". In this case, all the trailing strings starting in the range "u" may have to have their index items re-arranged. This is because the index items for all the trailing strings starting in the range "u" are registered but, as a result of the change, their positions may have been changed.

Taking this as a known fact, the characters "α" and "β", which are immediately before u and v respectively, are compared. If α=β, then it can be said that, for the trailing string "αux ...", the index item may have to be re-arranged. Because αu=βv in this case, the position of the item within the index may be changed depending upon the character "x" in the changed position.

On the other hand, if α≠β, a check is made to see if "x" is involved in the comparison (that is, one of leading strings is "αu") by comparing the trailing string immediately before and after "αux ..." in the index with "αux ...". And, if "x" is involved in the comparison, it can be said that "the index may have to be re-arranged" for "αux..."; otherwise, it can be said that "the index item need not be re-arranged" for "αux ...". It also means that, for a trailing string (beginning at the left) that is longer than "αux ...", "the index item need not be re-arranged".

The rearrangement determining means 14 may be built so that it determines, in a table arranged lexicographically with the leading string of a trailing string as the key, if the leading strings of trailing strings containing the changed part must be re-arranged, in order of the leading strings of shorter trailing strings.

The rearrangement determining means 14 may also be built so that it determines, in a table arranged lexicographically with the leading string of a trailing string as the key, if the leading strings of trailing strings containing the changed part must be re-arranged, while selecting leading strings in binary search mode, one at a time, from those arranged in order of start positions.

[7. Seventh Embodiment]

In this embodiment, "dictionary data" and a "dictionary tree" used in the above embodiments are treated as a higher-level concept "index", and "text data" and a "text tree" as a higher-level concept "text". That is, "dictionary data" and a "dictionary tree" are thought of as implementations of an "index, and "text data" and a "text tree" are thought of as implementations of "text".

[7-1. Configuration of the Seventh Embodiment]

Figure 39:
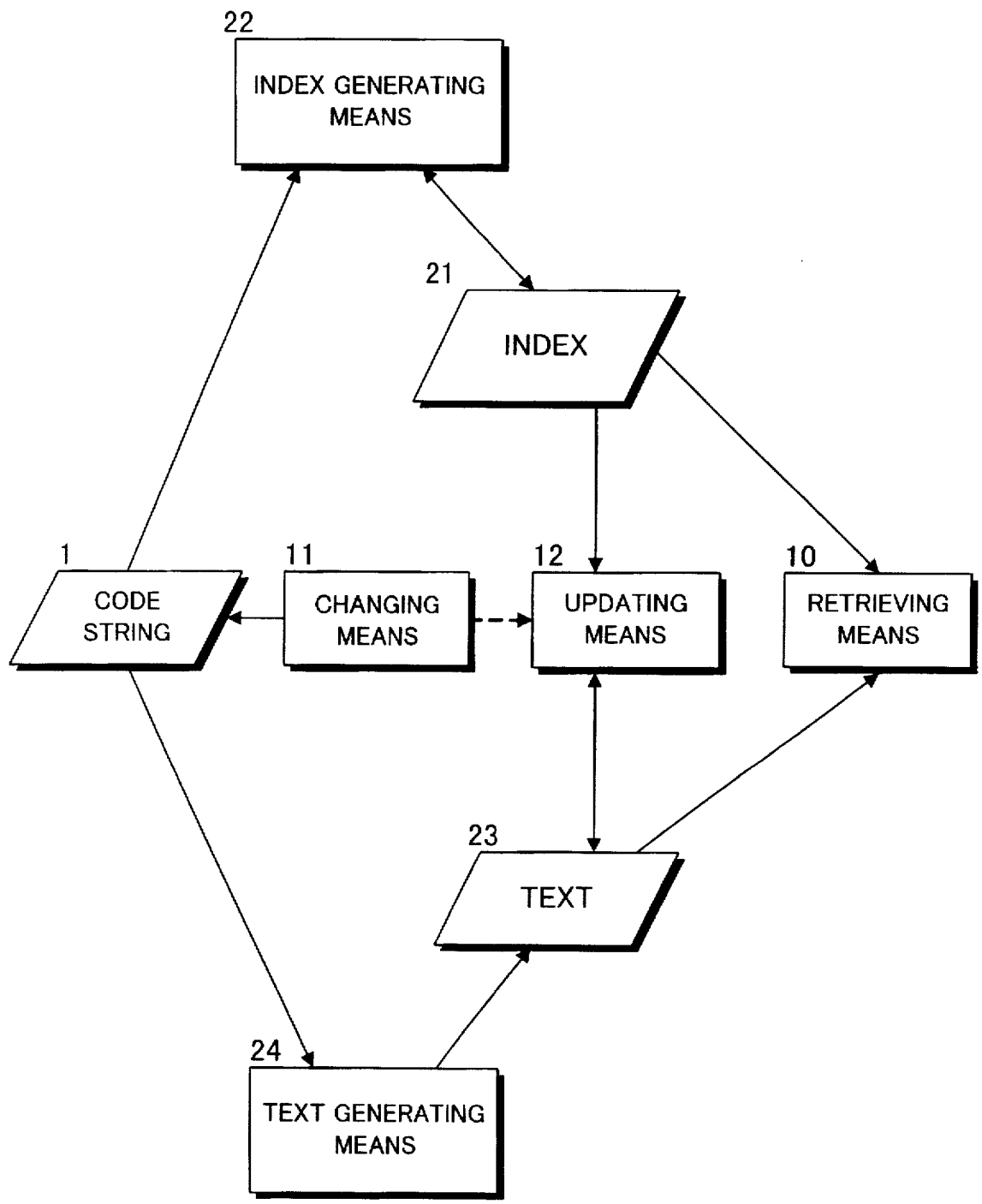
FIG. 39 is a functional block diagram showing the configuration of the seventh embodiment of this invention.

FIG. 39 is a functional block diagram showing the configuration of the seventh embodiment. That is, the data processing system in this embodiment has the index generating means 22 which arranges lexicographically the leading strings of the trailing strings for the code string 1 on which retrieval is performed with the use of a key string and generates the index 21 containing pairs each containing a trailing string and its position (that is, the start position of the leading string) within the code string. In addition, the data processing system has the text generating means 24 which generates the text 23.

In addition, the data processing system in this embodiment has the retrieving means 10 for retrieving a trailing string containing the whole or part of a key string, based on the index 21 and the text 23. This embodiment also has the changing means 11 for changing the code string 1 and the updating means 12 for updating, based on the change, the index 21 and the text 23 of the code string associated with the change.

The dashed line in FIG. 39, which connects the changing means 11 to the updating means 12, indicates that the changing means 11 informs the updating means 12 of the changes to be made to the code string 1 to cause the updating means 12 to update the index 21 and the text 23. Because, in the first to sixth embodiments described above, a code string may be restored from the text, the code string need not be stored once the text and the index have been generated. Therefore, the changing means 11 need only to inform the updating means 12 of the contents of a change. In this case, if the whole or a part of the code string must be restored, the code string restoring means (not shown in the figure) should be added.

[7-2. Functions of an index and a text]

This section explains the most general functions of an index and a text.

Configuration and function of an index (1) Index retrieval function

The following summarizes the index retrieval function.

(x1) An index item is a part consisting of a key-candidate substring (leading string of a trailing string) and its start position.

(x2) An index consists of the index items arranged lexicographically by key-candidate substring (leading string of trailing string).

(x3) The configuration (x2) allows the function to identify an index item which matches the leading string of the trailing string or an index item which does not exactly match but matches the leading string of the pattern for the longest length.

(x4) The configuration (x1) allows the function to determine the start position of a specified index item.

The basic function of an index is as described above. The retrieving means combines (x3) and (x4) to give us at least one start position of a key-candidate substring (leading string of a trailing string) which exactly matches a specified pattern or which matches the leading string of a specified pattern for the longest length.

The following function is available to list such key-candidate substrings (leading string of a trailing string) or their start positions.

(x5) When one or more index items are found in (x3), the function determines the first and the last item.

(x6) The function determines an item immediately before or after a specific index item.

That is, for any of the items from the first to the last determined in (x5), the function (x6) determines an item immediately before or after a specific index item. Then, all these index items are listed. And, for all these index items the function (x4) lists all, but non-duplicating, start positions of the substrings within the code string which exactly match the pattern or which match the pattern for the longest length.

To find the number of matching substrings, the following configuration and function are added to assign lexicographic order numbers to substrings.

(x7) The function assigns sequence numbers (lexicographic order) to index items from start to last in order of (x2).

(x8) The function returns the lexicographic order of a specified index item.

Combining the functions (x5) and (x8) gives us the number of matching substrings, as shown in the fifth embodiment described above.

An embodiment may contain the following function which includes the function (x6).

(x9) The function determines an index item with a specified lexicographic order number.

Combining the functions (x8) and (x9) gives us a function equivalent to the function (x6).

Sometimes, the following functions are necessary.

(x10) The function determines the relation (before/after) of two specified index items.

This function may be implemented by (x8), but other implementations may also be possible.

The following explains, more in detail, how unit functions (x3) and (x5) are implemented.

(1-1) Implementing the unit function (x3)

The following method is also possible to determine an index item (trailing string) having the longest leading string that matches the leading string of a pattern.

(a) First, the function searches, in binary search mode, the index for an index item whose first character matches the first character of the pattern.

(b) When the function finds an index item whose first character matches the first character of the pattern, it continues the search for an index item whose second character matches the second character of the pattern within the range delimited by the upper and lower limits of the search range determined at the termination time of step (a).

In this manner, when the function finds an index item whose first n characters match the first n characters of the pattern, it stores the index item as a candidate containing the longest matching leading string, and then it continues the binary tree search using the first n+1 characters of the pattern as the retrieval key.

When there is no index item whose first n+1 characters match those of the pattern, the function terminates the search and determines the previously-found index item whose first n characters match those of the pattern as an item containing the longest matching leading string.

On the other hand, when there is an index item whose first n+1 characters match those of the pattern, the function stores the index item as a new index item candidate containing the longest matching leading string, and extends the retrieval key to n+2 characters. This method is advantageous because the simple-to-use retrieval procedure ensures retrieval efficiency.

Figure 40:
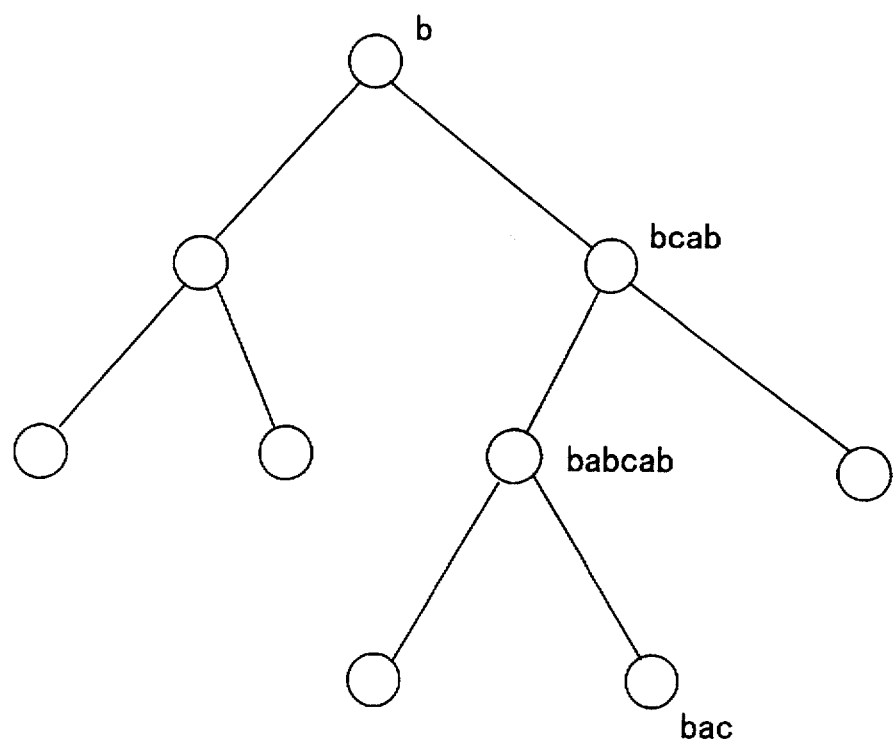
FIG. 40 is a diagram showing how the unit function (×3) is implemented.

Referring to FIG. 40, there is shown an implementation of the unit function (x3) mentioned above. In FIG. 40, assume that the user wants to retrieve the pattern "bac" from the index. The function first searches the index in binary tree search mode using the first character ("b") of the pattern, and finds that the root item "b" satisfies the condition. Because the pattern "bac" is larger than the root "b", the function follows the right path and continues the binary tree search by adding the second character (that is, "ba").

Because "ba" is smaller than "bcab" which is in the next node, the function follows the left path to reach the node "babcab". That is, the function finds an index item whose first two characters match those of the pattern "bac", stores the index item as an index item candidate containing the longest matching leading string, and extends the retrieval key to three characters (that is, "bac") to continue the binary tree search. Then, because the pattern "bac" is larger than the node "babcab", the function follows the right path to reach the node "bac".

That is, in retrieving a pattern, this function eliminates the need to go back to the root each time a character is added to the retrieval key; it simply goes down through the binary search tree, making the retrieval more efficient.

(1-2) Implementing the unit function (x5)

After an index item having the longest leading string that matches the leading string of the pattern has been determined by the above function (x3), the first or last index item which has a leading string identical to the matching leading string may be determined not only by sequentially searching for it with the function (x6) but also by performing the binary search as described below.

The following explains the unit function (x5) which performs the binary search to determine the last such index item.

Figure 41A:
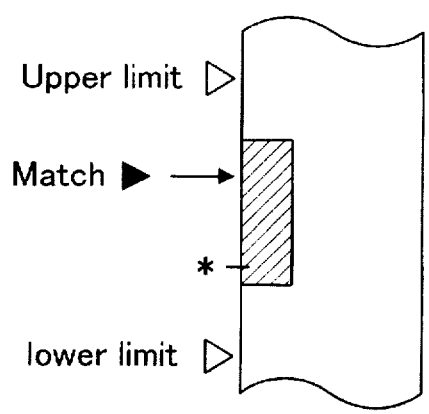
FIG. 41(A), FIG. 41(B) and FIG. 41(C) are diagrams showing how the unit function (×5) is implemented.
Figure 41B:
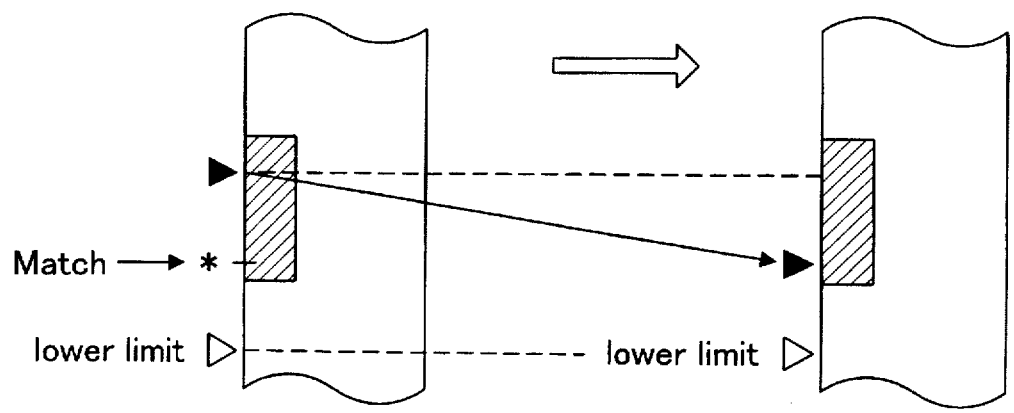
Figure 41C:
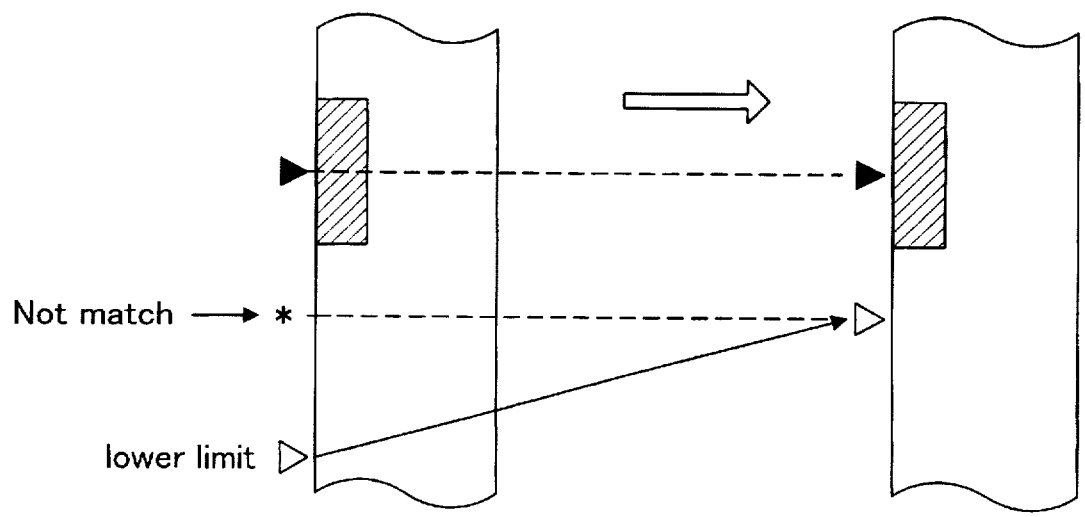

As shown in FIG. 41(A), after the function (x3) has determined an index item having the longest leading string which match that of the pattern, the function (x5) performs the binary search on the index items between that item and the lower limit item. When the leading string of the central item in the range match that of the pattern, the function marks the item to indicate that the item is the last-matching-item, as shown in FIG. 41(B). When the leading string of the central item does not match that of the pattern, the function moves the lower-limit mark to the item, as shown in FIG. 41(C).

Performing this binary search repeatedly until the last-matching-item mark comes next to the lower-limit mark enables the last matching index item to be determined efficiently.

The first index item may also be determined in the same manner as described above. These procedures are executed easily on an index structured as a binary search tree.

(2) Index update function

The following summarizes the index update function.

(x11) When the leading string of a trailing string is given, the function determines the index item immediately before or after which the index item containing the leading. string of the given trailing string is to be inserted (also determines if the insertion point is immediately before or after the position).

(x12) The function inserts a new index item immediately before or after a specified index item (whichever is specified).

(x13) The function deletes an index item from the index.

The functions (x11) and (x12) enable the index generating means 22 and the updating means 12 to add a new index item at a desired position within the index. Also, the function (x13) enables the updating means 12 to delete from the index an index item no longer necessary because of a change or an index item requiring re-arranging (deleted temporarily then re-arranged).

The leading string of a trailing string may be specified as a code string; preferably, it should be specified as a text item containing the leading string of the trailing string. This will be detailed later.

Configuration and function of a text (1) Text retrieval function

The following summarizes the text retrieval and code restoration function.

(t1) A text item consists of a key-candidate substring (leading string of a trailing string) and its start position.

(t2) A text consists of text items arranged in order of their start positions.

(t3) The configuration (t2) allows the function to identify a text item whose start position corresponds to a specified position within the code string.

(t4) The configuration (t1) allows the function to return the key-candidate substring (leading string of a trailing string) starting at the position specified in the given text item.

The basic function of a "text" is as described above. A code string may be restored by combining the functions (t3) and (t4) as follows. First, specify the start position of a code string to be restored. Then, (t3) determines the text item, and (t4) returns the leading string of the trailing string starting at that position. If the code string to be restored is equal to or shorter than the leading string of the trailing string, use that part of the leading string of the trailing string equal to the code string in length. On the other hand, if the code string to be restored is longer than the leading string of the trailing string, restore it as part of the code string, then move the start position to the right for the length of the leading string of the trailing string to restore the succeeding part with the use of (t3) and (t4). Repeat this operation until the restored code string equals the specified length.

When the text items for all the trailing strings are not generated, the following (extended or inclusive) function (t5) is used instead of the above function (t3).

(t5) The function determines a text item which starts at the specified position on the code string or which includes a start position which is the rightmost (toward the end) of those that are to the left (toward the start) (or a start position which is the leftmost (toward the start) of those that are to the right (toward the end)) of the specified position.

Further, the index item and the text item are just the same, substantially.

So, the configuration (t1) allows the next function which is equal to (x4).

(t7) The function determines the start position of the leading string of the trailing string, in the given text item.

In addition, the following simpler function, which may be implemented by (t3) or (t5) or (t7), is useful in such processing as update.

(t6) The function identifies the item immediately before or after a specified text item.

Of course, th is function may be implemented not only by (t3) or (t5) or by (t7) but by some other functions.

(2) Text update function

The following summarizes the text update function.

(t12) The function inserts a new text item immediately before or after a text item (whichever is specified).

(t13) The function deletes a text item from the text.

That is, the function (t12) allows the text generating means 24 to add text items, generated from an entered code string, to the text 23 to generate the text 23. The function (t13) allows the updating means 12 to delete text items, no longer necessary because of a change in the code string 1, from the text 23. In addition, the function (t12) allows the updating means 12 to add new text items to the text 23 as a character is inserted into or added to the code string 1.

Relation among the index generating means, text generating means and changing means This section explains how the index generating means, the text generating means, and changing means are related. In this embodiment, the index generating means 22 may be implemented by sequentially executing the index-related function of the updating means 12. For example, assume that there is an index (and text) corresponding to a null code string and that a code string is inserted at the start. In this case, the updating means 12 updates the index as if it generated the index. The same is true of the text generating means.

In this case, note that the changing means 11 is significant only when the code string 1 is stored separately from a text (and index). As described above, the code string need not be stored if the text code string restoration function is capable of storing it. So, the changing means 11, which simply informs the updating means 12 of the change, may be included in the updating means 12.

On the other hand, an independent index generating means and the text generating means are significant only in the following cases. When it is difficult or extremely inefficient to pass code strings to the updating means 12 as a parameter at a time, text items (and text) and index items are first generated and then index items are sequentially added to the index, with the shortest (leading string of a) trailing string first.

Adding a code string to the end (non-start position) of another code string usually affects all the trailing strings. This requires the updating means 12 to have to re-arrange all the existing index items in the index, decreasing the efficiency. The above method is used to prevent this condition. On the other hand, adding a code string to the start of a code string requires only new index items to be added; it does not require existing index items to be re-arranged. Thus, a code string, if entered beginning at the end, does not decrease the efficiency even when the updating means is used to generate index items sequentially.

The virtual meaning of this invention lies in the configuration and function of an index and text as well as in procedure of the updating means and retrieving means implemented by an index and text. The index generating means and the text generating means are not those independent component that are always required. Nor must the changing means be included unless a code string must be stored separately.

Retrieving means execution steps

From the description of the index configuration and function, the execution steps of the retrieving means which uses an index are self-explanatory. It should be remembered that, if the length of a key-candidate substring (leading string of a trailing string) in an index item is limited, the length of a pattern to be retrieved must not exceed the length.

(k1) The function finds the start position of a substring which matches the specified pattern or which matches the leading string of the specified pattern for the longest length (This means is used also to determine if such a substring is present).

This retrieving means may be implemented by combining the functions (x3) and (x4) of the index function described above.

(k2) The function finds the start positions of all the substrings which match the specified pattern or which match the leading string of the specified pattern for the longest length.

This retrieving means may be implemented by combining the functions (x4), (x5), and (x6) of the index function described above.

(k3) The function finds the number of substrings (start positions) which match the specified pattern or which match the leading string of the specified pattern for the longest length.

This retrieving means may be implemented by combining the functions (x5) and (x8) of the index function described above and by adding 1 to the difference between lexicographic orders of the first and the last ones. Or, it may be implemented by combining the functions (x5) and (x6) of the index function described above to sequentially count the corresponding index items.

In short, combining the functions (x4), (x5), and (x6) of the index function described above makes it possible to create the retrieving means capable of performing all the (k1), (k2), and (k3) functions.

To make the function (k1) more efficient, the function (x3) of the index function described above should be used; to make the function of (k3) more efficient, the function (x8) of the index function described above should be used. This is because (x3) is more efficient than (x5) and because (x8) which gives us lexicographic order numbers is more efficient than (x6).

When only one or two of the functions (k1), (k2), and (k3) are required, the retrieving means should include the index functions and their procedures specific to those functions. It should be noted that, when retrieving substrings with (x3) and (x5), the method described in [6-2-1. Increasing the Efficiency in Comparing Keys (Code Strings) at Index Retrieval Time], if used in comparing a key-candidate substring (leading string of a trailing string) with a pattern, improves comparison efficiency.

Updating means execution steps

The configuration and procedure of the updating means are not so simple as the retrieving means. In addition, the updating means, which performs operation on both an index and a text, has some limitations on the relation between index items and text items. On the other hand, whether or not the retrieving means has to access the text depends on the embodiment.

(p1) The function returns a text item at the same start position indicated by an index item.

(p2) The function returns an index item at the same start position indicated by a text item.

These two functions, as shown in the above embodiments, may be implemented in many ways; for example, index items and text items are integrated or are linked by pointers. These functions make it possible to keep only one set of a code which composes (the leading string of) a trailing string and its start position which are common to two items. This will be detailed later.

Various types of changes may be made on a code string by the following function.

(u) The function replaces n characters beginning at position P with the character string $s(s_0, s_1, \ldots, s_{k-1},$ length k).

Thus, the updating means using (u), if available, may be used to change a code string. As shown in the forth embodiment, changes may be made at a time to enhance efficiency.

The updating means consists of the following three procedures:

(1) Identifying index items to be re-arranged

A change to the code string may affect the key-candidate substring (leading string of a trailing string) of some index items. This procedure identifies which index item will move to another position in the index. Whether or not the index item should be temporarily deleted from the index depends on the embodiment.

This procedure is implemented, for example, by checking if, while listing the text items including a key-candidate substring (leading string of a trailing string) starting in a position before the position P with the use of the text functions (t4) and (t6), the key-candidate substring (leading string of a trailing string) of an index item obtained by (p2) matches that of the preceding or following index item obtained by the index function (x6) until the position P is reached. The procedure, described in [6-2-5. Increasing the Efficiency of the Procedure for Determining a Range Where Index Item Re-arranging Is Required to the Left of a Changed Position], may also be used.

(2) Updating the text

The updating means updates text items and the text as the code string is changed. That is, it updates a key-candidate substring (leading string of a trailing string) and its start position in a text item in the text to ensure compatibility with the change made by the function (u) described above. And, at the same time, it deletes a text item no longer necessary and adds a necessary text item.

There are many procedures for it. One of them is:

(a) For a text item whose key-candidate substring (leading string of a trailing string) contains the characters from position P to P+n−1 as a non-leading string (that is, its start position is P−1 or lower position), replace the trailing string starting in position P in the key-candidate substring (leading string of a trailing string) with the leading string of the code string consisting of a trailing string, starting in position P+n, preceded by the character string "s".

This may be done, as in (1), while listing the text items with the use of the text functions (t4) and (t6). For a text item whose leading string contains only one character, this step may be omitted.

(b) Update the key-candidate substring (leading string of a trailing string), as in step (a), for an index item whose start position is P−1 or lower. This may be done concurrently with step (a) by obtaining the corresponding index item with the use of the function (p2). Note that this step is done when the length of the key-candidate substring (leading string of a trailing string) contained in the index item is equal to or shorter than the length of the leading string of the trailing string contained in the corresponding text item (that is, the text item starting in the same position).

Depending upon the embodiment, the code string restoring means may be used to compare key-candidate substrings (leading string of a trailing string). In this case, the key-candidate substring (leading string of a trailing string) is not stored in the index item. The code string is restored using the text in the corresponding text item obtained by the function (p1). Therefore, updating a text item (text) according to step (a) automatically gives us the same result as is obtained by step (b).

(c) For a text item whose key-candidate substring (leading string of a trailing string) starts in a position between P and P+n−1 inclusively (start position P+i), replace the key-candidate substring (leading string of a trailing string) with the leading string of the changed trailing string, starting in position P+n, immediately preceded by the trailing string of s $(s_i, s_{i+1}, s_{k-1})$. This may also be done while listing the text items with the use of the text functions (t4) and (t6).

When n≠k, processing described in (e) and (f) below is necessary.

(d) Update the key-candidate substring (leading string of a trailing string), as in step (c), for an index item whose start position is between P and P+n−1 inclusively.

This may also be done concurrently with step (c) by obtaining the corresponding index item with the use of the function (p2).

When n≠k, processing described in (g) and (h) below is necessary.

(e) When n>k:

Delete a text item whose start position is between P+k and P+n−1 inclusively from the text, and subtract n−k from the start positions of all text items whose start position is P+n or higher.

The text functions (t3) and (t6) described above are used to find a text item to be deleted. The text function (t13) is used to delete a text item efficiently. To update a start position, the interval control method is used to update the start positions of text items.

(f) When n<k:

For each i in the range 0≦i<k−n, create a new text item that is a pair consisting of the leading string of the changed trailing string, formed by placing $s_{n+i}, s_{n+i+1}, \ldots, s_{k-1}$ immediately before a trailing string starting in position P+n, and its start position P+n+i. Then, add k−n to the start position of a text item whose start position is P+n or higher, and add the new text item to the text. The text function (t12) is used to add this text item. The interval control method is used to update the start position efficiently as in (e).

(g) When n>k:

Delete an index item whose start position is between P+k and P+n−1 from the index, and subtract n−k from the start positions of all index items whose start position is P+n or higher.

The function (p2) is used to find an index item to be deleted that corresponds to a text item obtained by the text functions (t3) and (t6), as in (e).

When the start position is contained in a text item and the index item references it with the use of (p1), the start position is already updated in step (e). When the start position is contained in both a text item and an index item, the interval control method is used to update it efficiently. Note that this is redundant because functionally-equivalent data is contained in both a text item and an index item.

(h) When n<k:

For each i in the range 0≦i<k−n, create a new index item that is a pair consisting of the leading string of the changed trailing string, formed by placing $s_{n+i}, s_{n+i+1}, \ldots, s_{k-1}$ immediately before a trailing string starting in position P+n, and its start position P+n+i. Then, add k−n to the start position of an index item whose start position is P+n or higher. The start position may be updated as in (g).

(3) Re-arranging index items

Register (re-arrange) an index item that was determined to be re-arranged in (1), an index item whose key-candidate substring (leading string of a trailing string) was updated in (d) of (2), and an index item created in (h) of (2) to the index.

Note that an index item whose key-candidate substring (leading string of a trailing string) was updated in (b) of (2) and which must be re-arranged is already determined in (1). The index function (x13) is used to delete an index item before it is re-arranged, and the index functions (x11) and (x12) to register an index item.

To register index items efficiently, they should be registered sequentially, beginning with the index item which has the largest start position; in this case, the method described in [6-2-4. Increasing the Efficiency of Index Updating (A)] may be used together. Or, they should be registered sequentially, beginning with the index item which has the smallest start position; in this case, the method described in [6-2-4. Increasing the Efficiency of Index Updating (B)] may be used together.

When retrieving an item from the index to determine, with the use of the index function (x11), the position at which a new item is to be added, the methods described in [6-2-2. Increasing the efficiency of Trailing String Comparison] and [6-2-1. Increasing the Efficiency in Comparing Keys (Code Strings) at Index Retrieval Time] may be used to compare one key-candidate substring (leading string of a trailing string) with another efficiently.

Note that the method described in [6-2-2. Increasing the efficiency of Trailing String Comparison] requires the following function.

(x14) The function checks the index to see if a specified index item is registered in it.

The three procedures described above may be grouped in any way and may be executed in any order. For example, (a),
(c), (e), and (f) of (2), which are for the text, may be grouped into one, and (1), and (b), (d), (g), and (h) of (2), and (3), which are for the index, may be grouped into one for execution. Step (1) and (b) of (2) may be executed at the same time.

When lexicographic order numbers are assigned to index items, that is, when the configuration and function of the index functions (x7), (x8), and (x9) are available, the above update procedure is not affected as long as the index update functions (x12) and (x13) update index items so that their configurations and functions are maintained.

The description of (2) is supplemented as follows. That is, when an existing text (index) item is updated in steps (c) and (d), the description may be changed to: "for a text item whose key-candidate substring (leading string of a trailing string) starts in position P+n−i (i≧1), replace the key-candidate substring with the leading string of the changed trailing string, starting in position P+n, immediately preceded by the trailing string of s $(s_i, s_{i+1}, \ldots, s_{k-1})$". That is, k text (index) items are selected from n text (index) items (when, k>n, n text items are selected) for re-use after update. Considering the efforts needed for text updating, it would be more useful that the text items remain the same before and after update. It is also possible to delete all the n text (index) items, to create k text (index) items, and then to register them back. Many variations are possible.

As described above, the data processing system according to this embodiment allows the retrieving means and the updating means to be configured as shown above, assuming that the index functions (x1) to (x14), text functions (t1) to (t13), as well as (p1) and (p2) are available.

[7-3. Variations of Seventh Embodiment]

This embodiment is not restricted to those described above. As with the retrieving means for which three functions (and their combinations) are available, a large number of implementations are possible depending upon these factors: (a) which unit functions are selected and how they are combined, (b) whether or not various types of efficiency improvement methods are used, and (c) how unit functions which depend on the index and text configurations are implemented.

One type of embodiment may be executed by the index generating means, index, and retrieving means only (The text is not generated, nor is the updating means used). Another type of embodiment, which contains the index generating means and text generating means to generate both a text and index, has only the retrieving means but does not update the text or index.

That is, a data retrieval system having the retrieving means and index generating means; a data processing system having the retrieving means and the updating means; and a data processing system having the retrieving mean, index generating means, changing means, and updating means are possible.

In addition, a data retrieval system having the retrieving means which has not only the retrieving function but also the code string restoring function, the index generating means, and the text generating means; a data processing system having the retrieving means which has not only the retrieving function but also the code string restoring function and the updating means; and a data processing system having the retrieving means which has not only the retrieving function but also the code string restoring function, index generating means, text generating means, changing means, and updating means are possible.

A data retrieval system which has the retrieving means for outputting the number of trailing strings whose leading strings contain the whole or a part of a key string based on the sequence numbers assigned to index items and which has the index generating means for generating index items to which sequence numbers are assigned is possible.

A data processing system which has the retrieving means for outputting the number of trailing strings whose leading strings contain the whole or a part of a key string based on the sequence numbers assigned to index items and which has the updating means for updating the sequence of index items is possible. In addition, a data processing system which has the retrieving means for outputting the number of trailing strings whose leading strings contain the whole or a part of a key string based on the sequence numbers assigned to index items, which has the index generating means for generating index items to which sequence numbers are assigned, and which has the updating means for updating the sequence of index items is possible.

In the above data retrieval system or data processing system, the length of a key-candidate substring, which is an entry of the index, may or may not be limited. A text used on the above data retrieval system or data processing system may be represented by the addresses of contiguous storage locations where the code string is stored. In addition, the updating means used on the above data retrieval system or data processing system may process a plurality of changes to the code string at a time.

[8. Eighth Embodiment]

This embodiment integrates the nodes of dictionary data and text data shown in FIG. 2, with the lexicographic order being represented by partial interval lengths. This embodiment may be applied to both a data processing system and a data retrieval system.

Figure 42:
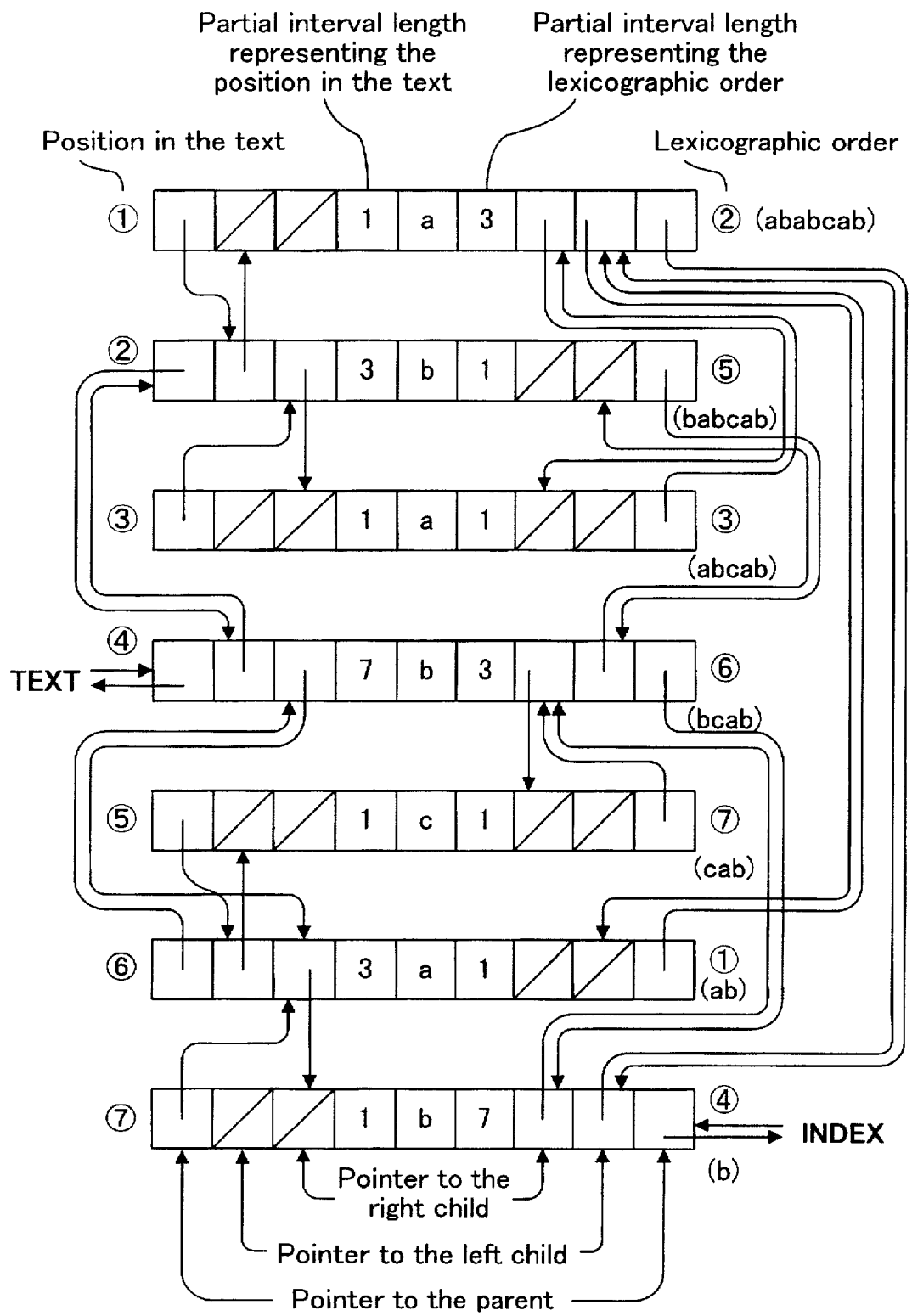
FIG. 42 is a diagram showing the configuration of the eighth embodiment of this invention.

As shown in FIG. 42, the left half is a binary tree representing a text. Each node contains a character stored in each position of the code string. This character is also the first character of the trailing string starting in that position.

The interval control method determines the node corresponding to a specified position and, at the same time, determines the immediately preceding and following nodes of a specified node. This means that the interval control method may be used to restore the leading string of a specified trailing string from a binary tree representing the text.

In addition, the interval control method may be used to determine an interval which is indicated by a specified node, that is, the start position of the leading string of the trailing string corresponding to the specified node.

Therefore, the binary tree represented in the left half of FIG. 42 is functionally equivalent to Table 22 containing pairs each consisting of a key-candidate substring (leading string of a trailing string) and its start position, arranged in order of start positions. From this binary tree, the system can retrieve a part of a specified position and the corresponding key-candidate substring (leading string of a trailing string).

TABLE 22

| Key-candidate substring | Start position |
|---|---|
| a b a b c a b | 1 |
| b a b c a b | 2 |
| a b c a b | 3 |
| b c a b | 4 |
| c a b | 5 |
| a b | 6 |
| b | 7 |

On the other hand, the right half of FIG. 42 is a binary tree representing an index. The right half of FIG. 42, if processed by the code string restoration function described above, is functionally equivalent to Table 23 containing lexicographically-arranged key-candidate substrings (leading string of a trailing string) each having an lexicographic order number. From this binary tree, the system can retrieve a trailing string whose leading string matches a specified code string for the maximum length and can determine the sequential number of the trailing string within the table. In addition, the interval control method gives us the trailing string corresponding to a specified lexicographic order number.

TABLE 23

| Lexicographic order | Key-candidate substring |
|---|---|
| 1 | a b |
| 2 | a b a b c a b |
| 3 | a b c a b |
| 4 | b |
| 5 | b a b c a b |
| 6 | b c a b |
| 7 | c a b |

As described above, the start position of each trailing string is determined by the partial interval lengths in the left half of the binary true. So, the structure in FIG. 42 serves as two different tables, consisting of key-candidate substrings, their lexicographic order their start positions, that can be accessed by two different keys (by start position sequence and by lexicographic order (and lexicographic order numbers) of trailing strings). As shown in Table 24, one record can be accessed in two different ways.

TABLE 24

| Lexicographic order | Key-candidate substring | Start position |
|---|---|---|
| (Index) | | |
| 1 | a b | 6 |
| 2 | a b a b c a b | 1 |
| 3 | a b c a b | 3 |
| 4 | b | 7 |
| 5 | b a b c a b | 2 |
| 6 | b c a b | 4 |
| 7 | c a b | 5 |
| (Text) | | |
| 2 | a b a b c a b | 1 |
| 5 | b a b c a b | 2 |
| 3 | a b c a b | 3 |
| 6 | b c a b | 4 |
| 7 | c a b | 5 |
| 1 | a b | 6 |
| 4 | b | 7 |

In this manner, this embodiment integrates the nodes of a binary tree representing an index and the nodes of a binary tree representing a text into one to allow one specific node to serve both as an index item and as a text item. Two identical records in Table 24, one in the index part and the other in the text part, correspond to one node.

The data structure in this embodiment, used in conjunction with the binary (search) tree operation method known as prior arts and interval control method, enables the above-mentioned index functions (x1) to (x13), text functions (t1) to (t7), (t12), and (t13), as well as (p1) and (p2), to be executed. Thus, this data structure enables the retrieving means and updating means, which use these functions, to be created.

[9. Ninth embodiment]

In this embodiment, an index and a text are structured so that the above-described index and text functions (x1) to (x14), (t1) to (t7), (t12), (t13), (p1), and (p2) may be provided at the same time. That is, this embodiment explains that the index and text functions shown in the seventh embodiment may be implemented and executed in the configuration shown in FIG. 42 in the eighth embodiment.

[b 9-1. Text Retrieval Function]

In the data structure shown in FIG. 42, the code in a node and the fields to the left of the code are used to implement text functions. That is, the structure consisting of nodes, each consisting of a pointer, partial interval length, and code, is characterized in that (a) the structure is a binary search tree, (b) the nodes are arranged in order of code positions in the text (inorder of LCR=Left-Center-Right order), and (c) each node (code) is assigned an interval of length 1, corresponding to the code position, using a partial interval length and the interval control method. In other words, data in Table 12 shown in [3-3. Combining with the text] in the third embodiment is embodied by a binary search tree and the interval control method.

The following explains how each function is implemented.

First, a "text item" defined by (t1) is implemented as a node. A key-candidate substring is a one-character substring consisting only of a code stored in the node. As described in "* Configuration and function of a text* (1) Text retrieval function" in the seventh embodiment, it may be extended to any length. The start position is associated, by the interval control method, with the position within the code string which is the leftmost of the interval represented by the node. Therefore, this structure, which consists of the nodes (text items) arranged in the order in which start positions are arranged in LCR order, implements the structure defined by (t2).

The function (t3) is implemented as follows. That is, when the retrieval function of the interval control method is used to specify a position within the code string (that is, the number of characters from the start) and the node representing the interval containing the position is determined, the node corresponds to a text item including the leading string of the trailing string starting in the specified position.

In addition, since each node contains a one-character code located in the interval of length 1 represented by the node, (t3) may be used to retrieve a text item by sequentially specifying the start position and subsequent positions, one at a time, and by concatenating the codes stored in the obtained nodes, the leading string of any length of any trailing string (that is, a substring of any length starting in any position in the text) may be restored. This capability implements the function (t4) and the configuration (t1).

On the other hand, the interval control method may be used to determine an interval which is indicated by a specified node, that is, the start position of the text item corresponding to the specified node. This capability implements the function (t7).

In a binary search tree, the function used to determine the adjacent node in the LCR order may be used to implement the function (t6).

Figure 43:
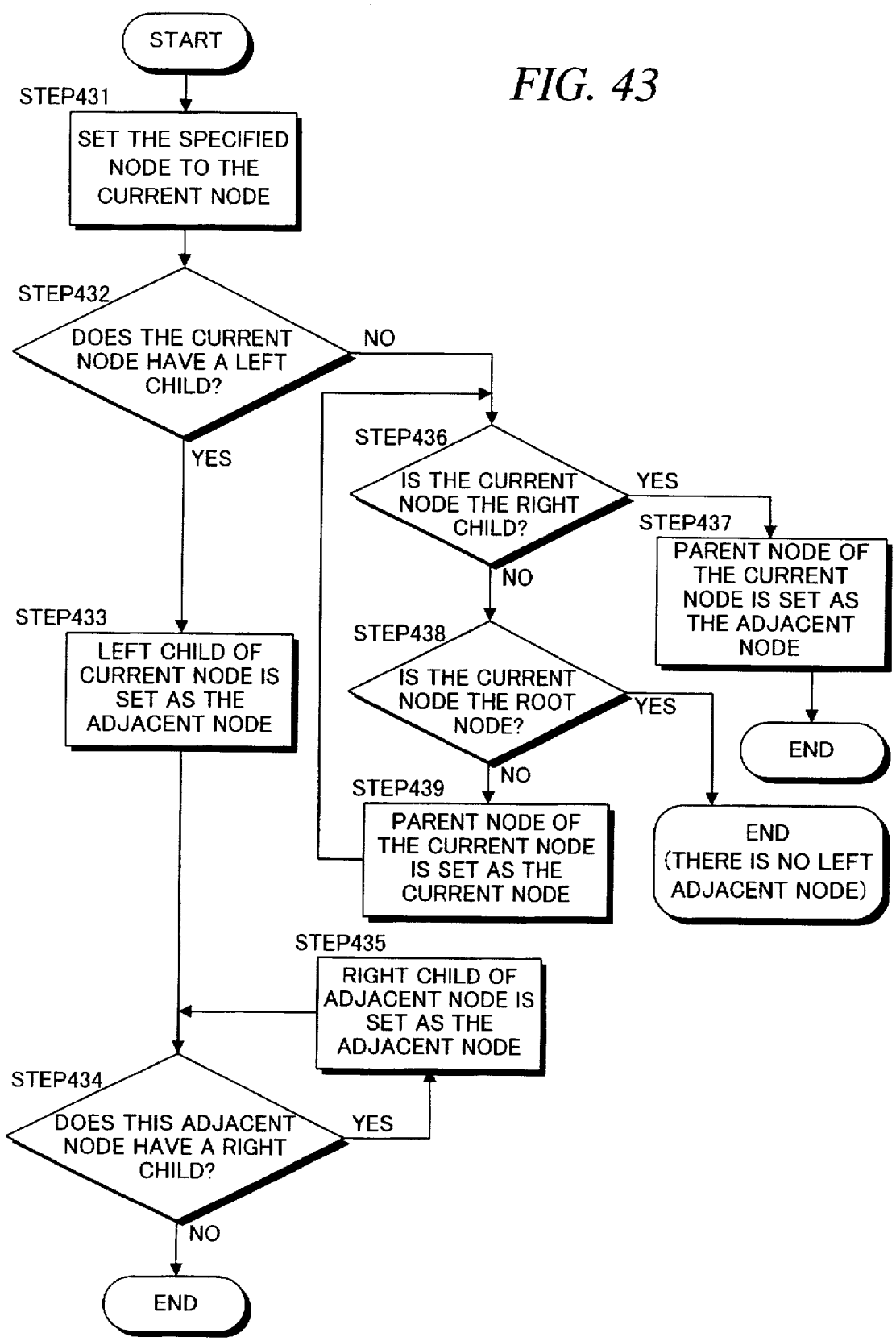
FIG. 43 is a flowchart showing the procedure for determining the node immediately preceding a specified node.

The following explains one of the simplest procedures for determining the node immediately preceding a specified node (that is, the node on the left adjacent side) by referring to FIG. 43.

As shown in FIG. 43, a specified node is set as the current node (step 431), and if the current node has a left child (step 432), the left child of the current node is set as adjacent node (step 433). Then, if this adjacent node has a right child (step 434), this right child of the adjacent node is set as the adjacent node (step 435). While the adjacent node has a right child, step 434 and step 435 are repeated.

On the other hand, if an adjacent node does not have a right child, that adjacent node is determined as the node immediately preceding a specified node (that is, the node on the left adjacent side). Further, in step 432, if the current node does not have a left child, the next step retrieves whether or not the current node is the right child (step 436). If the current node is the right child, the parent node of the current node is set as adjacent node (step 437). That is, the parent node of the current node is determined as the node immediately preceding a specified node (that is, the node on the left adjacent side).

In addition, in step 436, if the current node is not the right child, the next step retrieves whether or not the current node is the root node (step 438). If the current node is the root node, it is determined that there is no left adjacent node of the specified node. On the other hand, if the current node is not root node, the parent node of the node is set as the current node (step 439) and control returns to step 436.

In addition, there is another method in which "Splaying" is used: Splaying changes the structure of a binary tree so that any particular node becomes the root (Reference: Robert Endre Tarjan. "4.3 Self-Adjusting binary trees (pp. 53–56)" in Data Structures and Network Algorithms).

Figure 44:
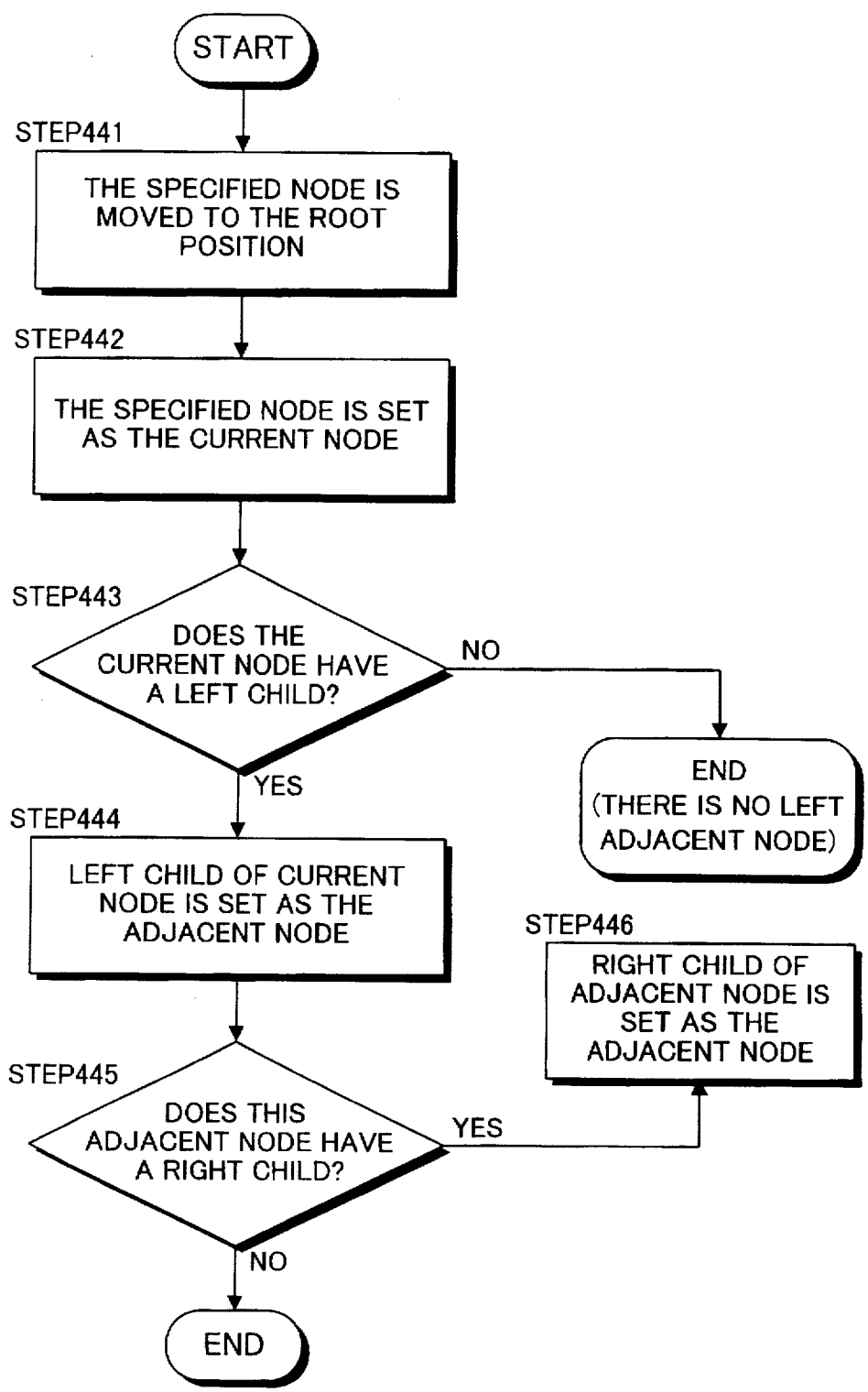
FIG. 44 is a flowchart showing the procedure for determining the node immediately preceding a specified node by splaying.

As shown in FIG. 44, a specified node is moved to the root position by using "splaying" (step 441). Then, the specified node is set as the current node (step 442), and if the current node has a left child (step 443), the left child of the current node is set as the adjacent node (step 444). Then, if this adjacent node has a right child (step 445), this right child of the adjacent node is set as the adjacent node (step 446). While the adjacent node has a right child, step 445 and step 446 are repeated.

On the other hand, in step 445, if an adjacent node does not have a right child, that adjacent node is determined as the node immediately preceding a specified node (that is, the node on the left adjacent side). Further, in step 443, if the current node does not have a left child, it is determined that there is no left adjacent node of the specified node.

Or, the left adjacent (right adjacent) node may be determined by obtaining the start position of the trailing string represented by the specified node (that is, the left (right) end position of the interval represented by the specified node), with the use of the function (x4) described later and by retrieving the node corresponding to the position, which is the obtained position minus (plus) one, with the use of the function (t3).

In the eighth embodiment described above, the function (t5) is equivalent to the function (t3) in a special case. However, it should be remembered that the retrieval function of the interval control method performs the same function even if there is an interval whose length is not 1. Therefore, when an interval whose length is not 1 is included in a configuration similar to that shown in the eighth embodiment, the function performed by (t5) may be executed by the function of (t3) described above.

[9-2. Text Update Function]

The function (t12) is implemented by storing the first character of (the leading string of) the trailing string of a new text item into a new node and by adding the new node immediately before or after the specified node with the use of the addition procedure of the interval control method with the interval length represented by the new node being 1.

In this case, since (the leading string of) the trailing string of the text item is part of the text, only the first character needs to be inserted as a node into the configuration shown in FIG. 42; the second and the following characters can be restored from the existing text. (This restoration function performs its function equivalently even after the node is inserted). Insertion of a node containing one character means that one character is inserted into the code string.

The function (t13) may be implemented by the node (interval) deletion procedure of the interval control method. That is, deletion of a text item (node) means that the first character (one character stored in the node) of (the leading string of) the trailing string is deleted from the code string.

The functions (p1) and (p2) are implemented by combining an index item and a text item, each containing a trailing string starting in the same position, into one node in the data structure shown in FIG. 42.

[9-3. Index Retrieval Function]

An index is the whole data structure shown in FIG. 42, and an "index item" defined by (x1) corresponds to one node. An "index" defined by (x2) is a binary search tree configured by the right pointers of the nodes, and the LCR order of the nodes of this binary search tree corresponds to the lexicographic order of the trailing strings of the nodes (index items).

The function (x3) is implemented as follows. In the binary search tree, the specified pattern is compared with (the leading string of) the trailing string in each node in the lexicographic order beginning with the start. If a trailing string whose leading string matches the whole pattern is found, the index item is one of the index items to be searched for.

If there is no trailing string whose leading string matches the whole pattern, processing is performed as follows. If a trailing string Sa of the last-reached node a is smaller (or larger) than the pattern when compared in the lexicographic order, it is compared with the trailing string Sb of the node b immediately after (or before) node a. And, an index item containing a trailing string, either the trailing string Sa of the last-reached node a or the trailing string Sb of the node b immediately after or before node a which matches the pattern for a longer length, is the index item (node) to be searched for. If the node b does not exist, an index item of the node a is the index item to be searched for. Note that the node b (if node b exists) has been reached in the binary search process before the node a is reached.

The binary search method used for implementing the function (x3) is not limited to the one described above. For example, the methods described in "(1-1) Unit function (x3) implementation" shown in the seventh embodiment or [6-2-1. Increasing the Efficiency in Comparing Keys (Code Strings) at Index Retrieval Time] in the sixth embodiment are possible.

The function (x4) is implemented as follows. Because the structure shown in FIG. 42 contains, in its left half, a binary search tree representing the text based on the interval control method as described above, specifying a text item (node), which is combined with an index item, gives us the start position of (the leading string of) the trailing string corresponding to the node. This is done by a function, provided by the interval control method, which calculates the position of an interval representing the node in the binary search tree. This is equivalent to implementing the function (t7) described above.

Since an index binary search tree and a text binary search tree are structured in the same manner (procedure), (x6) is implemented in the same manner as (t6).

To implement the function (x5) effectively, "(1-2) Unit function (x5) implementation" shown in the seventh embodiment is used. In the configuration shown in FIG. 42 where the index is implemented as a binary search tree, this method should be applied to a sub-tree whose root is one of the nodes (representing index items) containing a trailing string having a leading string that matches the pattern for the longest length and whose root is the nearest to the root of the tree. In that case, there is no need to assign initial values for the upper and lower limits; they should be set when there is a mismatching node.

Figure 45:
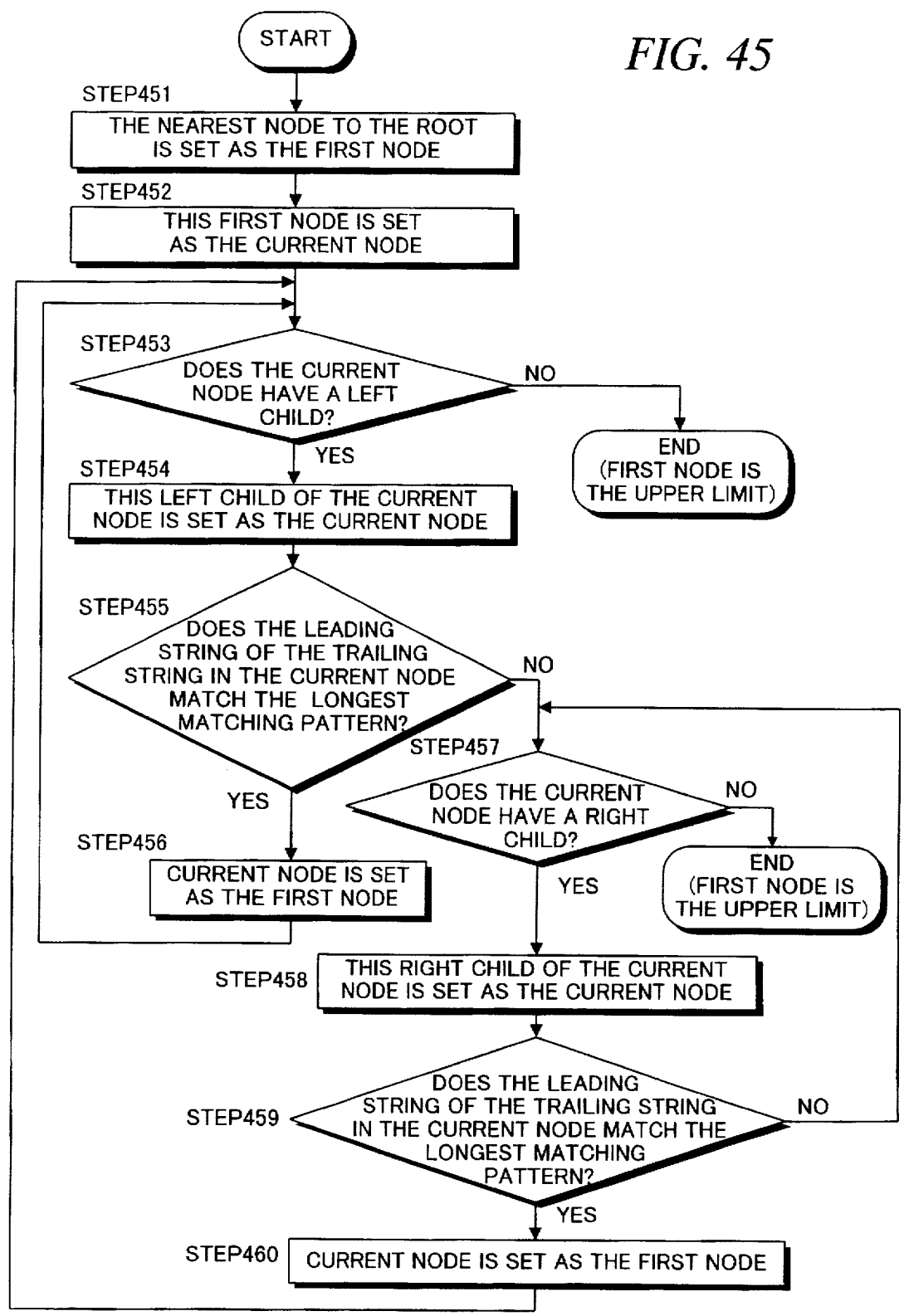
FIG. 45 is a flowchart showing the procedure for determining the first node.

The following explains the procedure for determining the first node (upper limit) of the nodes (representing index items) containing a trailing string having a leading string that matches the pattern for the longest length, by referring to FIG. 45.

As shown in FIG. 45, one of nodes described above nearest to the root is set as the first node (step 451) and this first node is set as the current node (step 452). Then, check whether or not current node has left child (step 453), if current node has no left child, current node is determined as first node and first node is the upper limit.

On the other hand, if current node has left child, this left child of current node is set as the current node (step 454). Then, check whether or not leading string of trailing string in current node matches longest matching pattern (step 455), if it matches, current node is set as the first node (step 456) and return to step 453.

Further, in step 455, if there is a mismatch, check whether or not current node has right child (step 457). If current node has no right child, first node is the upper limit. On the other hand, if current node has right child, this right child of current node is set as the current node (step 458) and check whether or not leading string of trailing string in current node matches longest matching pattern (step 459). If it matches, current node set first node (step 460) and return to step 453, check whether or not current node has left child. If there is a mismatch, return to step 457, check whether or not current node has right child.

In step 451 described above, in order to assign one of the nodes nearest to the root, the method described in "(1-1) Unit function (x3) implementation" shown in the seventh embodiment should be used to determine the node nearest to the root. Or, the node nearest to the root may also be determined by checking if the leading string of the specified pattern matches the leading string of a trailing string in a node while following the path from the node determined by (x3) (that is, node containing an index item that matches the leading string of the pattern for the longest length) to the root. In that case, once a mismatching node is found, the check may be suspended because it is apparent that any node on the path from that node to the root does not match the leading string of the pattern.

In addition, the splaying operation may be applied to the node determined by (x3) to move the node to the root, which may be used as the initial value of the first node.

The functions (x7), (x8), and (x9) are implemented in the binary search tree (right half of the structure in FIG. 42) by assigning to each node a partial interval length field with which an interval of length 1 is associated (corresponding to the lexicographic order) and by managing the nodes with the interval control method. The function (x8) is implemented, as with the function (x4), by the procedure for calculating an interval position, which represents an index item, with the use of the interval control method. The function (x9) is executed, as with the function (t3), by retrieving in the binary search tree which represents the index.

The function (x10) is implemented by comparing the positions of the index items of two nodes within the index (number of items from the start) with the use of the function (x8), as described in "* Configuration and function of an index * (1) Index retrieval function" in the seventh embodiment. Or, the relation of two index items may be determined by following the path from the root to a node. That is, when the first differing pointer is detected (branch point), the relation may be determined by checking which index item follows the pointer to the left child or to the right child.

[9-4. Index Update Function]

The function (x1) may be implemented, as with the function (x3), by searching the index binary search tree with the leading string of a not-registered trailing string as the pattern. When the length of the leading string of a trailing string is not limited (that is, an index item contains a trailing string), there should not be a trailing string duplication. This means that the binary search operation on a binary search tree causes control always to be moved either to the left or to the right child except when there is no corresponding node, in which case the search is terminated. When the search is terminated, the result of (x11) is the index item representing the last-reached node and the child to which control is to be moved (inserted immediately before for the left child, or inserted immediately after for the right child).

When the length of the leading string of a trailing string in an index item is limited, the trailing string may be duplicated. In this case, an index item may be inserted either immediately before or immediately after the determined position (node). Of course, when there is no duplication, an item is added according to the procedure for inserting an item whose length is not limited.

Because an index item and a text item are combined, a text item has already been registered in the text binary search tree when the function (x12) is executed to register (add) a node into the index binary search tree as a new index item. Therefore, to insert a new index item immediately before or after an index item, a node corresponding to an interval of length 1 need only be added to the index binary tree by the node (interval) addition procedure of the interval control method.

When the function (x13) is executed, the deletion procedure is used to delete a node, which represents an index item, from the index binary search tree. In this case, the left half of the structure (including the code) shown in FIG. 42 need not be changed because deletion of a node, which represents an index item, does not affect the text item.

To implement the function (x14), a special value, which indicates that the value is not a pointer, is set in the pointer field (right pointer of the node in FIG. 42) of a node that is not registered in the index binary search tree. Or, whether or not an index item is registered may be checked by registering a node in an non-index binary tree and then determining the binary tree to which each node belongs (This is done by setting a special pointer or value in the pointer to the parent of the root node).

As described above, the data structure shown in FIG. 42 makes it possible to implement the index and text functions (x1) to (x14), (t1) to (t6), (t12), (t13), (p1), and (p2). It should be noted that the implementation of each function is not limited to the method described above. The seventh embodiment, which is based on a higher concept of these functions, may be implemented using the data structure shown in FIG. 42.

[10. Tenth Embodiment]

This embodiment uses an index and a text, such as those shown in Table 24, to realize a procedure described in [6-2-5. Increasing the Efficiency of the Procedure for Determining a Range Where Index Item Re-arranging Is Required to the Left of a Changed Position].

Figure 46:
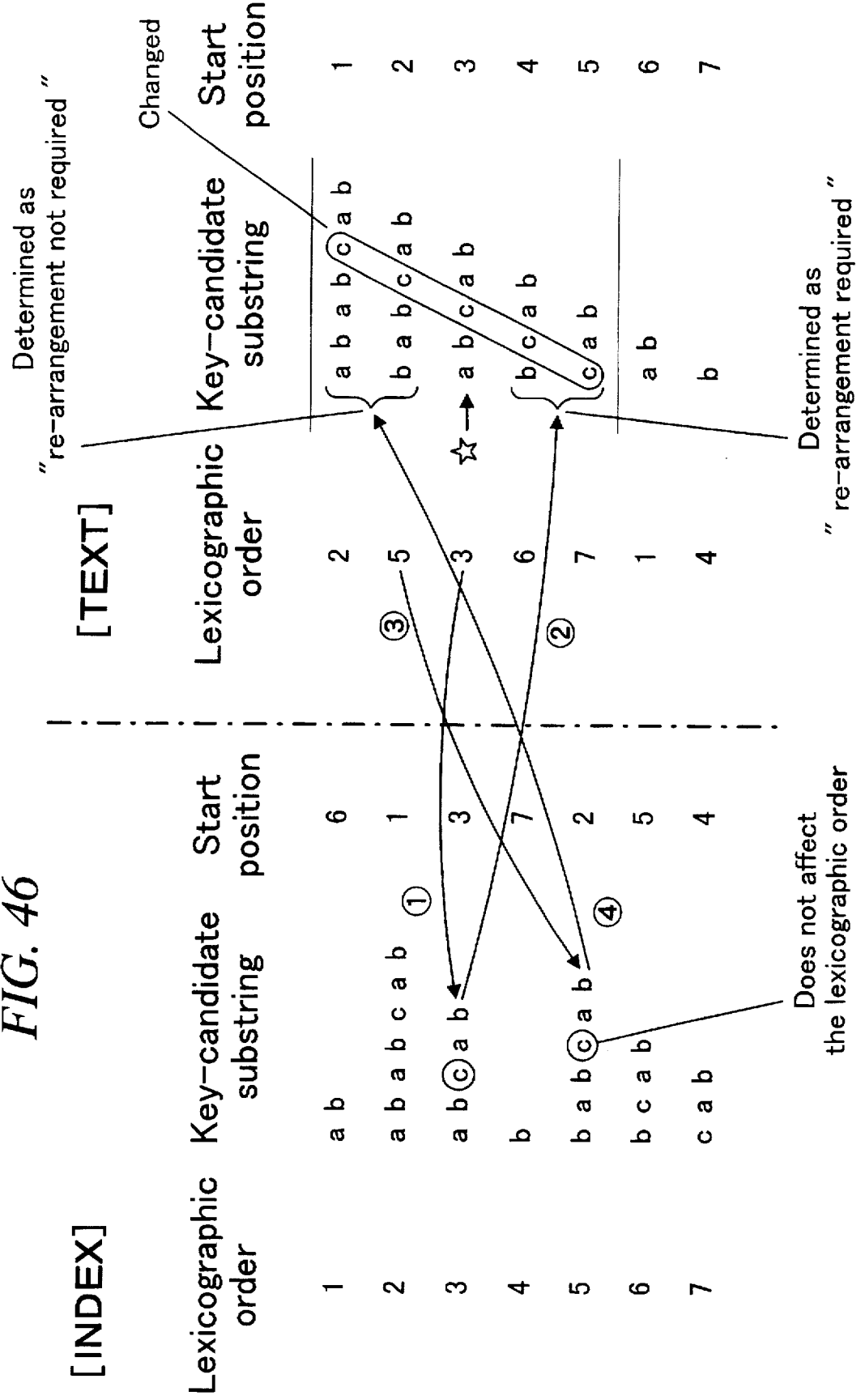
FIG. 46 is a diagram illustrating the operation of the ninth embodiment of this invention.
Figure 48:
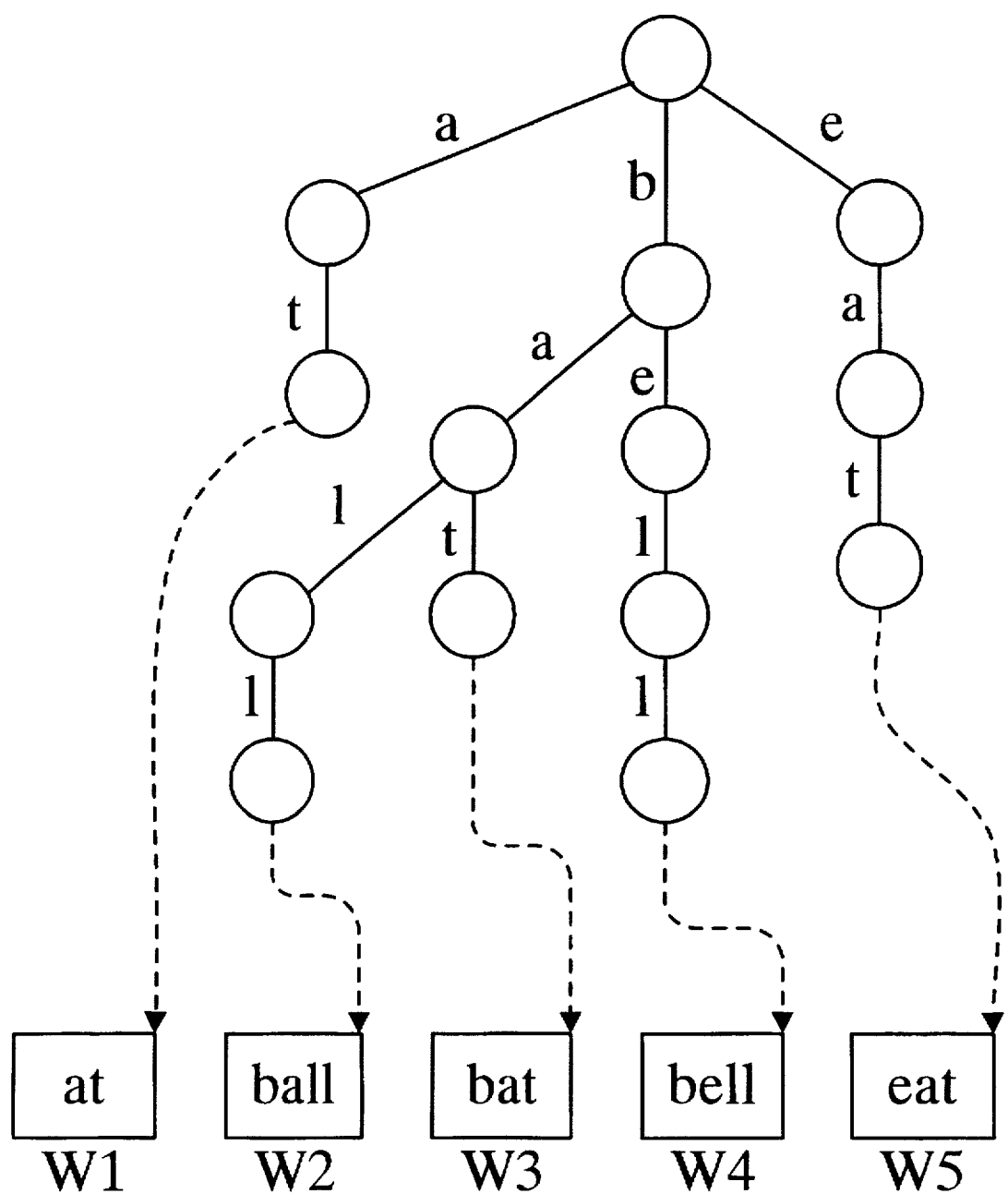
FIG. 48 is an example of a conventional Trie.
Figures 49, 50:
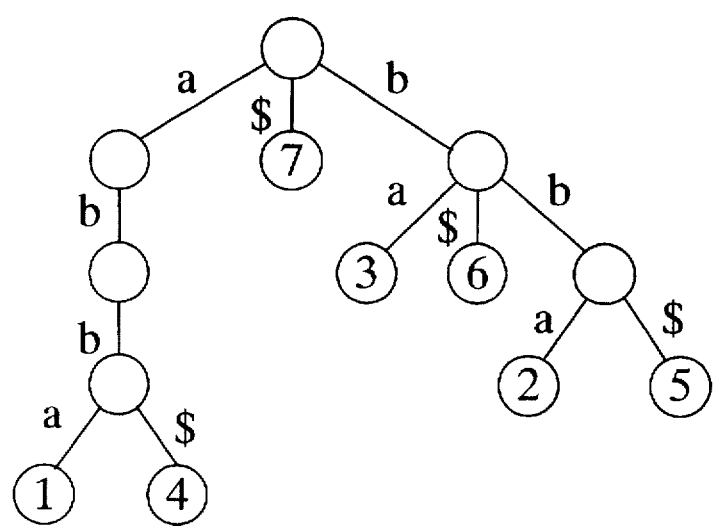
FIG. 49 is an example of positions and substring identifiers in a code string used in a conventional code string retrieval.
FIG. 50 is an example of a conventional position tree.
Figure 51:
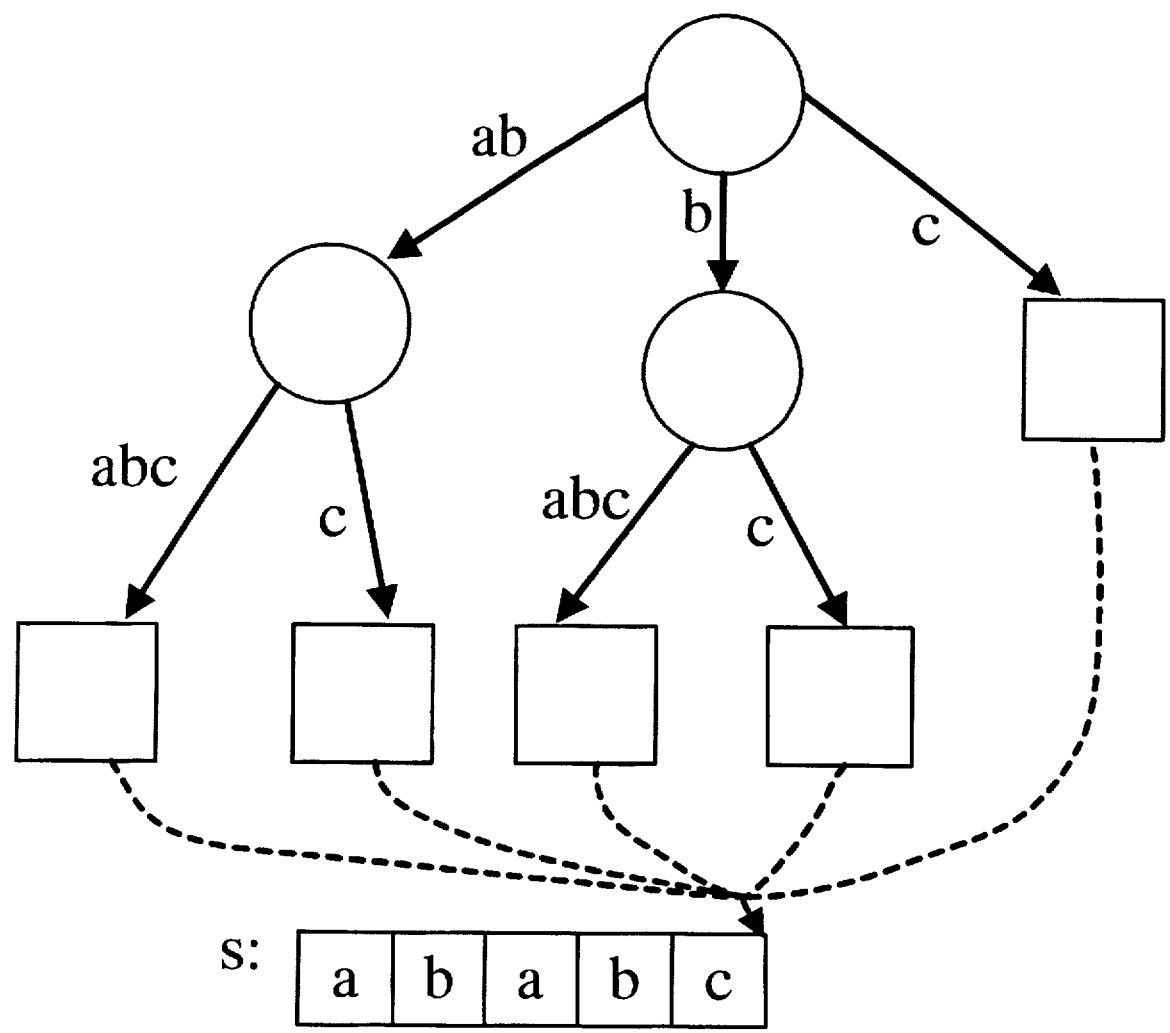
FIG. 51 is an example of a conventional suffix tree.
Figure 52:
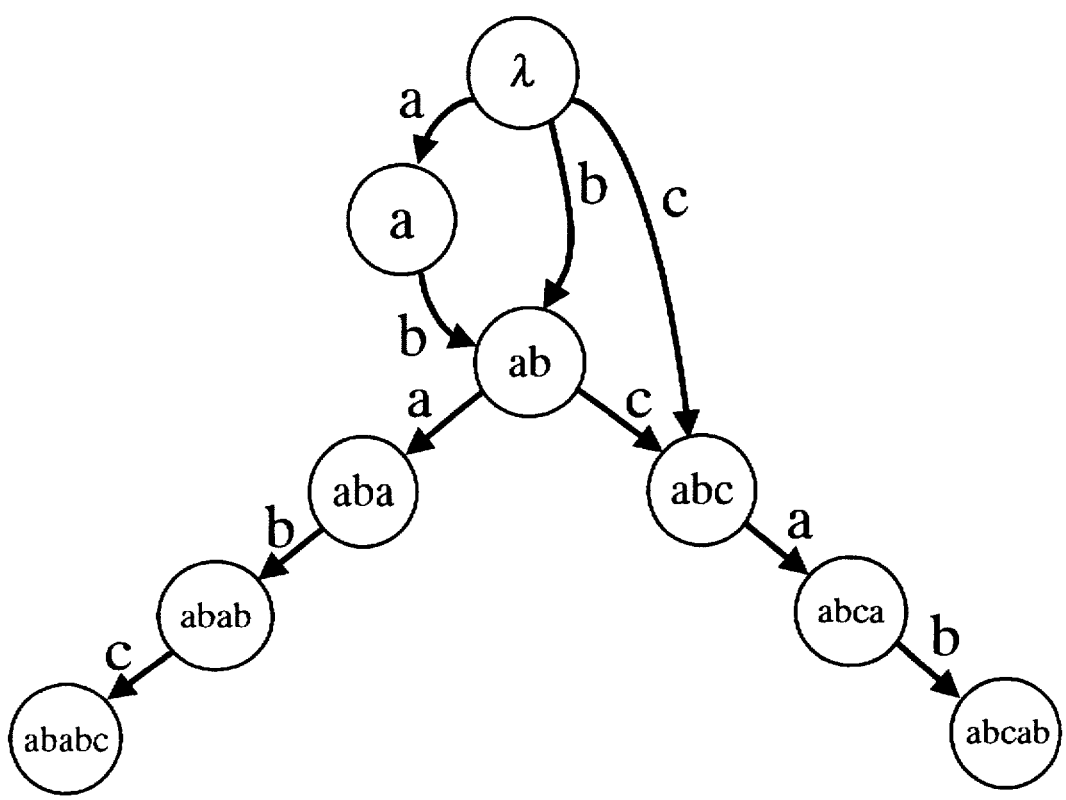
FIG. 52 is an example of a conventional directed acyclic word graph.
Figure 56:
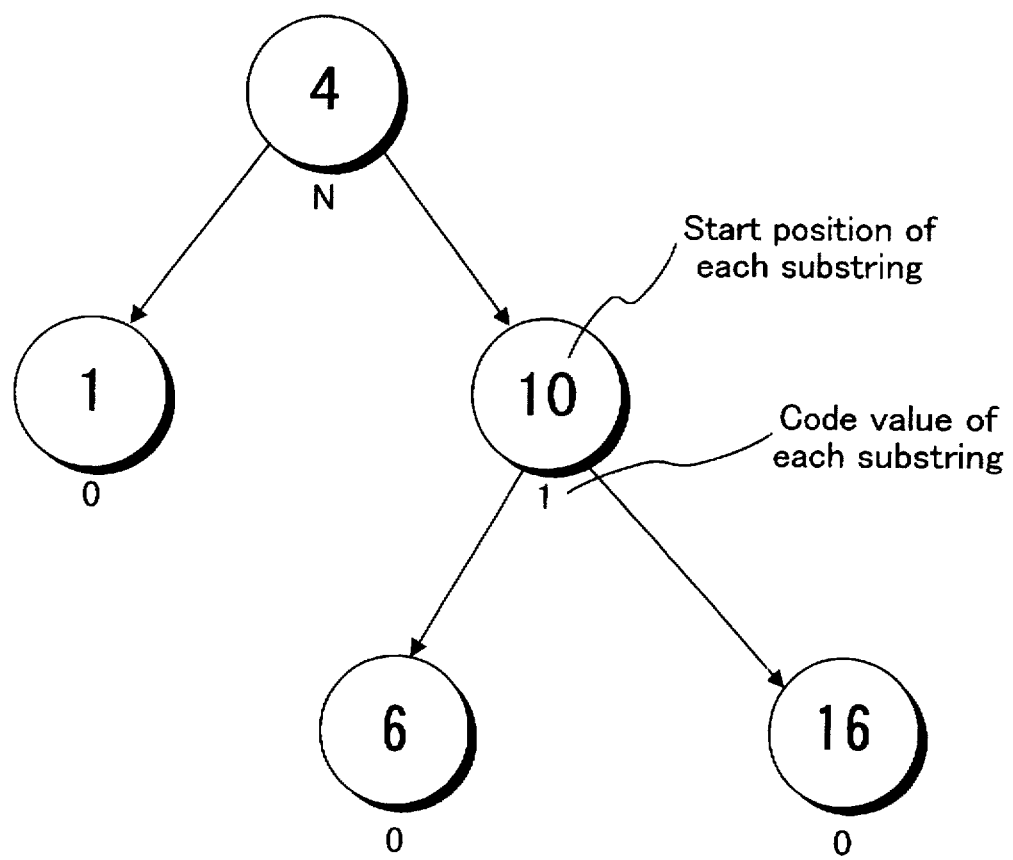
FIG. 56 is an example of a conventional binary tree.
Figures 57, 58:
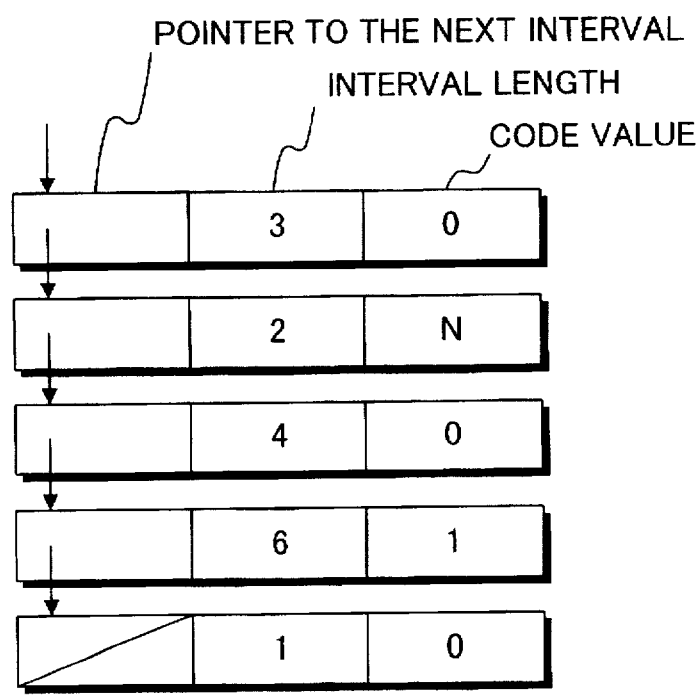
FIG. 57 is an example of data used in the conventional third method.
FIG. 58 is an example of data used in the conventional forth method.

Assume that "c" in the text "ababcab" has been changed, as shown in FIG. 46. First, the system searches the key-candidate substrings, arranged in order of start positions, for those containing "c" that has been changed. In the right side of FIG. 46, they are "2, ababcab, 1" to "7, cab, 5.

Then, the system selects the key-candidate substring that is the center of them (that is, "abcab"). The key-candidate substring in the index corresponding to this is "3, abcab, 3". Because the leading string of this "abcab" (that is, "ab") matches the leading string of "ab" and "ababcab" which come before "abcab" in the index, its position within the index may be affected by the change in "c" and therefore the determining means determines that "it must be re-arranged". As a result, "bcab" and "cab", shorter than "abcab" in the text, is determined that they must be re-arranged.

On the other hand, one of key-candidate substrings longer than "abcab" is "babcab", which corresponds to "5, bab cab 2" in the index. This time, "c" does not affect the lexicographic order between the index item and each adjacent item. Therefore, the index item is judged not to be re-arranged. As shown in FIG. 46, both "babcab and "ababcab" are determined that "they need not be re-arranged."

[11. Other embodiments]

Because this invention is not limited to the embodiments above but is applicable to other various types of embodiments, including the following.

In those embodiments described above, the data lexicographically-arranged key-candidate substrings based on alphabetically order, is explained. In the same way, there is no doubt that the other datas, lexicographically-arranged key-candidate substrings based on codaly order which is determined by specified sequence among codes, will be available.

For example, a code string used in this invention is not limited to a character string; the code string may be any type of code such as a voice pattern code or DNA base array code. A substring in a code string need not be processed explicitly; for example, it need not be transferred from one storage location to another. A substring may be specified implicitly, for example, by marking the boundary with pointers.

In addition, although the leading string of a trailing string of a code string is used in this invention to find a match during retrieval in the above embodiments, the trailing string of a leading string of a code string may be used instead. In this case, a "leading string" in this specification should be replaced with a "trailing string", and vice versa. Note that, in this case, characters are retrieved with a key string from end to start.

The "interval control method", another patent applied separately by the applicant of this invention, is used to assign sequence numbers to index items and to maintain them during index update, provided an interval of length 1 is assigned to each index item from the start.

[Effect of invention]

As described above, this invention provides an efficient data processing system, a data retrieval system, data processing method, and data retrieval method.

What is claimed is:

1. A data processing system comprising:
dictionary data generating means for arranging lexicographically plural leading strings to be used for retrieving trailing strings each of which is a trailing part of a code string on which retrieval is to be made using a key string and for generating dictionary data representing pairs each including a respective leading string and a position of said respective leading string within said code string;

dictionary tree generating means for generating a dictionary tree, which is a binary tree, based on said dictionary data;

text data generating means for generating text data based on said code string;

text tree generating means for generating a text tree, which is a binary tree, based on said text data;

retrieving means for retrieving trailing strings each containing at least part of a key string as one of the leading strings, based on said dictionary tree and text tree;

changing means for changing said code string;

sequence assigning means for assigning a sequence number to each of plural lexicographically registered dictionary data items; and updating means for updating, based on a contents of the change, the dictionary data, the dictionary tree, the text data, the text tree, and a lexicographic order of said code string associated with the change, wherein said retrieving means counts a number of substrings, each containing an identical leading string using the sequence numbers of a first dictionary data item and a last dictionary data item.

2. A data processing system as claimed in claim 1, wherein the length of a key-candidate substring constituting said dictionary data is limited.

3. A data processing system as claimed in claim 1, wherein the length of a key-candidate substring constituting said dictionary data is not limited.

4. A data processing system as claimed in claim 1, wherein at least one of said dictionary tree generating means and text tree generating means establishes a pointer between a node in said dictionary tree and the corresponding node in said text tree.

5. A data processing system as claimed in claim 1, wherein said retrieving means retrieves data by referencing both said dictionary tree and said text tree.

6. A data processing system as claimed in claim 1, wherein said retrieving means restores a substring based on one or both of said dictionary tree and said text tree.

7. A data processing system as claimed in claim 1, wherein said dictionary tree generating means and text tree generating means integrate the nodes of said dictionary tree and text tree into one.

8. A data processing system as claimed in claim 1, wherein a character string is stored in said dictionary tree and the character string is not stored in said text tree.

9. A data processing system as claimed in claim 8, wherein the length of a character string stored in said dictionary tree is equal to the length represented by the corresponding node in the text tree.

10. A data processing system as claimed in claim 1, wherein a character string and a node address are used as a pointer to the dictionary tree in a node in said text tree.

11. A data processing system comprising:

dictionary data generating means for arranging lexicographically plural leading strings to be used for retrieving trailing strings each of which is a trailing part of a code string on which retrieval is to be made using a key string and for generating dictionary data representing pairs each including a respective leading string and a position of said respective leading string within said code string;

text data generating means for generating text data based on said code string;

retrieving means for retrieving trailing strings each containing at least part of a key string as one of the leading strings, based on said dictionary data and text data;

changing means for changing said code string;

sequence assigning means for assigning a sequence number to each of plural lexicographically registered dictionary data items;

updating means for updating, based on a contents of the change, the dictionary data, the text data, and a lexicographic order of said code string associated with the change; and adjustment range setting means for putting changes into one unit of adjustment work, wherein said retrieving means counts a number of substrings, each containing an identical leading string, using the sequence numbers of a first dictionary data item and a last dictionary data item.

12. A data processing system as claimed in claim 11, wherein the length of a key-candidate substring constituting said dictionary data is limited.

13. A data processing system as claimed in claim 11, wherein the length of a key-candidate substring constituting said dictionary data is not limited.

14. A data processing system as claimed in claim 11, wherein at least one of said dictionary data generating means and text data generating means establishes pointers between said dictionary data and text data.

15. A data processing system as claimed in claim 11, wherein said retrieving means retrieves data by referencing both said dictionary data and said text data.

16. A data processing system as claimed in claim 11, wherein said retrieving means restores a substring based on one or both of said dictionary data and text data.

17. A data processing system comprising:

dictionary data generating means for arranging lexicographically plural leading strings to be used for retrieving trailing strings each of which is a trailing part of a code string on which retrieval is to be made using a key string and for generating dictionary data representing pairs each including a respective leading string and a position of said respective leading string within said code string;

text data generating means for generating text data based on said code string;

retrieving means for retrieving trailing strings each containing at least part of a key string as one of the leading strings, based on said dictionary data and text data;

changing means for changing said code string;

sequence assigning means for assigning a sequence number to each of plural lexicographically registered dictionary data items; and updating means for updating, based on a contents of the change, the dictionary data, text data, and a lexicographic order of said code string associated with the change, wherein said retrieving means counts a number of substrings, each containing an identical leading string, using the sequence numbers of a first dictionary data item and a last dictionary data item.

18. A data retrieval system comprising:

dictionary data generating means for arranging lexicographically plural leading strings to be used for retrieving trailing strings each of which is a trailing part of a code string on which retrieval is to be made using a key string and for generating dictionary data representing pairs each including a respective leading string and a position of said respective leading string within said code string;

dictionary tree generating means for generating a dictionary tree, which is a binary tree, based on said dictionary data;

text data generating means for generating text data based on said code string;

sequence assigning means for assigning a sequence number to each of plural lexicographically registered dictionary data items; and retrieving means for retrieving trailing strings each containing at least part of a key string as one of the leading strings, based on said dictionary tree, wherein said retrieving means counts a number of substrings, each containing an identical leading string using the sequence numbers of a first dictionary data item and a last dictionary data item.

19. A data retrieval system as claimed in claim 18, wherein the length of a key-candidate substring constituting said dictionary data is limited.

20. A data retrieval system as claimed in claim 18, wherein the length of a key-candidate substring constituting said dictionary data is not limited.

21. A data retrieval system as claimed in claim 18, further comprising text tree generating means for generating a text tree, which is a binary tree, based on said text data, wherein trailing strings each containing the whole or part of a key string as the leading string are retrieved based on said dictionary tree and text tree.

22. A data retrieval system comprising:

dictionary data generating means for arranging lexicographically plural leading strings to be used for retrieving trailing strings each of which is a trailing part of a code string on which retrieval is to be made using a key string and for generating dictionary data representing pairs each including a respective leading string and a position of said respective leading string within said code string;

text data generating means for generating text data based on said code string;

sequence assigning means for assigning a sequence number to each of plural lexicographically registered dictionary data items; and retrieving means for retrieving trailing strings each containing at least part of a key string as and of the leading strings, based on said dictionary data, wherein said retrieving means counts a number of substrings, each containing an identical leading string, using the sequence numbers of a first dictionary data item and a last dictionary data item.

23. A data retrieval system as claimed in claim 22, wherein the length of a key-candidate substring constituting said dictionary data is limited.

24. A data retrieval system as claimed in claim 22, wherein the length of a key-candidate substring constituting said dictionary data is not limited.

25. A data processing system comprising:

dictionary data generating means for arranging lexicographically plural leading strings to be used for retrieving trailing strings each of which is a trailing part of a code string on which retrieval is to be made using a key string and for generating dictionary data representing pairs each including a respective leading string and a position of said respective leading string within said code string;

retrieving means for retrieving trailing strings each containing at least part of a key string as one of the leading strings, based on said dictionary data;

comparing means for comparing two code strings;

registering means for determining a position of a trailing string within an index and registering the trailing string in the index based on the comparison with another trailing string already registered in the dictionary data and composed of identical characters except one;

changing means for changing said code string;

rearrangement determining means for determining if, when part of said code string is changed, the leading string of the trailing string including the changed position of the code string must be re-arranged; and updating means for updating, based on a determination result of said comparing means and rearrangement determining means, the dictionary data of said code string associated with the change.

26. A data processing system as claimed in claim 25, wherein said retrieving means determines, based on the position of a character on which comparison was performed last, the character position where comparison is to start next, when performing binary search on an lexicographically arranged table with a code string as the key.

27. A data processing system as claimed in claim 25, wherein, in a table arranged lexicographically with a code string as the key and when the trailing strings, generated by removing a matching leading string from two code strings, are in said table at the time both code strings are compared, said comparing means determines the relation of two code strings based on the comparison of the trailing strings of said two code strings.

28. A data processing system as claimed in claim 25, wherein, when registering the leading string of the trailing string $\alpha w$ in a table arranged lexicographically with the leading string of the trailing string as the key, said registering means registers the leading string of $\alpha w$ immediately after the leading string of $\beta x$, if the difference $\beta$ between the shortest trailing string $\beta x$ which is longer than the trailing string x coming immediately before w which is the longest trailing string shorter than said trailing string $\alpha w$ in said table and the said trailing string x coming immediately before w matches the difference $\alpha$ between said trailing string $\alpha w$ and the shorter and longest trailing string w, and registers the leading string of $\alpha w$ immediately before the leading string of $\gamma y$, if the difference $\gamma$ between the shortest trailing string $\gamma y$ which is longer than the trailing string y coming immediately after the longest trailing string w which is shorter than said trailing string $\alpha w$ in said table and the trailing string y immediately after w matches the difference $\alpha$ between said trailing string $\alpha w$ and the shorter and longest trailing string w.

29. A data processing system as claimed in claim 25, wherein, when registering the leading string of the trailing string w in a table arranged lexicographically with the leading string of the trailing string as the key, said registering means registers the leading string of w between the leading string of x and the leading string of y if, for the trailing strings $\beta x$ and $\gamma y$ which are immediately before and after the shortest trailing string $\alpha w$ which is longer than said trailing string w in said table, the leading string of the longest trailing string x which is shorter than $\beta x$ is adjacent to the leading string of the longest trailing string y which is shorter than $\gamma y$, preceded by the leading string of x in said table, and if $\alpha = \beta$, or $\alpha = \gamma$.

30. A data processing system as claimed in claim 25, wherein, after part of the code string has been changed, said rearrangement determining means compares, in a table arranged lexicographically with the leading string of a trailing string as the key, the leading string immediately before and after said leading string in said table with said leading string itself, determines that, for at least said trailing string and longer trailing strings, their leading strings need not be re-arranged if said leading string is equal to or larger than said leading string immediately before and is equal to or smaller than the leading string of said leading string immediately after and, otherwise, determines that, for at least said trailing string and shorter trailing strings which contain the changed part, their leading strings must be re-arranged.

31. A data processing system as claimed in claim 25, wherein, after part of the code string has been changed, said rearrangement determining means compares, in a table arranged lexicographically with the leading string of a trailing string as the key, the leading string immediately before and after said leading string in said table with said leading string itself, determines that, for at least said trailing string and shorter trailing strings, their leading strings must be re-arranged if the characters of the leading strings to the position immediately before the changed position match and, otherwise, determines that, for at least said trailing string and longer trailing strings which contain the changed part, their leading strings need not be re-arranged.

32. A data processing system as claimed in claim 25, wherein, after part of the code string has been changed, said rearrangement determining means determines, in a table arranged lexicographically with the leading string of a trailing string as the key, if the leading strings of trailing strings containing the changed part must be re-arranged, in order of the leading strings of shorter trailing strings.

33. A data processing system as claimed in claim 25, wherein, after part of the code string has been changed, said rearrangement determining means determines, in a table arranged lexicographically with the leading string of a trailing string as the key, if the leading strings of trailing strings containing the changed part must be re-arranged while selecting leading strings in binary search mode, one at a time, from those arranged in order of start positions.

34. A data retrieval system comprising:
retrieving means for retrieving a trailing string containing at least part of a key string as a leading string, based on an index composed of pairs, each including a respective leading string to be used for retrieving the trailing string and a position of the respective leading string within said code, arranged lexicographically by said leading string, for a code string on which retrieval is performed using a key string; and
index generating means for generating said index,
wherein said index has items to which sequence numbers are assigned, and wherein said retrieving means has an output function for outputting, based on a sequence, a number of trailing strings each of which contains the at least part of a specific key string, and wherein said index generating means generates index items to which sequence numbers are assigned.

35. A data processing system comprising:
retrieving means for retrieving a trailing string containing at least part of a key string as a leading string, based on an index composed of pairs, each including a respective leading string to be used for retrieving the trailing string and a position of the respective leading string within said code, arranged lexicographically by said leading string, for a code string on which retrieval is performed using a key string; and
updating means for updating, based on a change to said code string, an index of said code string associated with the change,
wherein said index has items to which sequence numbers are assigned, wherein said retrieving means has an output function for outputting, based on a sequence, a number of trailing strings each of which contains the at least part of a specific key string, and wherein said updating means also updates the sequence.

36. A data processing system comprising:
retrieving means for retrieving a trailing string containing at least part of a key string as a leading string, based on an index composed of pairs, each including a respective leading string to be used for retrieving the trailing string and a position of the respective leading string within said code, arranged lexicographically by said leading string, for a code string on which retrieval is performed using a key string; and
index generating means for generating said index;
changing means for changing said code string; and
updating means for updating, based on a change to said code string, the index of said code string associated with the change,
wherein said index has items to which sequence numbers are assigned, wherein said retrieving means has an output function for outputting, based on a sequence, a number of trailing strings each of which contains the at least part of a specific key string, wherein said index generating means generates index items to which sequence numbers are assigned, and wherein said updating means also updates the sequence.

37. A data retrieval system comprising:
retrieving means having a retrieving function for retrieving a trailing string of a code string containing at least part of a key string as a leading string, based on an index composed of pairs, each including a respective leading string to be used for retrieving the trailing string and a position of the respective leading string for retrieving within said code string, arranged lexicographically by said leading string, for a code string on which retrieval is performed using a key string, and having a restoring function for restoring the at least part of a code string beginning in a specified position, based on a text composed of pairs, each including a respective leading string of a trailing string residing in a trailing part of said code string and a position of the respective leading string of a trailing string within said code string, arranged in an order of appearance of the leading string within said code string;
index generating means for generating said index; and
text generating means for generating said text,
wherein said index has items to which sequence numbers are assigned, wherein said retrieving means has an output function for outputting, based on a sequence, a number of trailing strings each of which contains the at least part of a specific key string, and wherein said index generating means generates index items to which sequence numbers are assigned.

38. A data retrieval system as claimed in claim 34 or 37, wherein the length of a key-candidate substring constituting said index is limited.

39. A data retrieval system as claimed in claim 38, wherein said index is represented by a binary tree.

40. A data retrieval system as claimed in claim 38, wherein said text is said code string stored in contiguous addresses, each location being represented by an address.

41. A data retrieval system as claimed in claim 34 or 37, wherein the length of a key-candidate substring constituting said index is not limited.

42. A data retrieval system as claimed in claim 41, wherein said index is represented by a binary tree.

43. A data retrieval system as claimed in claim 41, wherein said text is said code string stored in contiguous addresses, each location being represented by an address.

44. A data retrieval system as claimed in claim 37, wherein the pairs in said index and the pairs in said text are integrated.

45. A data processing system comprising:
retrieving means having a retrieving function for retrieving a trailing string of a code string containing at least part of a key string as a leading string, based on an index composed of pairs, each including a respective leading string to be used for retrieving the trailing string and a position of the respective leading string for retrieving within said code string, arranged lexicographically by said leading string, for a code string on which retrieval is performed using a key string, and having a restoring function for restoring the at least part of a code string beginning in a specified position, based on a text composed of pairs, each including a respective leading string of a trailing string residing in a trailing part of said code string and a position of the respective leading string of a trailing string within said code string, arranged in an order of appearance of the leading string within said code string; and updating means for updating, based on a change to said code string, the index and the text of said code string associated with the change, wherein said index has items to which sequence numbers are assigned, wherein said retrieving means has an output function for outputting, based on a sequence, a number of trailing strings each of which contains the at least part of a specific key string, and wherein said updating means also updates the sequence.

46. A data processing system comprising:
retrieving means having a retrieving function for retrieving a trailing string of a code string containing at least part of a key string as a leading string, based on an index composed of pairs, each including a respective leading string to be used for retrieving the trailing string and a position of the respective leading string for retrieving within said code string, arranged lexicographically by said leading string, for a code string on which retrieval is performed using a key string, and having a restoring function for restoring the at least part of a code string beginning in a specified position, based on a text composed of pairs, each including a respective leading string of a trailing string residing in a trailing part of said code string and a position of the respective leading string of a trailing string within said code string, arranged in an order of appearance of the leading string within said code string;

index generating means for generating said index;
text generating means for generating said text;
changing means for changing said code string; and
updating means for updating, based on a change to said code string, the index and the text of said code string associated with the change, wherein said index has items to which sequence numbers are assigned, wherein said retrieving means has an output function for outputting, based on a sequence, a number of trailing strings each of which contains the at least part of a specific key string, wherein said index generating means generates index items to which sequence numbers are assigned, and wherein said updating means also updates the sequence.

47. A data processing system as claimed in claim 35, 36, 45, or 46, wherein the length of a key-candidate substring constituting said index is limited.

48. A data processing system as claimed in claim 47, wherein said index is represented by a binary tree.

49. A data processing system as claimed in claim 47, wherein said text is said code string stored in contiguous addresses, each location being represented by an address.

50. A data processing system as claimed in claim 35, 36, 45, or 46, wherein the length of a key-candidate substring constituting said index is not limited.

51. A data processing system as claimed in claim 50, wherein said index is represented by a binary tree.

52. A data processing system as claimed in claim 50, wherein said text is said code string stored in contiguous addresses, each location being represented by an address.

53. A data processing system as claimed in claim 46, wherein the pairs in said index and the pairs in said text are integrated.

54. A data processing system as claimed in claim 25, 35, 36, 45, or 46, wherein said updating means combines updates for a plurality of changes to said code string into one unit of work.

55. A data processing method comprising the steps of:
arranging lexicographically leading strings to be used for retrieving trailing strings each of which is a trailing part of a code string on which retrieval is to be made using a key string and for generating dictionary data representing pairs each including a respective leading string and a position of said respective leading string within said code string;

generating a dictionary tree, which is a binary tree, based on said dictionary data;

generating text data based on said code string;

generating a text tree, which is a binary tree, based on said text data;

retrieving trailing strings each containing at least part of a key string as the leading string, based on said dictionary tree and text tree;

changing said code string;

assigning a sequence number to each of plural lexicographically registered dictionary data items; and updating, based on a contents of change, the dictionary data, the dictionary tree, the text data, the text tree, and a lexicographic order of said code string associated with the change, wherein said step of retrieving includes the step of counting a number of substrings, each containing an identical leading string, using the sequence numbers of a first dictionary data item and a last dictionary data item.

56. A data processing method comprising the steps of:
arranging lexicographically leading strings to be used for retrieving trailing strings each of which is a trailing part of a code string on which retrieval is to be made using a key string and for generating dictionary data representing pairs each including a respective leading string and a position of said respective leading string within said code string;

generating text data based on said code string;

retrieving trailing strings each containing at least part of a key string as the leading string, based on said dictionary data and text data;

changing said code string;

assigning a sequence number to each of lexicographically registered dictionary data items;

updating, based on a contents of the change, the dictionary data, the text data, and a lexicographic order of said code string associated with the change; and putting the changes into one unit of adjustment work,
wherein said step of retrieving includes the step of counting a number of substrings, each containing an identical leading string, using the sequence numbers of a first dictionary data item and a last dictionary data item.

57. A data processing method comprising the steps of:
arranging lexicographically the leading strings to be used for retrieving trailing strings each of which is a trailing part of a code string on which retrieval is to be made with the use of a key string and for generating dictionary data representing pairs each consisting of said leading string and its position within said code string;
generating text data based on said code string;
retrieving trailing strings each containing the whole or part of a key string as the leading string, based on said dictionary data and text data;
changing said code string;
assigning a sequence number to each of lexicographically-registered dictionary data items; and
updating, based on the contents of said change, the dictionary data, text data, and lexicographic order of said code string associated with the change.

58. A data processing method as claimed in claim 57, wherein said retrieving step has counting step for counting the number of substrings, each containing an identical leading string, using the sequence numbers of the first dictionary data item and the last dictionary data item.

59. A data retrieval method comprising the steps of:
arranging lexicographically the leading strings to be used for retrieving trailing strings each of which is a trailing part of a code string on which retrieval is to be made with the use of a key string and for generating dictionary data representing pairs each consisting of said leading string and its position within said code string;
generating a dictionary tree, which is a binary tree, based on said dictionary data;
generating text data based on said code string; and
retrieving trailing strings each containing the whole or part of a key string as the leading string, based on said dictionary tree.

60. A data retrieval method comprising the steps of:
arranging lexicographically the leading strings to be used for retrieving trailing strings each of which is a trailing part of a code string on which retrieval is to be made with the use of a key string and for generating dictionary data representing pairs each consisting of said leading string and its position within said code string;
generating text data based on said code string; and
retrieving trailing strings each containing the whole or part of a key string as the leading string, based on said dictionary data.

61. A data processing method comprising the steps of:
arranging lexicographically leading strings to be used for retrieving trailing strings each of which is a trailing part of a code string on which retrieval is to be made using a key string and for generating dictionary data representing pairs each including a respective leading string and a position of said respective leading string within said code string;
retrieving trailing strings each containing at least part of a key string as the leading string, based on said dictionary data;
comparing two code strings;
determining a position of a trailing string within an index and registering the position in the index based on a comparison with another trailing string already registered in the dictionary data and composed of identical characters except one;
changing said code string;
determining if, when part of said code string is changed, the leading string of the trailing string, including the position of the code string which was changed, must be re-arranged; and
updating, based on a determination result of said comparing and determining steps, the dictionary data of said code string associated with the change.

62. A data processing method as claimed in claim 61, wherein said retrieving step determines, based on the position of a character on which comparison was performed last, the character position where comparison is to start next, when performing binary search on an lexicographically arranged table with a code string as the key.

63. A data processing method as claimed in claim 61, wherein, in a table arranged lexicographically with a code string as the key and when the trailing strings, generated by removing a matching leading string from two code strings, are in said table at the time both code strings are compared, said comparing step determines the relation of two code strings based on the comparison of the trailing strings of said two code strings.

64. A data processing method as claimed in claim 61, wherein, when registering the leading string of the trailing string $\alpha w$ in a table arranged lexicographically with the leading string of the trailing string as the key, said registering step registers the leading string of $\alpha w$ immediately after the leading string of $\beta x$, if the difference $\beta$ between the shortest trailing string $\beta x$ which is longer than the trailing string $x$ coming immediately before $w$ which is the longest trailing string shorter than said trailing string $\alpha w$ in said table and the said trailing string $x$ coming immediately before $w$ matches the difference $\alpha$ between said trailing string $\alpha w$ and the shorter and longest trailing string $w$, and registers the leading string of $\alpha w$ immediately before the leading string of $\gamma y$, if the difference $\gamma$ between the shortest trailing string $\gamma y$ which is longer than the trailing string $y$ coming immediately after the longest trailing string $w$ which is shorter than said trailing string $\alpha w$ in said table and the trailing string $y$ immediately after $w$ matches the difference $\alpha$ between said trailing string $\alpha w$ and the shorter and longest trailing string $w$.

65. A data processing method as claimed in claim 61, wherein, when registering the leading string of the trailing string $w$ in a table arranged lexicographically with the leading string of the trailing string as the key, said registering step registers the leading string of $w$ between the leading string of $x$ and the leading string of $y$ if, for the trailing strings $\beta x$ and $\gamma y$ which are immediately before and after the shortest trailing string $\alpha w$ which is longer than said trailing string $w$ in said table, the leading string of the longest trailing string $x$ which is shorter than $\beta x$ is adjacent to the leading string of the longest trailing string $y$ which is shorter than $\gamma y$, preceded by the leading string of $x$ in said table, and if $\alpha=\beta$ or $\alpha=\gamma$.

66. A data processing method as claimed in claim 61, wherein, after part of the code string has been changed, said re-arrange determining step compares, in a table arranged lexicographically with the leading string of a trailing string as the key, the leading string immediately before and after said leading string in said table with said leading string itself, determines that, for at least said trailing string and longer trailing strings, their leading strings need not be re-arranged if said leading string is equal to or larger than said leading string immediately before and is equal to or smaller than the leading string of said leading string immediately after and, otherwise, determines that, for at least said trailing string and shorter trailing strings which contain the changed part, their leading strings must be re-arranged.

67. A data processing method as claimed in claim 61, wherein, after part of the code string has been changed, said re-arrange determining step compares, in a table arranged lexicographically with the leading string of a trailing string as the key, the leading string immediately before and after said leading string in said table with said leading string itself, determines that, for at least said trailing string and shorter trailing strings, their leading strings must be re-arranged if the characters of the leading strings to the position immediately before the changed position match and, otherwise, determines that, for at least said trailing string and longer trailing strings which contain the changed part, their leading strings need not be re-arranged.

68. A data processing method as claimed in claim 61, wherein, after part of the code string has been changed, said re-arrange determining step determines, in a table arranged lexicographically with the leading string of a trailing string as the key, if the leading strings of trailing strings containing the changed part must be re-arranged, in order of the leading strings of shorter trailing strings.

69. A data processing method as claimed in claim 61, wherein, after part of the code string has been changed, said re-arrange determining step determines, in a table arranged lexicographically with the leading string of a trailing string as the key, if the leading strings of trailing strings containing the changed part must be re-arranged while selecting leading strings in binary search mode, one at a time, from those arranged in order of start positions.

70. A data retrieval method comprising the steps of:
retrieving a trailing string containing at least part of a key string as a leading string based on an index composed of pairs, each including a leading string to be used for retrieving the trailing string and a position of the respective leading string within said code, arranged lexicographically by said leading string, for a code string on which retrieval is performed;
generating said index,
wherein said index has items to which sequence numbers are assigned, wherein said retrieving includes outputting, based on a sequence, a number of trailing strings each of which contains the at least part of a specific key string, and wherein said step of generating said index includes the step of generating index items to which sequence numbers are assigned.

71. A data processing method comprising the steps of:
retrieving a trailing string containing at least part of a key string as a leading string, based on an index composed of pairs, each including a respective leading string to be used for retrieving the trailing string and a position of the respective leading string within said code, arranged lexicographically by said leading string, for a code string on which retrieval is performed using a key string; and
updating, based on a change to said code string, an index of said code string associated with the change,
wherein said index has items to which sequence numbers are assigned, wherein said step of retrieving includes the step of outputting, based on a sequence, a number of trailing strings each of which contains the at least part of a specific key string, and wherein said step of updating includes the step of updating the sequence.

72. A data processing method comprising the steps of:
retrieving a trailing string containing at least part of a key string as a leading string, based on an index composed of pairs, each including a respective leading string to be used for retrieving the trailing string and a position of the respective leading string within said code, arranged lexicographically by said leading string, for a code string on which retrieval is performed using a key string;
generating said index;
changing said code string; and
updating, based on a change to said code string, an index of said code string associated with the change,
wherein said index has items to which sequence numbers are assigned, where said step of retrieving includes the step of outputting, based on a sequence, a number of trailing strings each of which contains the at least part of a specific key string, wherein said step of generating said index includes the step of generating index items to which sequence numbers are assigned, and wherein said updating includes updating the sequence.

73. A data retrieval method comprising the steps of:
retrieving a trailing string of a code string containing at least part of a key string as a leading string, based on an index composed of pairs, each including a respective leading string to be used for retrieving the trailing string and a position of the respective leading string for retrieving within said code string, arranged lexicographically by said leading string, for a code string on which retrieval is performed using a key string;
restoring at least part of a code string beginning in a specified position, based on a text composed of pairs, each including a respective leading string of a trailing string residing in a trailing part of said code string and a position of the respective leading string of the trailing string within said code string arranged in order of appearance of the leading string within said code string;
generating said index; and
generating said text,
wherein said index has items to which sequence numbers are assigned, wherein said step of retrieving includes the step of outputting, based on a sequence, a number of trailing strings each of which contains the at least part of a specific key string, and wherein said step of generating said index includes the step of generating index items to which sequence numbers are assigned.

74. A data retrieval method as claimed in claim 70 or 73, wherein said index has items to which sequence numbers are assigned, wherein said retrieving step has an output function for outputting, based on the sequence, the number of trailing strings each of which contains the whole or part of a specific key string, and wherein said index generating step generates index items to which sequence numbers are assigned.

75. A data processing method comprising the steps of:
retrieving a trailing string of a code string containing at least part of a key string as a leading string, based on an index composed of pairs, each including a respective leading string to be used for retrieving the trailing string and a position of the respective leading string within said code string, arranged lexicographically by said leading string, for a code string on which retrieval is performed using a key string;
retrieving the leading string of a trailing string residing in a trailing part of said code string;
restoring at least part of a code string beginning in a specified position, based on a text arranged in order of positions within said code string; and updating, based on a change to said code string, the index and the text of said code string associated with the change, wherein said index has items to which sequence numbers are assigned wherein said step of retrieving includes outputting, based on a sequence, a number of trailing strings each of which contains the at least part of a specific key string, and wherein said step of updating includes the step of updating the sequence.

76. A data processing method as claimed in claim 71 or 75, wherein said index has items to which sequence numbers are assigned, wherein said retrieving step has an output function for outputting, based on the sequence, the number of trailing strings each of which contains the whole or part of a specific key string, and wherein said updating step updates the sequence too.

77. A data processing method comprising the steps of:

retrieving a trailing string of a code string containing the whole or part of a key string as the leading string, based on an index composed of pairs, each consisting of a leading string to be used for retrieving the trailing string and its position within said code string, arranged lexicographically by said leading string, for a code string on which retrieval is performed with the use of a key string, retrieving the leading string of a trailing string residing in the trailing part of said code string, restoring the whole or part of a code string beginning in the specified position, based on a text arranged in order of positions within said code string;

generating said index;

generating said text;

changing said code string; and updating, based on a change to said code string, the index and the text of said code string associated with the change.

78. A data processing method as claimed in claim 72 or 77, wherein said index has items to which sequence numbers are assigned, wherein said retrieving step has an output function for outputting, based on the sequence, the number of trailing strings each of which contains the whole or part of a specific key string, wherein said index generating step generates index items to which sequence numbers are assigned, and wherein said updating means updates the sequence too.

* * * * *